United States Patent
Kitano et al.

(10) Patent No.: US 10,539,265 B2
(45) Date of Patent: Jan. 21, 2020

(54) VACUUM HEAT INSULATOR, HEAT INSULATION DEVICE PROVIDED WITH SAME, AND METHOD FOR MANUFACTURING VACUUM HEAT INSULATOR

(71) Applicant: Panasonic Intellectual Property Management Co., Ltd., Osaka-shi, Osaka (JP)

(72) Inventors: Tomoaki Kitano, Shiga (JP); Hideji Kawarazaki, Osaka (JP); Toshiaki Hirano, Shiga (JP); Tsuyoki Hirai, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/019,118

(22) Filed: Jun. 26, 2018

(65) Prior Publication Data
US 2018/0313492 A1 Nov. 1, 2018

Related U.S. Application Data

(63) Continuation of application No. PCT/JP2017/007652, filed on Feb. 28, 2017.

(30) Foreign Application Priority Data
Mar. 2, 2016 (JP) .............................. 2016-040300

(51) Int. Cl.
*F16L 59/06* (2006.01)
*F25D 23/02* (2006.01)
(Continued)

(52) U.S. Cl.
CPC ............ *F16L 59/065* (2013.01); *B32B 37/18* (2013.01); *F25D 23/02* (2013.01); *F25D 23/064* (2013.01);
(Continued)

(58) Field of Classification Search
CPC ........ F25D 23/02; F25D 23/028; F25D 23/06; F25D 23/064; F25D 23/065; F25D 2201/14; F25D 2201/128; F16L 59/065
See application file for complete search history.

(56) References Cited

U.S. PATENT DOCUMENTS 9,221,210 B2 * 12/2015 Wu ....................... B29C 51/02
2015/0140244 A1   5/2015 Uekado et al.
(Continued)

FOREIGN PATENT DOCUMENTS

JP     61-195261      8/1986
JP    4-257685 A      9/1992
(Continued)

OTHER PUBLICATIONS

The Extended European Search Report dated Jan. 23, 2019 for the related European Patent Application No. 17759960.2, 6 pages.

*Primary Examiner* — Andrew M Roersma
(74) *Attorney, Agent, or Firm* — Hamre, Schumann, Mueller & Larson, P.C.

(57) ABSTRACT

A vacuum heat insulator includes inner box (403), external plate (401), and gas barrier container (402). Gas barrier container (402) includes core material (423), first member (421) that has a box shape including a first opening portion, and second member (422) that tightly closes the first opening portion. Core material (423) is disposed inside first member (421). Inner box (403) includes a second opening portion. Gas barrier container (402) is disposed inside inner box (403). The second opening portion is closed by external plate (401). First member (421) has such a shape that an outer face of first member (421) fits with an inner face of inner box (403).

5 Claims, 63 Drawing Sheets

(51) Int. Cl.
*B32B 37/18* (2006.01)
*F25D 23/06* (2006.01)
*F16L 59/065* (2006.01)

(52) U.S. Cl.
CPC ..... *B32B 2305/022* (2013.01); *B32B 2309/02* (2013.01); *B32B 2309/105* (2013.01); *F25D 2201/128* (2013.01); *F25D 2201/14* (2013.01)

(56) References Cited

U.S. PATENT DOCUMENTS

| | | | |
|---|---|---|---|
| 2015/0241118 A1* | 8/2015 | Wu | F25D 23/065 428/426 |
| 2017/0182607 A1* | 6/2017 | Liu | B23P 15/26 |
| 2017/0184339 A1* | 6/2017 | Liu | F25D 23/062 |
| 2017/0184340 A1* | 6/2017 | Allard | B29C 45/1642 |

FOREIGN PATENT DOCUMENTS

| | | | |
|---|---|---|---|
| JP | 6-159915 | 6/1994 | |
| JP | 6-159922 A | 6/1994 | |
| JP | 7-195385 | 8/1995 | |
| JP | 3455251 B2 | 10/2003 | |
| JP | 4642265 | 3/2011 | |
| JP | 5310928 | 7/2013 | |
| WO | 2004/010042 | 1/2004 | |
| WO | WO-2010127947 A2 * | 11/2010 | ............ F16L 59/065 |
| WO | WO-2015072099 A1 * | 5/2015 | ............ F16L 59/065 |
| WO | 2017/116564 A1 | 7/2017 | |

* cited by examiner

100A

External plate side — Core material side

External plate side — Core material side

192

VACUUM HEAT INSULATOR, HEAT INSULATION DEVICE PROVIDED WITH SAME, AND METHOD FOR MANUFACTURING VACUUM HEAT INSULATOR

TECHNICAL FIELD

The present disclosure relates to a vacuum heat insulator, a heat insulation device provided with the same, and a method for manufacturing a vacuum heat insulator.

BACKGROUND ART

In recent years, there has been a strong demand for realization of energy saving from a standpoint of global warming prevention. Accordingly, realization of energy saving for household electric appliances has also been an urgent issue. A heat and cold insulation device such as a refrigerator, a freezer, and a vending machine, which includes a heat insulating material having an excellent heat insulation property, has been particularly required from a standpoint of efficient use of heat.

A heat insulator currently known and capable of achieving excellent heat insulating performance is a vacuum heat insulating structure which includes a multilayer-film bag constituted by thermoplastic resin, a gas barrier layer, and a heat seal layer. This multilayer-film bag is filled with a heat insulating substance (for example, see PTL 1).

The multilayer-film bag of the vacuum heat insulating structure disclosed in PTL 1 is filled with a heat insulating substance. Accordingly, a complicated shape of the vacuum heat insulating structure is difficult to produce. For example, when the vacuum heat insulating structure disclosed in PTL 1 is disposed in a heat insulating wall having a complicated three-dimensional shape, such as a door of a refrigerator, a space unfilled with the vacuum heat insulating structure is produced at an end or other portions within the heat insulating wall. In this case, foamed polyurethane or the like needs to be provided at the corresponding space.

PTL 2 discloses open-cell urethane foam constituting a core material of a vacuum heat insulator.

CITATION LIST

Patent Literatures

PTL 1: Japanese Patent No. 4642265
PTL 2: Japanese Patent No. 5310928

SUMMARY OF THE INVENTION

The present disclosure provides a vacuum heat insulator, a heat insulation device provided with the same, and a method for manufacturing a vacuum heat insulator, the vacuum heat insulator being capable of following (fitting with) a complicated three-dimensional shape while securing sufficient gas barrier and heat insulation properties.

More specifically, a vacuum heat insulator according to an exemplary embodiment of the present disclosure presented by way of example includes a core material, a gas barrier container inside of which the core material is disposed, an inner box inside of which the gas barrier container is disposed, and an external plate that closes an opening of the inner box. The gas barrier container includes a first member that includes a first opening portion, and a second member that tightly closes the first opening portion. The inner box includes a second opening portion closed by the external plate. The gas barrier container is configured to maintain a predetermined degree of vacuum inside the gas barrier container. The first member has such a shape that an outer face of the first member is fitted to an inner face of the inner box.

This configuration produces a vacuum heat insulator capable of following a complicated three-dimensional shape while securing a sufficient gas barrier and heat insulation properties. When vacuum heat insulator thus configured is applied to a heat insulating wall of a heat insulation device or the like, simplification of a manufacturing step, and therefore reduction of manufacturing costs are achievable in comparison with a heat insulation device including a conventional vacuum heat insulating structure, such as a refrigerator. Moreover, when the vacuum heat insulator thus configured is applied, such a necessity is eliminated which combines a flat vacuum heat insulating material and foamed urethane, which has been conventionally required. Accordingly, heat insulation performance of the heat insulation device improves.

According to the vacuum heat insulator of the exemplary embodiment of the present disclosure presented by way of example, the first member may include a first resin layer and a second resin layer each of which is made with thermoplastic resin, and a gas barrier layer disposed between the first resin layer and the second resin layer.

This configuration produces a vacuum heat insulator capable of following a complicated three-dimensional shape while securing sufficient gas barrier and heat insulation properties. In addition, the first resin layer and the second resin layer constituted by polypropylene or the like having low moisture permeability protect organic resin contained in the gas barrier layer and having poor resistance to moisture, thereby enhancing durability of the first member.

Furthermore, when the gas barrier container is only required to have a heat insulation property equivalent to a heat insulation property of a conventional gas barrier container, an internal volume of the heat insulation device (e.g., refrigerator) can be raised by thickness reduction of the vacuum heat insulator allowed in this situation.

According to the vacuum heat insulator of the exemplary embodiment of the present disclosure presented by way of example, the core material may be made of open-cell urethane foam.

This configuration produces a vacuum heat insulator capable of following a complicated three-dimensional shape while securing sufficient gas barrier and heat insulation properties.

According to the vacuum heat insulator of the exemplary embodiment of the present disclosure presented by way of example, the first member may include a first through hole through which an interior of the gas barrier container is vacuumed. The gas barrier container may further include a sealing member that seals the first through hole of the first member.

This configuration produces a vacuum heat insulator capable of following a complicated three-dimensional shape while securing sufficient gas barrier and heat insulation properties. This configuration further prevents exposure of the sealing member to a high temperature, thereby maintaining a sufficient bonding condition of the sealing member. This configuration therefore retains a sufficient degree of vacuum inside the gas barrier container, and achieves sufficient reduction of deterioration of heat insulation performance. Accordingly, the vacuum heat insulator provided herein secures vacuum heat insulation performance for a long period of time.

According to the vacuum heat insulator of the exemplary embodiment of the present disclosure presented by way of example, the inner box may further include a second through hole formed at a position facing the first through hole, and a boss provided at a circumferential edge of the second through hole. According to the vacuum heat insulator of the exemplary embodiment of the present disclosure presented by way of example, the second through hole is closed by the boss when the boss is welded. The vacuum heat insulator according to the exemplary embodiment of the present disclosure presented by way of example may further include a sealing member fixed to a portion of the second through hole of the inner box.

This configuration produces a vacuum heat insulator capable of following a complicated three-dimensional shape while securing sufficient gas barrier and heat insulation properties. Moreover, this configuration efficiently closes the second through hole, thereby improving production efficiency. This configuration further prevents exposure of the sealing member to a high temperature, thereby maintaining a sufficient bonding condition of the sealing member. This configuration therefore retains a sufficient degree of vacuum inside the gas barrier container, and achieves sufficient reduction of deterioration of heat insulation performance. Accordingly, the vacuum heat insulator provided herein secures vacuum heat insulation performance for a long period of time.

A heat insulation device according to an exemplary embodiment of the present disclosure presented by way of example includes the vacuum heat insulator having any one of the above configurations. More specifically, a heat insulation device according to the exemplary embodiment of the present disclosure presented by way of example includes a heat insulating wall which includes the vacuum heat insulator having any one of the above configurations.

This configuration produces a heat insulation device which includes a vacuum heat insulator capable of following a complicated three-dimensional shape while securing sufficient gas barrier and heat insulation properties. Accordingly, heat insulation performance of the heat insulation device improves.

A method for manufacturing a vacuum heat insulator according to an exemplary embodiment of the present disclosure presented by way of example includes steps of: manufacturing an inner box that includes a second opening portion; and processing a gas barrier sheet made of thermoplastic resin into a first member that includes a first opening portion, and is box-shaped and so shaped that an outer face of the first member fits with an inner face of the inner box. The method for manufacturing the vacuum heat insulator according to the exemplary embodiment of the present disclosure presented by way of example further includes steps of: disposing a core material inside the first member, disposing a second member in the first opening portion, vacuuming an inner space defined by the first member and the second member, and tightly closing the inner space to manufacture a gas barrier container; and disposing the gas barrier container in the inner box, and closing the second opening portion by an external plate.

This method produces a vacuum heat insulator capable of following a complicated three-dimensional shape while securing sufficient gas barrier and heat insulation properties.

The method for manufacturing the vacuum heat insulator according to the exemplary embodiment of the present disclosure presented by way of example may further include a step of forming a first through hole in a rear face of the first member, the first through hole being a hole through which an interior of the gas barrier container is vacuumed. According to the method for manufacturing the vacuum heat insulator of the exemplary embodiment of the present disclosure presented by way of example, the step of manufacturing the gas barrier container may include steps of: disposing the core material in an inner space of the first member, disposing a second member in the first opening portion, and welding the second member to tightly close the first opening portion; performing vacuuming through the first through hole until a degree of vacuum of the inner space of the first member reaches a predetermined degree of vacuum set beforehand; and sealing the first through hole by a sealing member.

This method produces, with high efficiency and high reliability, a vacuum heat insulator capable of following a complicated three-dimensional shape while securing sufficient gas barrier and heat insulation properties.

A method for manufacturing a vacuum heat insulator of an exemplary embodiment of the present disclosure presented by way of example may include a step of manufacturing an inner box that includes a second opening portion, a second through hole, and a boss provided at a circumferential edge of the second through hole. The method for manufacturing the vacuum heat insulator of the exemplary embodiment of the present disclosure presented by way of example may include a step of processing a gas barrier sheet made of thermoplastic resin into a first member that includes a first opening portion, and a first through hole formed at a portion facing the second through hole of the inner box, and is box-shaped and so shaped that an outer face of the first member fits with an inner face of the inner box. The method for manufacturing the vacuum heat insulator of the exemplary embodiment of the present disclosure presented by way of example may further include a step of disposing a core material in an inner space of the first member, disposing a second member in the first opening portion, and welding the second member to manufacture a gas barrier container. The method for manufacturing the vacuum heat insulator of exemplary embodiment of the present disclosure presented by way of example may further include a step of disposing the gas barrier container in an inner space of the inner box, performing vacuuming, from the first through hole via the second through hole, an inner space defined by the first member and the second member until a degree of vacuum of the inner space defined by the first member and the second member reaches a predetermined degree of vacuum set beforehand, closing the second through hole by thermally welding the boss, fixing a sealing member to a portion of the second through hole of the inner box, and closing the second opening portion by an external plate.

This method produces, with high efficiency and high reliability, a vacuum heat insulator capable of following a complicated three-dimensional shape while securing sufficient gas barrier and heat insulation properties.

DESCRIPTION OF EMBODIMENTS

Figure 1:
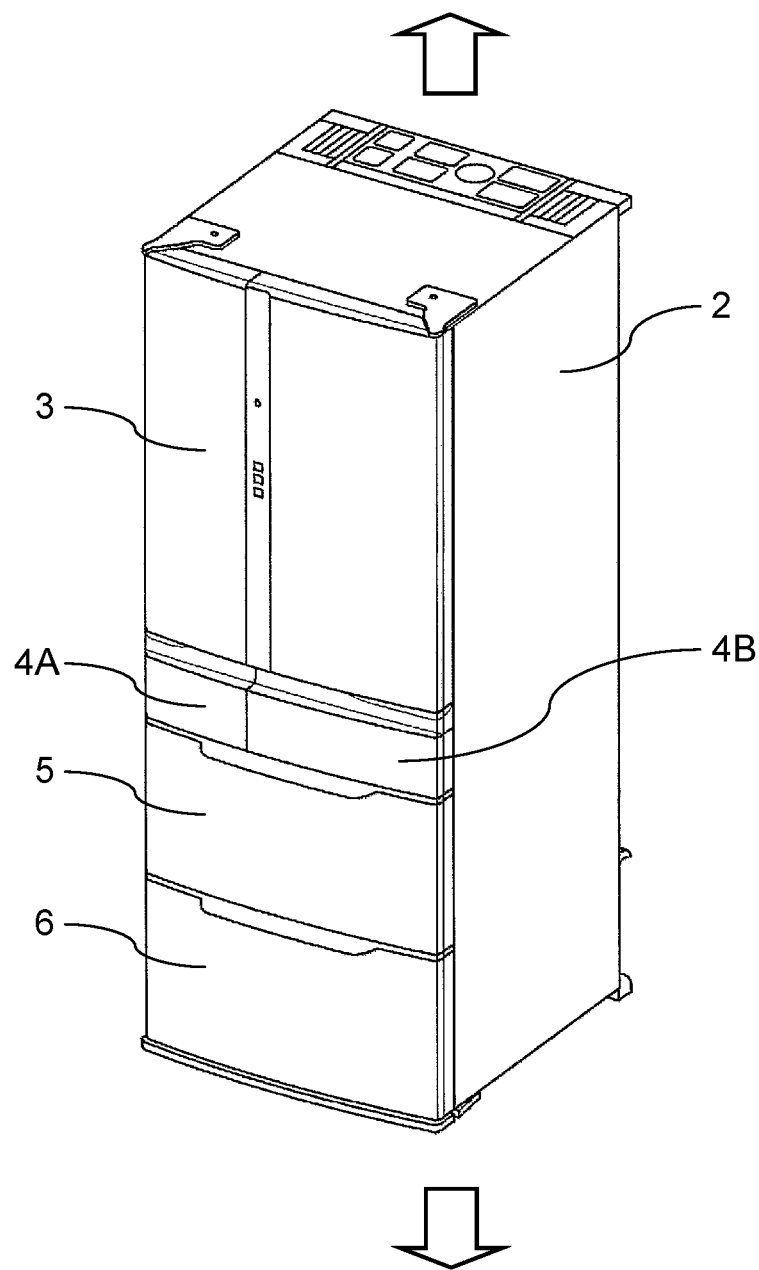
FIG. 1 is a perspective view illustrating a general configuration of a heat insulation device according to a first exemplary embodiment of the present disclosure.

Exemplary embodiments of the present disclosure are hereinafter described with reference to the drawings. Identical or similar parts are given identical reference numbers in the drawings. The same description of these parts may be omitted. In addition, only a part of constituent elements for describing the present disclosure may be depicted in the drawings, while depiction of other constituent elements may be omitted.

First Exemplary Embodiment

Examples of a vacuum heat insulator, and a heat insulation device provided with the vacuum heat insulator according to a first exemplary embodiment of the present disclosure are hereinafter described with reference to FIGS. 1 to 16.

[Configuration of Heat Insulation Device]

Figure 2:
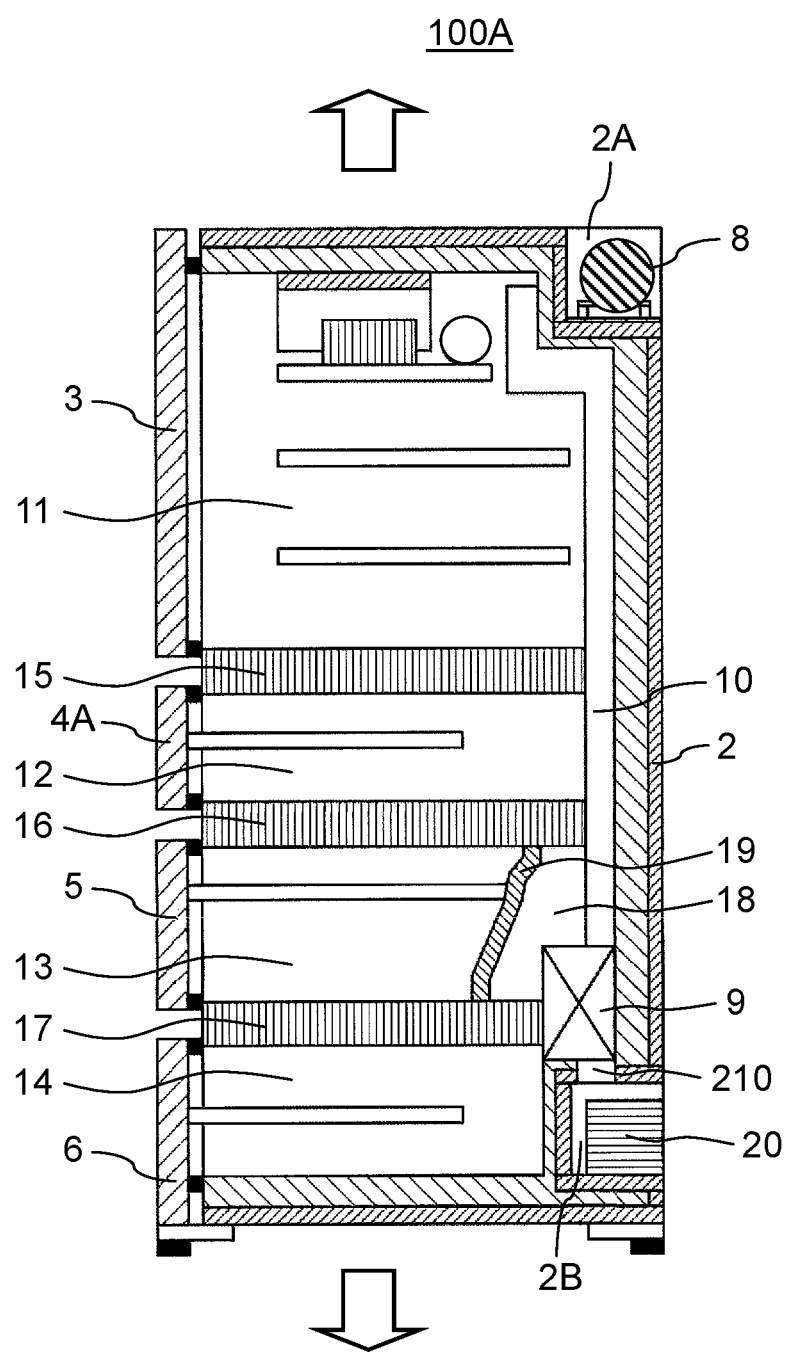
FIG. 2 is a longitudinal sectional view of the heat insulation device according to the first exemplary embodiment of the present disclosure (a cross-sectional view of the heat insulation device taken in front-rear and up-down directions of the heat insulation device).

FIG. 1 is a perspective view illustrating a general configuration of a heat insulation device according to the first exemplary embodiment of the present disclosure. FIG. 2 is a longitudinal sectional view of the heat insulation device according to the first exemplary embodiment of the present disclosure.

According to the present disclosure, a longitudinal sectional view refers to a cross-sectional view illustrating a cross section of a heat insulation device, a vacuum heat insulator or the like taken in front-rear and up-down directions of the corresponding device or the like.

Depicted in FIGS. 1 and 2 is a refrigerator presented by way of example of heat insulation device 100A according to the first exemplary embodiment of the present disclosure. Concerning an up-down direction of heat insulation device 100A, an upward direction and a downward direction of heat insulation device 100A correspond to an upward direction and a downward direction as viewed in each of FIGS. 1 and 2 as indicated by arrows in the respective figures. Heat insulation device 100A according to the present exemplary embodiment includes refrigerator body 2 which includes a plurality of storage compartments, refrigerating compartment door 3, ice-making compartment door 4A, first freezing compartment door 4B, vegetable compartment door 5, second freezing compartment door 6, compressor 8, and evaporator 9.

Recess 2A recessed downward from a top face of refrigerator body 2 is formed in a rear side upper part of refrigerator body 2. Recess 2A constitutes a machine compartment where compressor 8 is disposed. Recess 2B recessed toward a front face of refrigerator body 2 from a rear face of refrigerator body 2 is formed in a lower part of refrigerator body 2.

An interior of refrigerator body 2 is sectioned into the plurality of storage compartments by partition walls 15 to 17. More specifically, refrigerating compartment 11 is provided in the upper part of refrigerator body 2. Ice-making compartment 12 and a first freezing compartment (not shown) are provided side by side below refrigerating compartment 11. Vegetable compartment 13 is further provided below ice-making compartment 12 and the first freezing compartment. Second freezing compartment 14 is provided below vegetable compartment 13.

The front face of refrigerator body 2 is opened. A plurality of doors are provided on the front face of refrigerator body 2. More specifically, rotary type refrigerating compartment door 3 is disposed at refrigerating compartment 11. Ice-making compartment door 4A, first freezing compartment door 4B, vegetable compartment door 5, and second freezing compartment door 6, each of which is of a drawer type including a rail and the like, are disposed at ice-making compartment 12, the first freezing compartment, vegetable compartment 13, and second freezing compartment 14, respectively.

Compressor 8 is disposed in recess 2A. According to the mode of the present exemplary embodiment presented by way of example, compressor 8 is disposed in the upper part of refrigerator body 2. However, in a different adoptable mode, compressor 8 may be positioned in a central part or a lower part of refrigerator body 2.

Cooling compartment 18 is further provided on a rear side central part of refrigerator body 2. Cooling compartment 18 on a rear side of vegetable compartment 13 is sectioned from vegetable compartment 13 by cooling compartment wall body 19 which connects partition wall 16 and partition wall 17. Evaporator 9 is disposed in cooling compartment 18.

Evaporator 9 is configured to perform heat exchange between refrigerant supplied from compressor 8 and air present within cooling compartment 18. According to this configuration, air around evaporator 9 is cooled, and supplied in a cooled state via cooling channel 10 toward refrigerating compartment 11 and others by a not-shown fan or the like. Cooling channel 10 is constituted by a space formed between a not-shown partition wall and the rear face of refrigerator body 2.

Evaporating dish 20 is disposed in recess 2B to store water generated from evaporator 9. Refrigerator body 2 further includes through hole 210 formed between evaporator 9 and evaporating dish 20.

According to heat insulation device 100A in the present exemplary embodiment, at least one of refrigerator body 2, refrigerating compartment door 3, ice-making compartment door 4A, first freezing compartment door 4B, vegetable compartment door 5, second freezing compartment door 6, partition walls 15 to 17, and cooling compartment wall body 19 includes a heat insulating wall which houses vacuum heat insulator 101A according to the present exemplary embodiment.

[Configuration of Ice-Making Compartment Door (Vacuum Heat Insulator)]

Described now with reference to FIGS. 3 to 10 is ice-making compartment door 4A presented by way of example, which houses a vacuum heat insulator according to the present exemplary embodiment.

Figure 3:
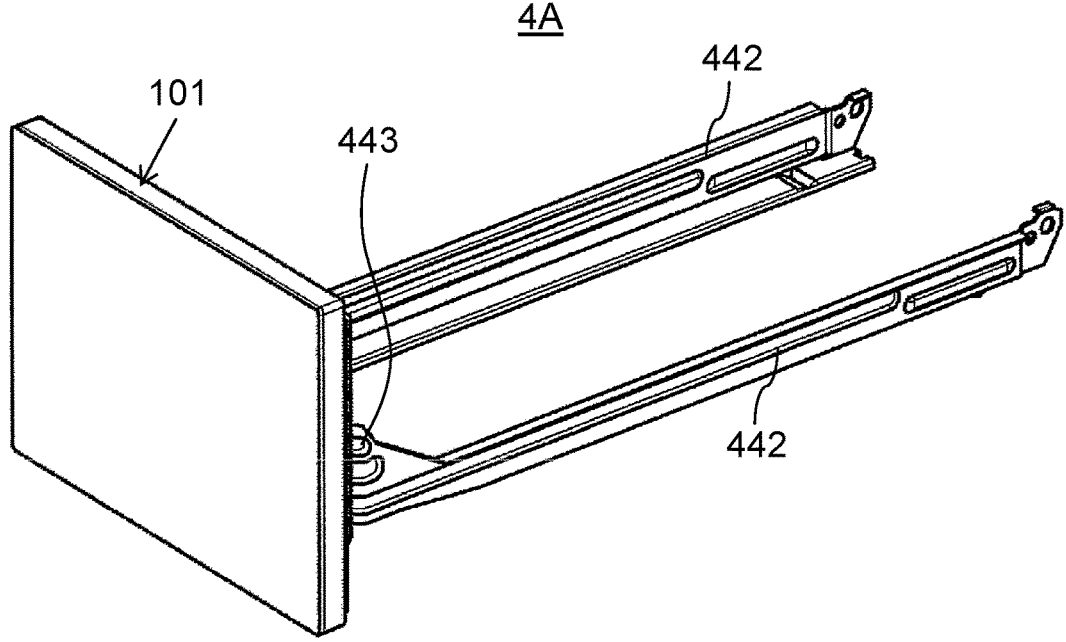
FIG. 3 is a perspective view of an ice-making compartment door included in the heat insulation device according to the first exemplary embodiment of the present disclosure, and provided with a vacuum heat insulator as viewed from a front of the ice-making compartment door.
Figure 4:
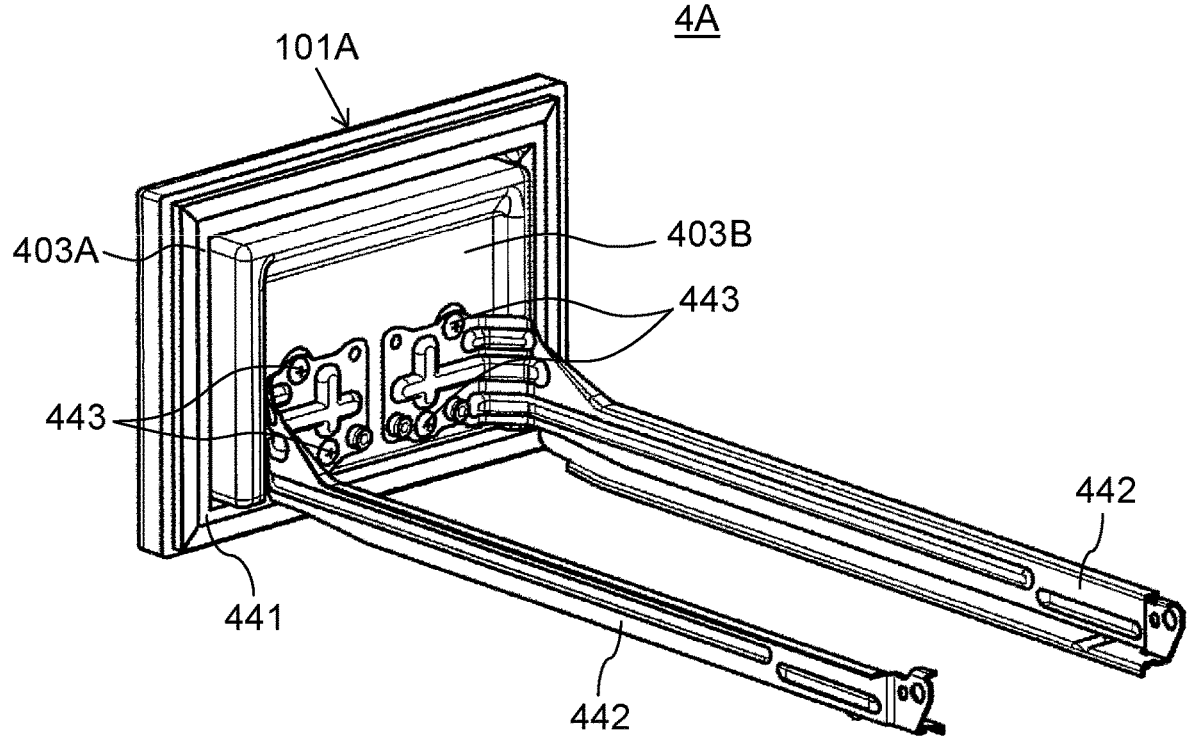
FIG. 4 is a perspective view of the ice-making compartment door included in the heat insulation device according to the first exemplary embodiment of the present disclosure, and provided with the vacuum heat insulator as viewed from a rear of the ice-making compartment door.
Figure 5:
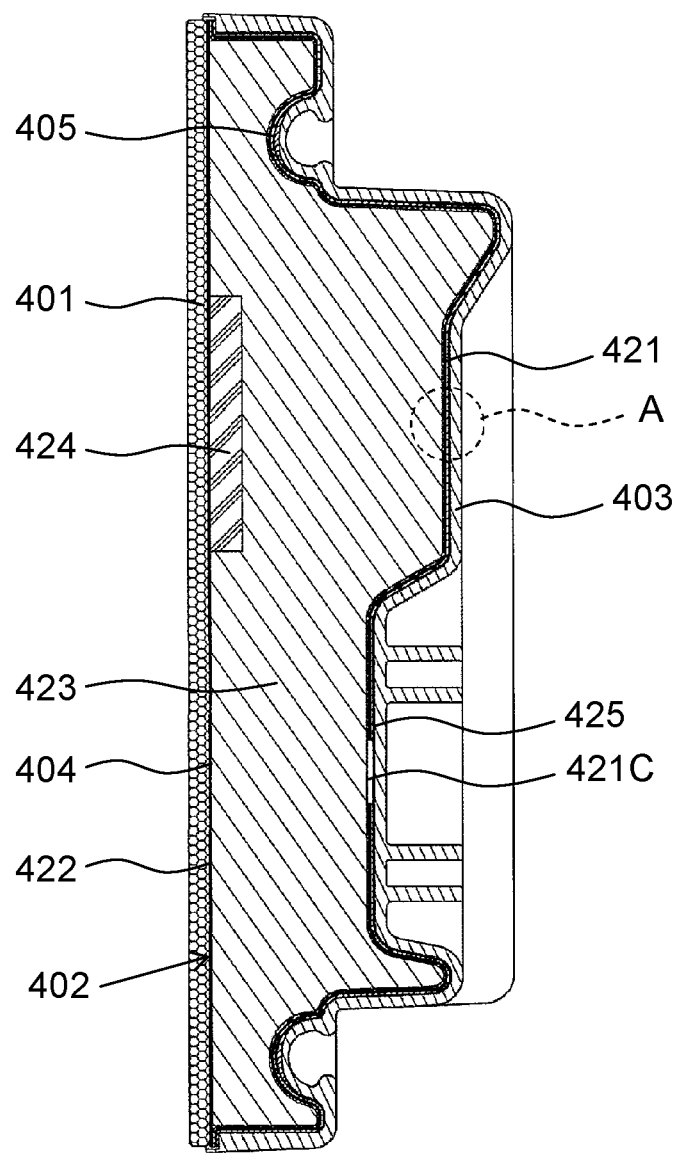
FIG. 5 is a longitudinal sectional view of the vacuum heat insulator of the heat insulation device according to the first exemplary embodiment of the present disclosure.
Figure 6:
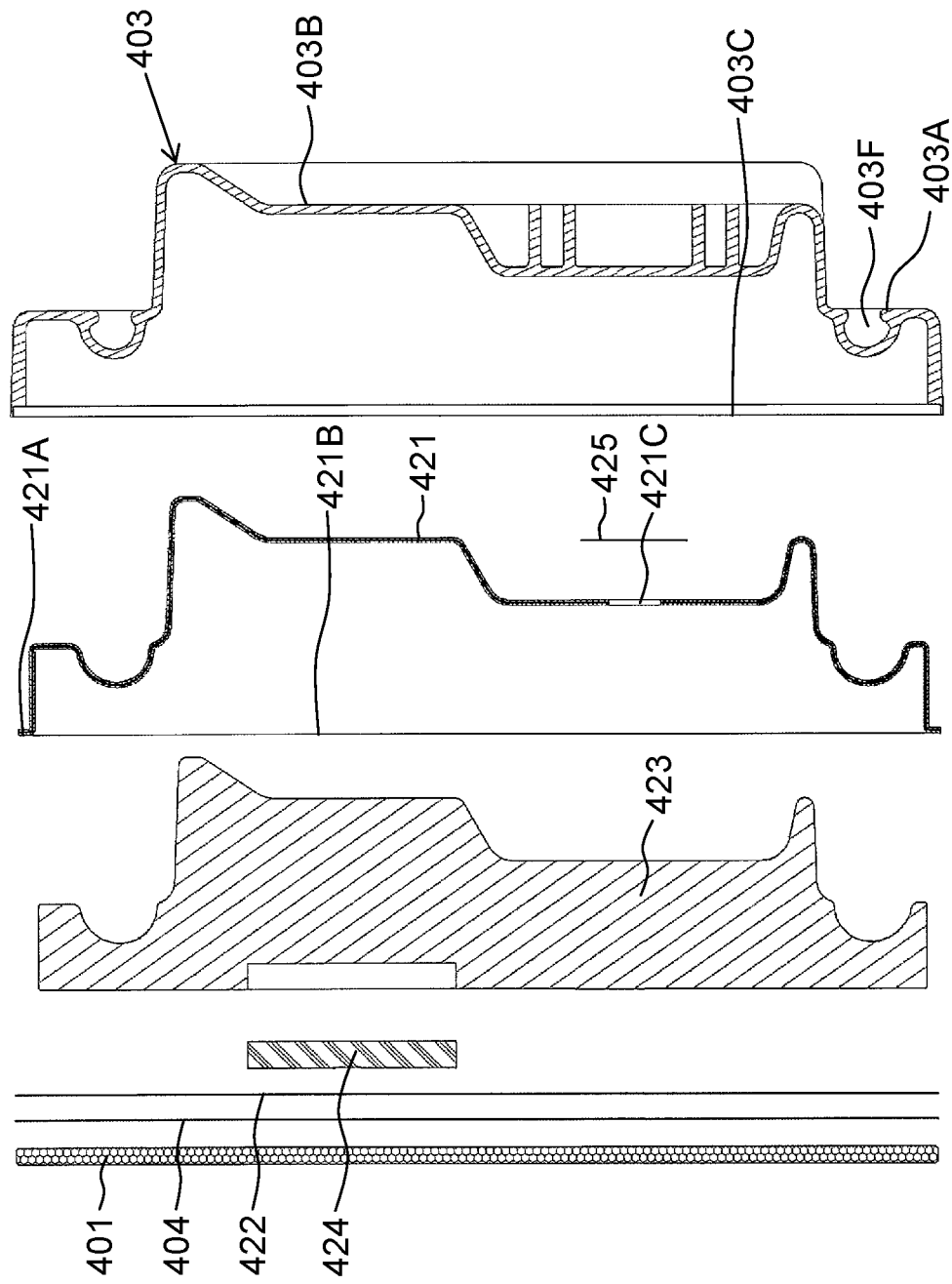
FIG. 6 is a developed view illustrating respective developed members which constitute the vacuum heat insulator of the heat insulation device according to the first exemplary embodiment of the present disclosure.
Figure 7:
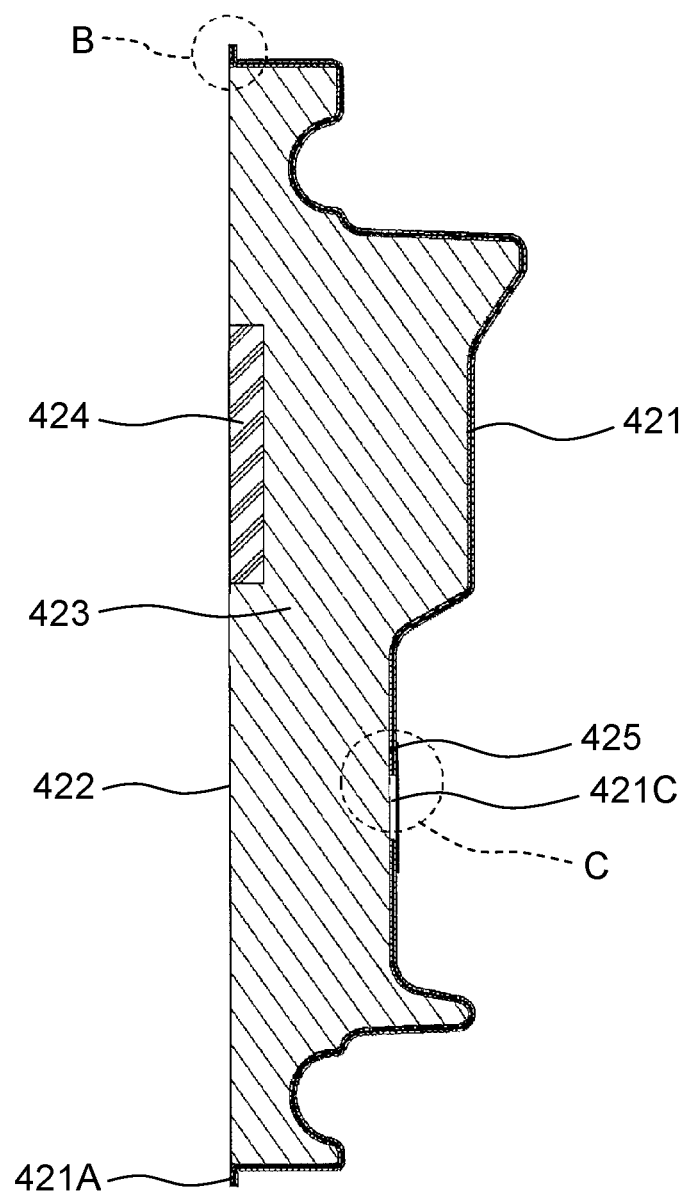
FIG. 7 is a longitudinal sectional view illustrating a gas barrier container of the vacuum heat insulator according to the first exemplary embodiment of the present disclosure.
Figure 8:
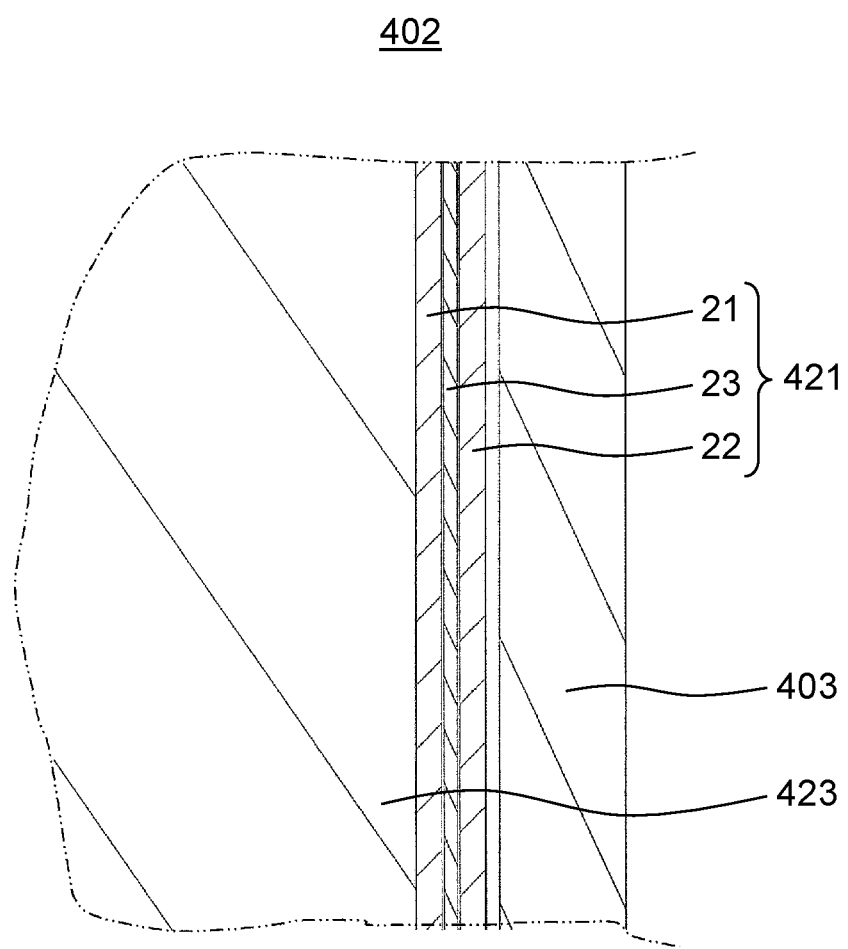
FIG. 8 is a schematic view illustrating enlarged part A shown in FIG. 5 and included in the vacuum heat insulator according to the first exemplary embodiment of the present disclosure.
Figure 9:
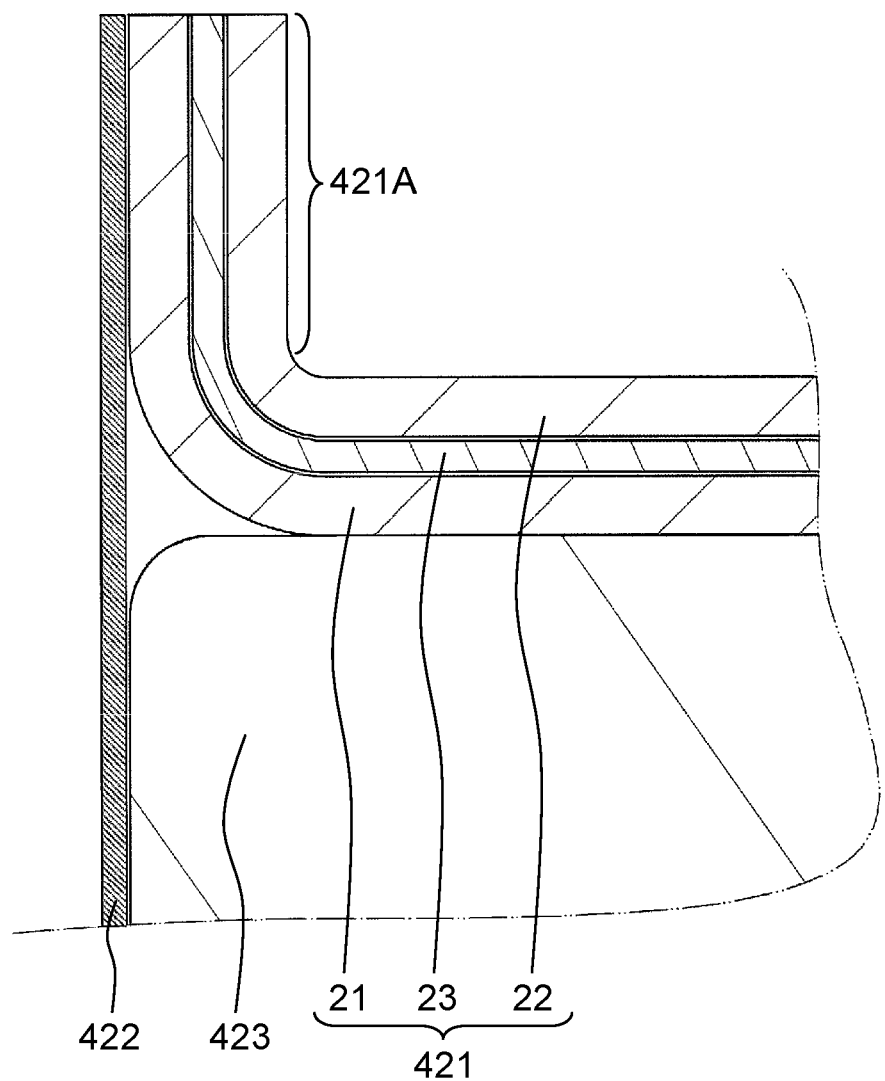
FIG. 9 is a schematic view illustrating enlarged part B shown in FIG. 7 and included in the gas barrier container of the vacuum heat insulator according to the first exemplary embodiment of the present disclosure.
Figure 10:
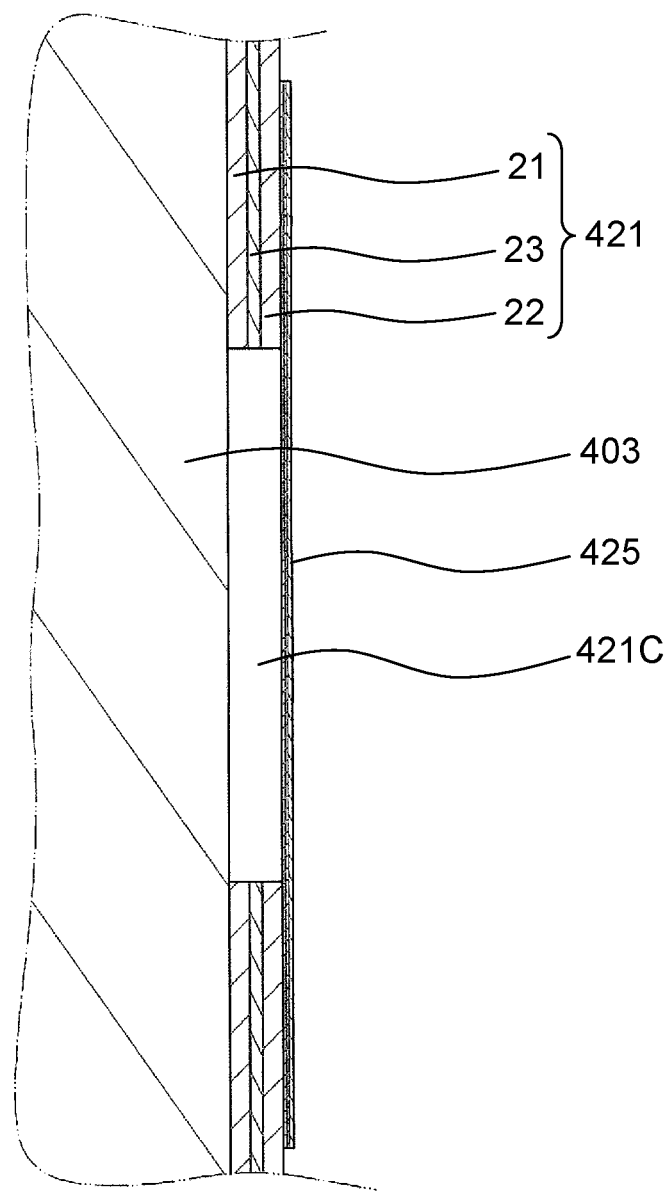
FIG. 10 is a schematic view illustrating enlarged part C shown in FIG. 7 and included in the gas barrier container of the vacuum heat insulator of the heat insulation device according to the first exemplary embodiment of the present disclosure.

FIG. 3 is a perspective view of the ice-making compartment door included in the heat insulation device according to the first exemplary embodiment of the present disclosure and provided with the vacuum heat insulator as viewed from the front of the ice-making compartment door. FIG. 4 is a perspective view of the ice-making compartment door included in the heat insulation device according to the first exemplary embodiment of the present disclosure and provided with the vacuum heat insulator as viewed from the rear of the ice-making compartment door. FIG. 5 is a longitudinal sectional view of the ice-making compartment door included in the heat insulation device according to the first exemplary embodiment of the present disclosure and provided with the vacuum heat insulator. FIG. 6 is a developed view illustrating respective developed members which constitute the vacuum heat insulator of the heat insulation device according to the first exemplary embodiment of the present disclosure. FIG. 7 is a longitudinal sectional view of a gas barrier container of the ice-making compartment door included in the heat insulation device according to the first exemplary embodiment of the present disclosure, and provided with the vacuum heat insulator. FIG. 8 is a schematic view illustrating enlarged part A shown in FIG. 5 and included in the vacuum heat insulator according to the first exemplary embodiment of the present disclosure. FIG. 9 is a schematic view illustrating enlarged part B shown in FIG. 7 and included in the gas barrier container of the vacuum heat insulator according to the first exemplary embodiment of the present disclosure. FIG. 10 is a schematic view illustrating enlarged part C shown in FIG. 7 and included in the gas barrier container of the vacuum heat insulator according to the first exemplary embodiment of the present disclosure.

As illustrated in FIGS. 3 and 4, ice-making compartment door 4A included in heat insulation device 100A according to the first exemplary embodiment of the present disclosure and provided with heat insulation device 101A includes vacuum heat insulator 101, gasket 441, a pair of frames 442, and a plurality of screws 443. As illustrated in FIGS. 5 to 10, vacuum heat insulator 101A includes external plate 401, gas barrier container 402, and inner box 403 which houses gas barrier container 402.

External plate 401 has a flat plate shape, and is constituted by a glass plate or a precoated steel plate, for example. External plate 401 and gas barrier container 402 are bonded to each other by sheet-shaped (film-shaped) adhesive 404. Adhesive 404 may be constituted by modified silicone or modified polyolefin, for example.

As illustrated in FIG. 6, inner box 403 has a box shape which includes second opening portion 403C. A front face of inner box 403 has an opening constituted by second opening portion 403C. The front face of inner box 403 is opened via second opening portion 403C.

The opening of inner box 403 constituted by second opening portion 403C is closed by external plate 401. A rear face of inner box 403 has a stepped shape, and includes first main face 403A forming a circumferential edge portion of the rear face, and second main face 403B forming a central portion of the rear face (see FIG. 6).

Gasket groove 403F formed in first main face 403A of inner box 403 to receive gasket 441 is so shaped as to surround second main face 403B (see FIGS. 4 and 6). The pair of frames 442 are fastened to a lower part of second main face 403B of inner box 403 by screws 443 (see FIGS. 3 and 4).

As illustrated in FIGS. 5 to 7, an inner face included in inner box 403 and facing gas barrier container 402 (counter face) has a recessed and protruded shape having a plurality of recesses and protrusions. As illustrated in FIG. 5, adhesive 405 is provided on the counter face of inner box 403. Adhesive 405 may be constituted by modified silicone, for example. Adhesive 405 may be applied to either an entire surface of the counter face of inner box 403, or a part of the counter face. When adhesive 405 is applied to a part of the counter face of inner box 403, it is preferable that adhesive 405 covers at least a part facing gasket 441. This configuration prevents communication (flow in and out of air) between the outside and a space formed between gas barrier container 402 and inner box 403, thereby further reducing a heat absorbing load imposed on heat insulation device 100A (refrigerator).

As illustrated in FIG. 7, gas barrier container 402 includes first member 421, second member 422, core material 423, absorbent 424, and sealing member 425. Core material 423 and absorbent 424 are disposed in an inner space defined in a housing by first member 421 and second member 422. Gas barrier container 402 is configured to have a predetermined degree of vacuum inside gas barrier container 402.

First member 421 is a molded component produced by vacuum molding, injection molding, pressure molding, press molding or other methods selected in accordance with the inner surface shape of inner box 403 described above. First member 421 has a box shape including first opening portion 421B.

Flange portion 421A is provided at an outer circumferential edge of first member 421 (see FIGS. 7 and 9). Second member 422 is bonded to flange portion 421A. Accordingly, first opening portion 421B of first member 421 is sealed by second member 422. This configuration achieves a planar press contact between second member 422 and an outer circumferential edge of first member 421 via flange portion 421A, allowing rigid seal between first member 421 and second member 422.

First through hole 421C is further formed at an appropriate position of a rear face of first member 421. First through hole 421C is a hole through which an interior of gas barrier container 402 (an interior of first member 421, more specifically, the inner space defined by first member 421 and second member 422) is vacuumed. Sealing member 425 for sealing first through hole 421C is provided at a circumferential edge of first through hole 421C.

Sealing member 425 may be constituted by a laminated film, for example. The laminated film may be made of thermoplastic resin such as low density polyethylene film, linear low density polyethylene film, middle density polyethylene film, high density polyethylene film, polypropylene film, and polyacrylonitrile film, or a mixture of these materials.

The laminated film may include a metal layer made of aluminum, stainless steel, or other metal materials. In this case, the metal layer may be formed inside the laminated film, or on a surface of the laminated film. Furthermore, the metal layer may be metal foil such as aluminum foil. Alternatively, the metal layer may be formed by vapor deposition of aluminum or the like on the surface of the laminated film.

Any modes of sealing member 425 may be adopted as long as a gas barrier property is given to sealing member 425. For example, sealing member 425 may be constituted by a glass plate or a precoated steel plate. When sealing member 425 is constituted by a laminated film, sealing member 425 may be welded to the rear face of first member 421 to seal first through hole 421C. When sealing member 425 is constituted by a glass plate or a precoated steel plate, sealing member 425 may be bonded to the rear face of first member 421 by an adhesive to seal first through hole 421C.

As illustrated in FIGS. 8 to 10, first member 421 is constituted by first resin layer 21, second resin layer 22, and gas barrier layer 23 disposed between first resin layer 21 and second resin layer 22.

Each of first resin layer 21 and second resin layer 22 is made of thermoplastic resin. For example, each of first resin layer 21 and second resin layer 22 may be made of polyolefin such as polyethylene and polypropylene. Respective materials of first resin layer 21 and second resin layer 22 may be identical to or different from each other.

Gas barrier layer 23 contains organic resin and scaly inorganic material. The organic resin constituting gas barrier layer 23 may be an ethylene-vinyl alcohol copolymer or a polyvinyl alcohol copolymer, for example. On the other hand, the scaly inorganic material may be montmorillonite constituting a main component of bentonite, which is one of natural clay minerals, montmorillonite subjected to ion exchange, or synthetic silica, for example. For securing a sufficient gas barrier property of gas barrier layer 23 (for sufficiently reducing oxygen permeability), the scaly inorganic material may have a thickness of 1 nm or larger, or an average particle diameter of 100 nm or larger. In addition, for processing a sheet constituting gas barrier layer 23 into a predetermined shape by vacuum molding, the scaly inorganic material may have a thickness of 3 nm or smaller, or an average particle diameter of 300 nm or smaller.

According to the mode of the present exemplary embodiment presented by way of example, first member 421 is constituted by a plurality of layers. However, in a different adoptable mode, first member 421 may be constituted by a single layer made of organic resin such as thermoplastic resin. In addition, in a different adoptable mode, first member 421 may include a metal layer made of aluminum, stainless steel or other metal materials and disposed on at least one of outer faces of first member 421.

Second member 422 is configured to close first opening portion 421B of first member 421, preferably to tightly close first opening portion 421B of first member 421. Second member 422 is constituted by a laminated film, for example. The laminated film may be made of thermoplastic resin such as low density polyethylene film, linear low density polyethylene film, middle density polyethylene film, high density polyethylene film, polypropylene film, and polyacrylonitrile film, or a mixture of these materials.

The laminated film may include a metal layer made of aluminum, stainless steel or other metal materials. In this case, the metal layer may be formed inside the laminated film, or on a surface of the laminated film. Furthermore, the metal layer may be metal foil such as aluminum foil. Alternatively, the metal layer may be formed by vapor deposition of aluminum or the like on the surface of the laminated film. Second member 422 may have a configuration either identical to or different from the configuration of sealing member 425 described above.

Core material 423 may be constituted by open-cell urethane foam, for example. The open-cell urethane foam may be a material having characteristics disclosed in PTL 2, for example. In this case, core material 423 has a shape identical to a shape of an inner face (inner space) of first member 421. Core material 423 may be made of glass fibers, rock wool, alumina fibers, or polyethylene terephthalate fibers, for example.

Examples of adsorbent 424 include a moisture absorbent that adsorbs and removes moisture, and a gas absorbent that adsorbs gas such as atmospheric gas. For example, the moisture absorbent may be made of a chemical absorption substance such as calcium oxide and magnesium oxide, or a physical absorption substance such as zeolite.

The gas absorbent is constituted by an absorbing material capable of absorbing non-condensable gas contained in gas, and a container. Examples of the absorbing material include an alloy composed of zirconium, vanadium, and tungsten, an alloy composed of iron, manganese, yttrium, lanthanum, and one of rare-earth elements, Ba—Li alloy, and zeolite subjected to ion exchange with metal ion (e.g., copper ion).

[Method for Manufacturing Ice-Making Compartment Door (Vacuum Heat Insulator)]

A method for manufacturing ice-making compartment door 4A is now described with reference to FIG. 11.

Figure 11:
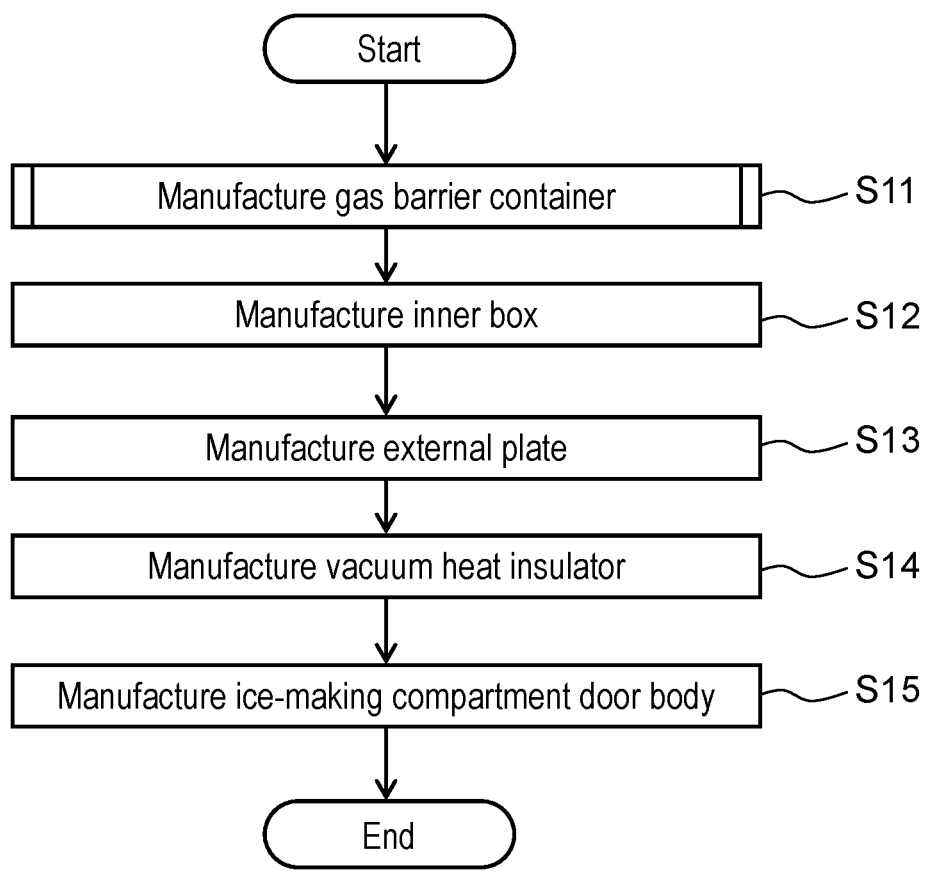
FIG. 11 is a flowchart showing respective steps of a method for manufacturing the ice-making compartment door provided with the vacuum heat insulator according to the first exemplary embodiment of the present disclosure.

FIG. 11 is a flowchart showing respective steps of a method for manufacturing the ice-making compartment door provided with the vacuum heat insulator according to the first exemplary embodiment of the present disclosure.

As shown in FIG. 11, gas barrier container 402 is initially manufactured (step S11). Respective steps of the method for manufacturing gas barrier container 402 will be described below.

Inner box 403 is subsequently manufactured by injection molding, vacuum molding, pressure molding, press molding, or other molding methods (step S12). External plate 401 is further manufactured by cutting a glass plate or the like into pieces in an appropriate size, for example (step S13). Any step in steps S11 to S13 may be initially performed.

Vacuum heat insulator 101A is subsequently manufactured (step S14). More specifically, gas barrier container 402 and adhesive 405 are disposed inside inner box 403. Gas barrier container 402 and inner box 403 are bonded by adhesive 405. Sheet-shaped adhesive 404 is further disposed on a front face of gas barrier container 402. Gas barrier container 402 and external plate 401 are bonded by adhesive 404. Second opening portion 403C of inner box 403 is thus closed by external plate 401.

Subsequently, gasket 441 is attached to a rear face of inner box 403. The pair of frames 442 are fastened to inner box 403 by screws 443 to complete manufacturing of ice-making compartment door 4A (step S15).

[Method for Manufacturing Gas Barrier Container]

A method for manufacturing gas barrier container 402 is now described with reference to FIGS. 12 to 17.

Figure 12:
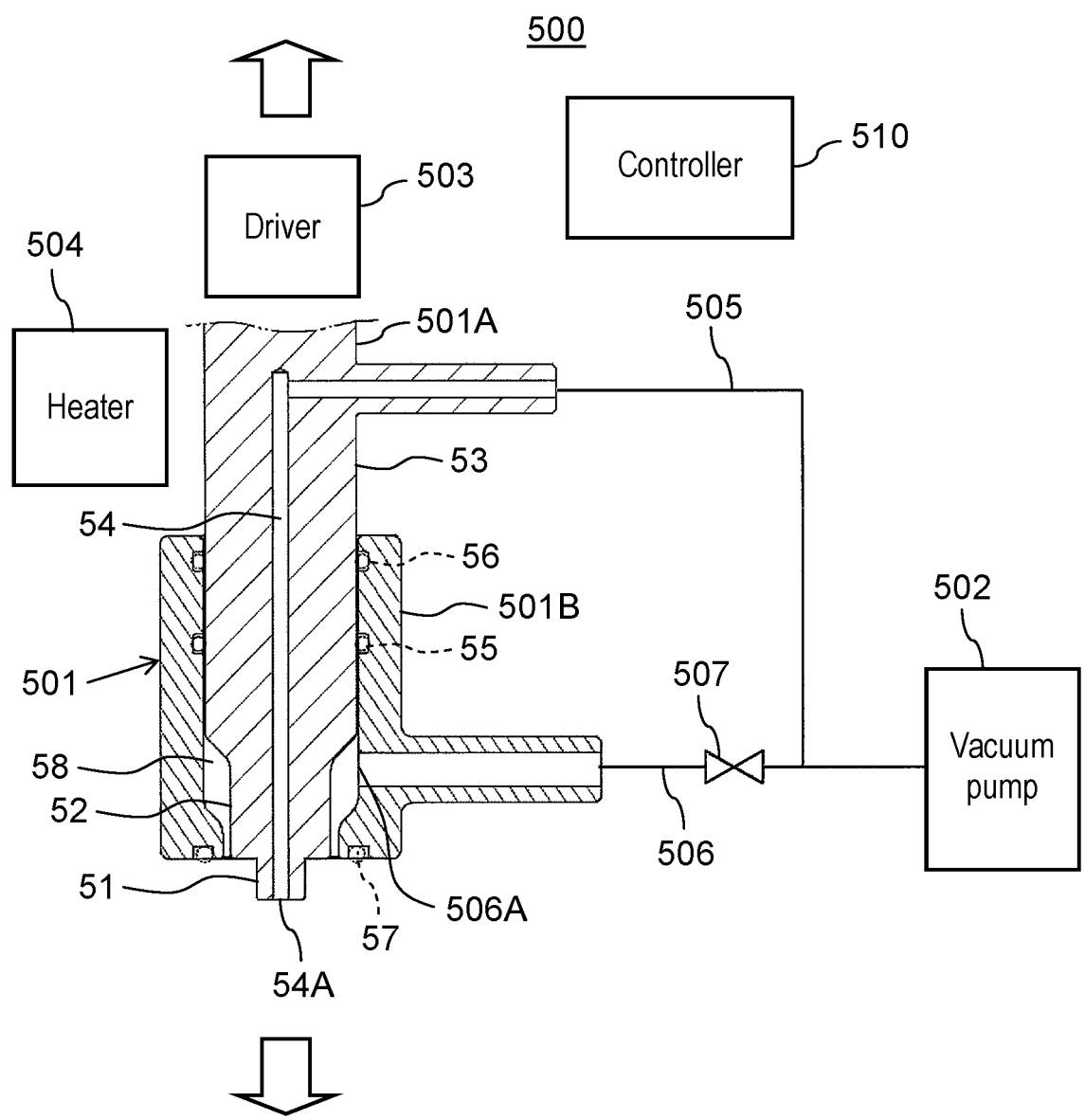
FIG. 12 is a schematic view illustrating a general configuration of a vacuum-sealing device used to manufacture the gas barrier container of the vacuum heat insulator according to the first exemplary embodiment of the present disclosure.

Discussed initially with reference to FIG. 12 is an example of a vacuum-sealing device used to manufacture gas barrier container 402 of vacuum heat insulator 101A according to the present exemplary embodiment.

FIG. 12 is a schematic view illustrating a general configuration of the vacuum-sealing device used to manufacture the gas barrier container of the vacuum heat insulator according to the first exemplary embodiment of the present disclosure. Concerning an up-down direction of vacuum-sealing device 500, an upward direction and a downward direction of vacuum-sealing device 500 correspond to an upward direction and a downward direction as viewed in FIG. 12 as indicated by arrows in the figure.

As illustrated in FIG. 12, vacuum-sealing device 500 includes vacuum-sealing device body 501, vacuum pump 502, driver 503, heater 504, and controller 510. Vacuum-sealing device body 501 includes body part 501A which has a substantially cylindrical shape and includes a step portion, and external cylinder part 501B which has a substantially cylindrical shape and includes a hollow portion. Vacuum-sealing device body 501 is also configured such that each of body part 501A and external cylinder part 501B is independently movable forward and backward by driver 503 in the up-down direction. Vacuum-sealing device 500 may be attached to an arm tip of a not-shown robot device.

Body part 501A includes distal end portion 51, intermediate portion 52, and rear end portion 53. Body part 501A is configured such that an area of a transverse section (a cross section cut in a horizontal direction) decreases in a direction from rear end portion 53 toward distal end portion 51. Exhaust channel 54 extending from distal end portion 51 (a distal end face of body part 501A) to rear end portion 53 is further formed inside body part 501A. Exhaust channel 54 is connected to second exhaust channel 506 described below via first exhaust channel 505 provided outside body part 501A. Opening 54A formed at distal end portion 51 constitutes an end of exhaust channel 54.

External cylinder part 501B is disposed in such a position as to surround an outer circumferential face of body part 501A. External cylinder part 501B is configured such that an inner circumferential face of external cylinder part 501B slides on an outer circumferential face of rear end portion 53 of body part 501A. More specifically, sealing members 55, 56 each having an annular shape are disposed on an inner circumferential face included in external cylinder part 501B and facing rear end portion 53 with a space left between sealing members 55, 56 in the up-down direction. Each of sealing members 55, 56 may be constituted by an O-ring, for example.

A recess having an annular shape is further formed in a distal end face (lower end face) of external cylinder part 501B. Sealing member 57 is disposed in this recess. Sealing member 57 may be constituted by an O-ring, for example.

Clearance 58 is formed in at least a part of a space between an inner circumferential face of external cylinder part 501B and outer circumferential faces of distal end portion 51 and intermediate portion 52 of body part 501A. One end (opening 506A) of second exhaust channel 506 is communicatively connected to clearance 58. The other end of second exhaust channel 506 is connected to vacuum pump 502.

Openable valve 507 is further provided at an intermediate position in second exhaust channel 506. More specifically, openable valve 507 is provided in an area between opening 506A of second exhaust channel 506 and a connection position between first exhaust channel 505 and second exhaust channel 506.

Second exhaust channel 506 is configured such that a cross-sectional area of second exhaust channel 506 becomes larger than a cross-sectional area of first exhaust channel 505. This configuration secures a higher flow rate of air flowing in second exhaust channel 506 than a flow rate of air flowing in first exhaust channel 505.

Heights of distal end portion 51 and intermediate portion 52 of body part 501A, a height of external cylinder part 501B, and a connection position between external cylinder part 501B and second exhaust channel 506 are appropriately determined such that clearance 58 and second exhaust channel 506 can communicate with each other in a state that body part 501A is located lowest with respect to external cylinder part 501B.

More specifically, in the state that body part 501A is located lowest with respect to external cylinder part 501B, vacuum-sealing device body 501 and second exhaust channel 506 are configured such that opening 506A of second exhaust channel 506 opened to the inner circumferential face of external cylinder part 501B is located below rear end portion 53 of body part 501A to allow communication between clearance 58 and second exhaust channel 506.

Furthermore, while the other end of second exhaust channel 506 is connected to first exhaust channel 505 according to the mode of the present exemplary embodiment presented by way of example, the manner of connection of the present disclosure is not limited to this example. For example, in a different adoptable mode, the other end of second exhaust channel 506 may be connected to a vacuum pump different from vacuum pump 502.

Any modes of driver 503 may be adopted as long as each of body part 501A and external cylinder part 501B can be independently driven by driver 503. For example, driver 503 may have a mechanism utilizing gas pressure, oil pressure, a servomotor or the like.

Any modes of heater 504 may be adopted as long as distal end portion 51 of body part 501A can be heated by heater 504. For example, heater 504 may be constituted by an electric heater.

Any modes of controller 510 may be adopted as long as respective devices constituting vacuum-sealing device 500 can be controlled by controller 510. Controller 510 includes an arithmetic processing unit such as a microprocessor and a central processing unit (CPU), a storage unit constituted by a memory or the like and storing programs under which respective control operations are executed, and a clock unit. Controller 510 performs various controls for vacuum-sealing device 500 under predetermined control programs stored in the storage unit and read and executed by the arithmetic processing unit.

Controller 510 may be constituted not only by a single controller but also by a group of controllers. In case of controller 510 constituted by a group of controllers, a plurality of controllers control vacuum-sealing device 500 in cooperation with each other. In addition, controller 510 may be constituted by a microcontroller, or by a micro-processing unit (MPU), a programmable logic controller (PLC), a logic circuit or the like.

Respective steps of the method for manufacturing gas barrier container 402 are now described with reference to FIGS. 13 to 17.

Figure 13:
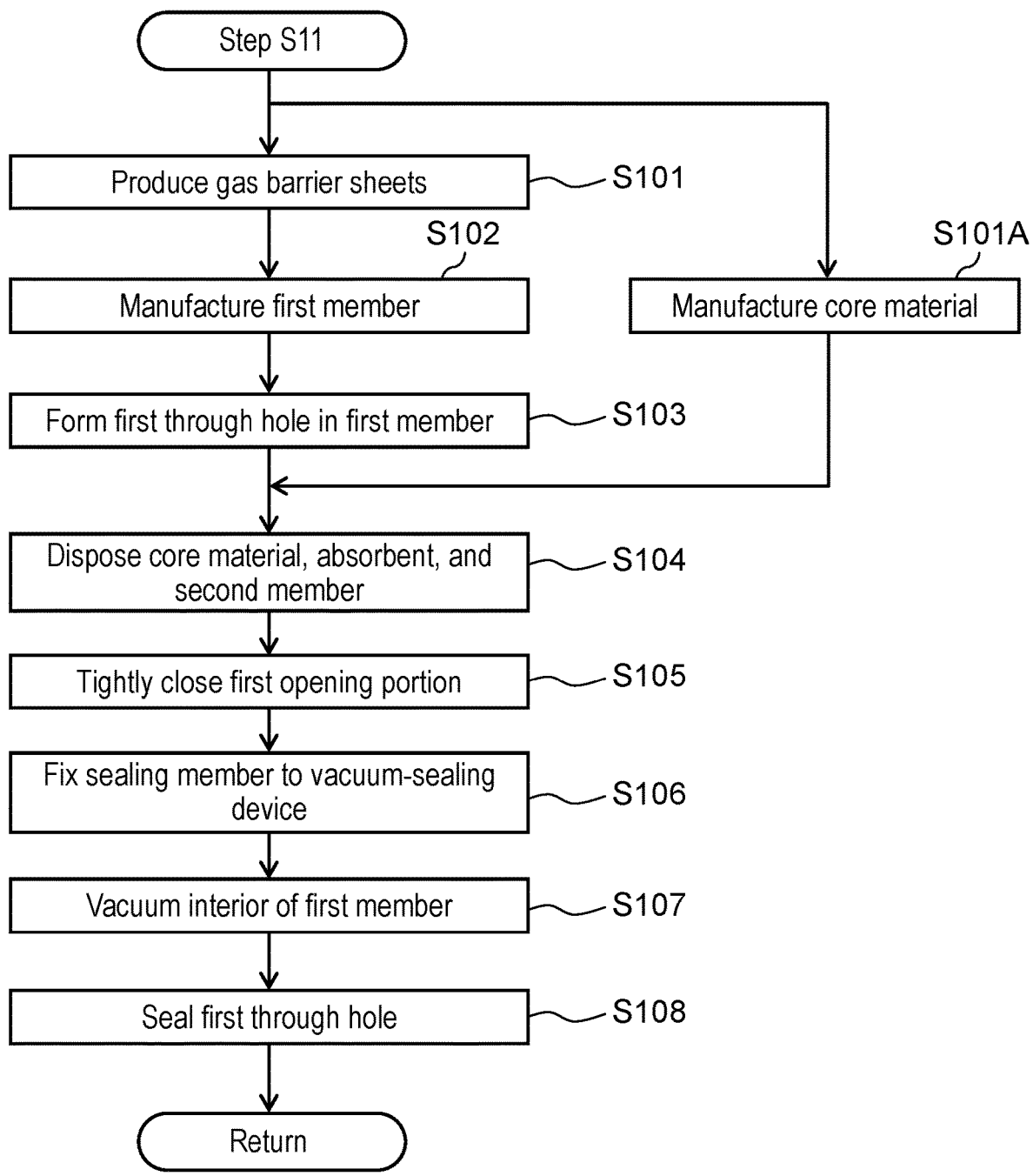
FIG. 13 is a flowchart showing respective steps of step S11 shown in FIG. 11 (a method for manufacturing the gas barrier container).
Figure 14:
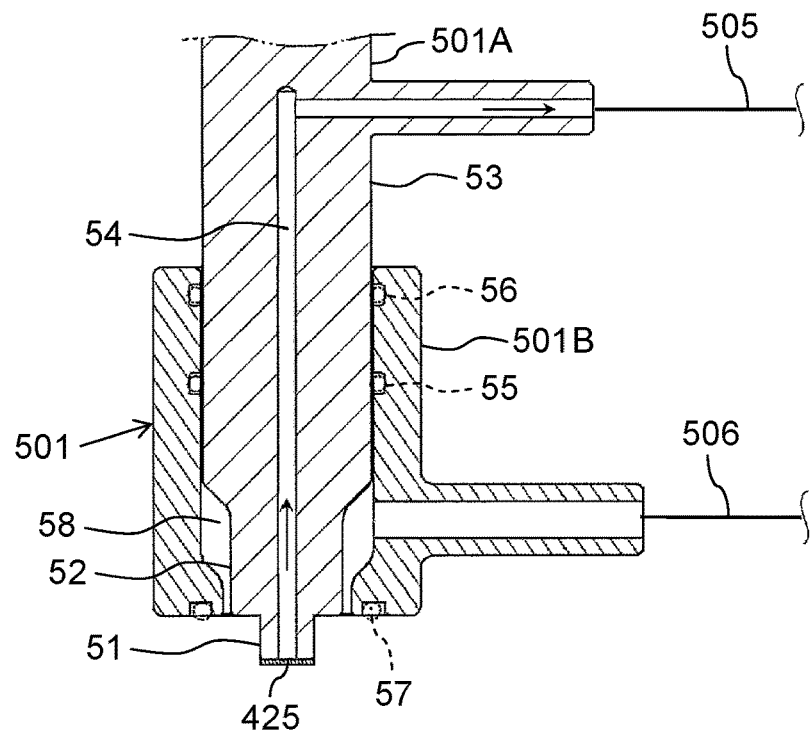
FIG. 14 is a schematic view illustrating a manufacturing step performed in step S106 (a step for fixing a sealing member to the vacuum-sealing device) shown in FIG. 13.
Figure 15:
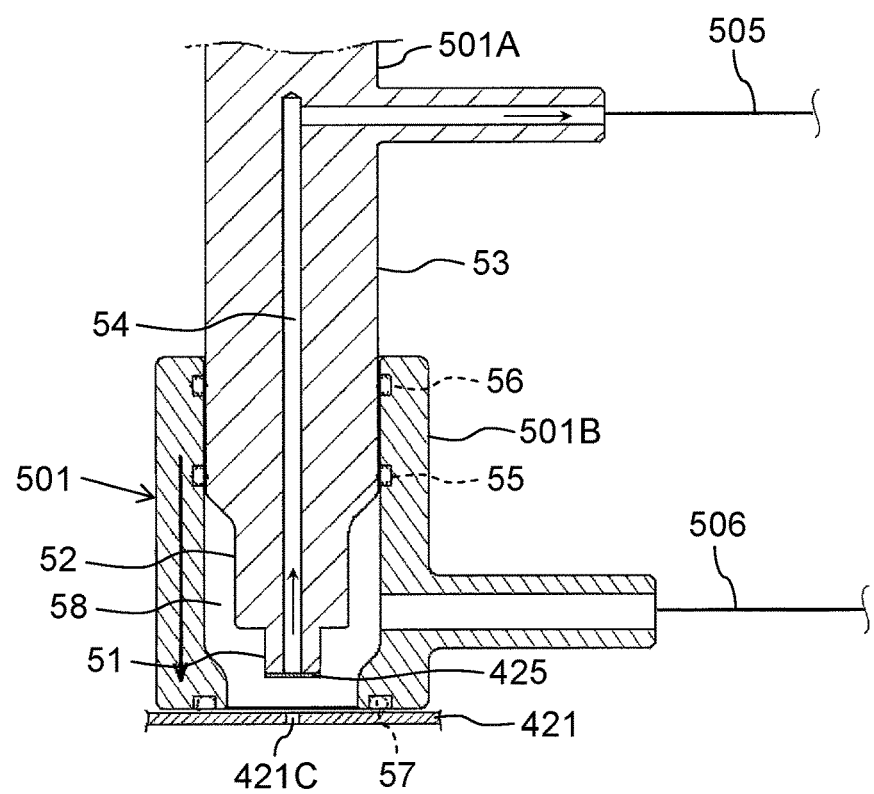
FIG. 15 is a schematic view illustrating a manufacturing step performed in step S107 (a step for vacuuming an interior of a first member) shown in FIG. 13.
Figure 16:
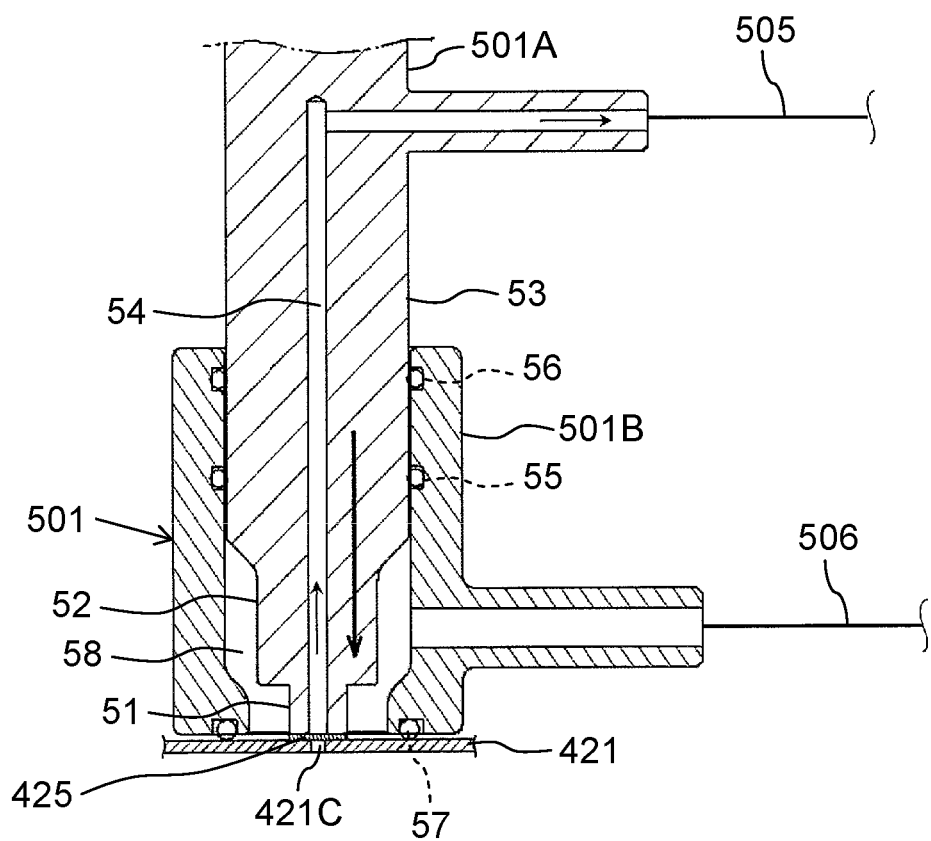
FIG. 16 is a schematic view illustrating a manufacturing step performed in step S108 (a step for sealing a first through hole) shown in FIG. 13.

FIG. 13 is a flowchart showing respective steps of the method for manufacturing the gas barrier container shown in FIG. 11. FIG. 14 is a schematic view illustrating a manufacturing step performed in step S106 (a step for fixing the sealing member to the vacuum-sealing device) shown in FIG. 13. FIG. 15 is a schematic view illustrating a manufacturing step performed in step S107 (a step for vacuuming an interior of first member) shown in FIG. 13. FIG. 16 is a schematic view illustrating a manufacturing step performed in step S108 (a step for sealing the first through hole) shown in FIG. 13.

As shown in FIG. 13, gas barrier sheets are initially produced (step S101). The gas barrier sheets produced herein include gas barrier layer 23 disposed between first resin layer 21 and second resin layer 22 both made of thermoplastic resin. Gas barrier layer 23 contains organic resin, and 2% to 14% by weight of scaly inorganic material.

More specifically, sheets constituting respective layers of first resin layer 21, second resin layer 22, and gas barrier layer 23 are produced. These sheets are laminated, and bonded by thermocompression bonding or other methods. As a result, gas barrier sheets are produced.

Each of first resin layer 21 and second resin layer 22 may be constituted by a known non-oriented polypropylene film when each of first resin layer 21 and second resin layer 22 is made of polypropylene, for example. For manufacturing gas barrier layer 23, sheets or films are produced by adding 2% to 14% by weight of montmorillonite, which is an example of the scaly inorganic material, to ethylene-vinyl alcohol copolymer, which is an example of the organic resin, by a known manufacturing method. The montmorillonite may have a thickness ranging from 1 nm to 3 nm, and an average particle diameter ranging from 100 nm to 300 nm.

The gas barrier sheets produced in step S101 are subsequently processed into a shape identical to the shape of the inner face (inner space) of inner box 403 by vacuum molding to manufacture first member 421 having a box shape and including first opening portion 421B (step S102). First member 421 may be manufactured by pressure molding or hot press molding, for example.

First through hole 421C is subsequently formed at an appropriate position of the rear face of first member 421 (step S103). First through hole 421C may be formed by punching, for example. In manufacturing first member 421 in step S102, first through hole 421C may be formed in a metal mold of first member 421 in advance so as to produce first through hole 421C using this metal mold during manufacture of first member 421.

In parallel with steps S101 to S103, or before or after steps S101 to S103, core material 423 is manufactured (step S101A). More specifically, when core material 423 is constituted by open-cell urethane foam, open-cell urethane foam is molded into a shape identical to the shape of the inner space of first member 421 in advance to manufacture core material 423. When core material 423 is constituted by glass fibers, rock wool, alumina fibers, or polyethylene terephthalate fibers, for example, these materials are heat and compression molded to manufacture core material 423.

Core material 423 and absorbent 424 are subsequently disposed in the inner space defined by first member 421 and second member 422. Second member 422 is further disposed in such a position as to cover first opening portion 421B (step S104). Thereafter, first opening portion 421B of first member 421 is tightly closed by second member 422 (step S105).

More specifically, first opening portion 421B is tightly closed by heating a contact portion of second member 422 in contact with flange portion 421A of first member 421, and compression-bonding and welding the contact portion of second member 422 to flange portion 421A, for example. Alternatively, first opening portion 421B may be tightly closed by bonding between second member 422 and flange portion 421A by an adhesive.

Subsequently, sealing member 425 is fixed to vacuum-sealing device 500 (step S106). More specifically, the arithmetic processing unit of controller 510 (see FIG. 12) reads a predetermined control program stored in the storage unit, and executes the control program to perform following operations.

Initially, controller 510 drives the not-shown robot device to shift vacuum-sealing device body 501 to such a position that the distal end face of body part 501A comes above sealing member 425. Controller 510 subsequently closes openable valve 507 to operate vacuum pump 502. Controller 510 then operates driver 503 to shift body part 501A downward and bring the distal end face of body part 501A and sealing member 425 into contact with each other (see FIG. 14).

In this case, exhaust channel 54 has a negative inside pressure under operation of vacuum pump 502, wherefore such a state that sealing member 425 is attracted to the distal end face of body part 501A is maintained. Accordingly, sealing member 425 is fixed to vacuum-sealing device 500.

The interior of first member 421 is subsequently vacuumed by vacuum-sealing device 500 (step S107). More specifically, controller 510 drives the not-shown robot device to shift vacuum-sealing device body 501 to such a position that the distal end face of body part 501A comes above first through hole 421C of first member 421. Thereafter, controller 510 operates driver 503 to shift external cylinder part 501B downward and bring the distal end face of external cylinder part 501B and first member 421 into contact with each other. At this time, the distal end face of body part 501A (distal end portion 51) is located above the distal end face of external cylinder part 501B as illustrated in FIG. 15. Accordingly, the opening portion of the distal end face of external cylinder part 501B communicates with first through hole 421C of first member 421. Thereafter, controller 510 opens openable valve 507.

As a result, second exhaust channel 506 and vacuum pump 502 communicate with each other, allowing additional exhaust of air from second exhaust channel 506. Accordingly, vacuuming of the interior of first member 421 is achieved via first through hole 421C, the inner space of external cylinder part 501B, and second exhaust channel 506.

First through hole 421C is subsequently sealed by sealing member 425 (step S108). More specifically, when a degree of vacuum of the inner space defined by first member 421 and second member 422 reaches a predetermined degree, controller 510 drives driver 503 to shift body part 501A downward and bring sealing member 425 into contact with first member 421 as illustrated in FIG. 16. Controller 510 then operates heater 504 to heat sealing member 425 via the distal end portion of body part 501A, and thereby weld sealing member 425 to first member 421 and seal first through hole 421C by sealing member 425.

The state that the inner space defined by first member 421 and second member 422 has the predetermined degree of vacuum can be determined based on determination of whether or not a predetermined time has elapsed from the time of vacuuming of the interior of first member 421 in step S107, for example. The predetermined time herein can be calculated from a volume of the inner space of first member 421, performance (exhaust quantity) of vacuum pump 502, a channel length of first exhaust channel 505 or other conditions. Alternatively, the predetermined time can be determined beforehand based on experiments or the like.

[Advantageous Effects of Vacuum Heat Insulator and Heat Insulation Device Provided with Same]

According to vacuum heat insulator 101A and heat insulation device 100A provided with the same of the present exemplary embodiment configured as above, gas barrier sheets constituted by first resin layer 21, second resin layer 22, and gas barrier layer 23 are processed by vacuum molding to manufacture first member 421. In this case, the shape of the vacuum heat insulator to be produced can follow a complicated three-dimensional shape. Accordingly, the manufacturing step can be more simplified than a manufacturing step of a refrigerator or the like provided with a conventional vacuum heat insulating structure, wherefore reduction of manufacturing costs is achievable. This configuration further eliminates a need for combining a flat vacuum heat insulating material and foamed urethane, which has been conventionally required. Accordingly, this configuration enhances a heat insulation property of heat insulation device 100A.

In addition, the scaly inorganic material constituting gas barrier layer 23 has a thickness ranging from 1 nm to 3 nm, and an average particle diameter ranging from 100 nm to 300 nm. In this case, high gas barrier performance is achievable by addition of only a small quantity of 2% by weight of scaly inorganic material.

Moreover, according to vacuum heat insulator 101A of the present exemplary embodiment, first member 421 includes first resin layer 21 and second resin layer 22 made of polypropylene or the like and provided on one and the other surfaces, respectively, of gas barrier layer 23 constituted by organic resin to which the scaly inorganic material has been added. Accordingly, first resin layer 21 and second resin layer 22 constituted by polypropylene or the like having low moisture permeability protect organic resin contained in gas barrier layer 23 and having poor resistance to moisture, thereby enhancing durability of first member 421.

Furthermore, when gas barrier container 402 is only required to have a heat insulation property equivalent to a heat insulation property of a conventional gas barrier container, an internal volume of the heat insulation device (refrigerator) can be raised by thickness reduction of vacuum heat insulator 101A allowed in this situation.

As described above, vacuum heat insulator 101A according to the first exemplary embodiment of the present disclosure includes core material 423, gas barrier container 402 inside of which core material 423 is disposed, inner box 403 inside of which gas barrier container 402 is disposed, and external plate 401 that closes an opening of inner box 403. Gas barrier container 402 includes first member 421 that has a box shape including first opening portion 421B, and second member 422 that closes first opening portion 421B. The opening of inner box 403 is constituted by second opening portion 403C. First member 421 produced by vacuum molding has such a shape that an outer face of first member 421 fits with an inner face of inner box 403. This configuration produces a vacuum heat insulator capable of following a complicated three-dimensional shape while securing sufficient gas barrier and heat insulation properties.

According to vacuum heat insulator 101A of the first exemplary embodiment of the present disclosure presented by way of example, first member 421 may include first resin layer 21 and second resin layer 22 each made of thermoplastic resin, and gas barrier layer 23 disposed between first resin layer 21 and second resin layer 22, and including organic resin and scaly inorganic material. According to this configuration, first resin layer 21 and second resin layer 22 each made of polypropylene or the like having low moisture permeability protect the organic resin of gas barrier layer 23 that has poor resistance to moisture, thereby enhancing durability of first member 421.

Furthermore, according to vacuum heat insulator 101A of the first exemplary embodiment of the present disclosure, the organic resin may be an ethylene-vinyl alcohol copolymer or a polyvinyl alcohol copolymer.

According to vacuum heat insulator 101A of the first exemplary embodiment of the present disclosure, core material 423 may be made of open-cell urethane foam.

According to vacuum heat insulator 101A of the first exemplary embodiment of the present disclosure, first member 421 may include first through hole 421C through which an interior of gas barrier container 402 is vacuumed.

According to vacuum heat insulator 101A of the first exemplary embodiment of the present disclosure, gas barrier container 402 may further include sealing member 425 that seals first through hole 421C of first member 421.

In addition, the scaly inorganic material constituting gas barrier layer 23 has a thickness ranging from 1 nm to 3 nm, and an average particle diameter ranging from 100 nm to 300 nm. In this case, high gas barrier performance is achievable by addition of only a small quantity of 2% by weight of scaly inorganic material.

Furthermore, when gas barrier container 402 is only required to have a heat insulation property equivalent to a heat insulation property of a conventional gas barrier container, an internal volume of heat insulation device 100A (e.g., refrigerator) can be raised by thickness reduction of vacuum heat insulator 101A allowed in this situation.

Furthermore, heat insulation device 100A according to the first exemplary embodiment of the present disclosure includes a heat insulating wall that houses vacuum heat insulator 101A having any one of the above configurations in the first exemplary embodiment. When vacuum heat insulator 101A configured as above is applied to a heat insulating wall of a heat insulation device or the like, simplification of a manufacturing step, and therefore reduction of manufacturing costs are achievable in comparison with a heat insulation device including a conventional vacuum heat insulating structure, such as a refrigerator. Moreover, when vacuum heat insulator 101A thus configured is applied, such a necessity is eliminated which combines a flat vacuum heat insulating material and foamed urethane, which has been conventionally required. Accordingly, heat insulation performance of heat insulation device 100A improves.

Second Exemplary Embodiment

According to a vacuum heat insulator of a second exemplary embodiment of the present disclosure, a first member includes a first through hole through which an interior of a gas barrier container is vacuumed. An inner box is disposed at a position facing the first through hole. The inner box further includes a second through hole. A boss is provided at a circumferential edge of the second through hole. The second through hole of the inner box is closed by the boss when the boss is welded. The vacuum heat insulator further includes a sealing member fixed to a portion of the second through hole of the inner box.

An example of the vacuum heat insulator according to the second exemplary embodiment of the present disclosure is hereinafter described with reference to FIGS. 17 through 24.

[Configuration of Vacuum Heat Insulator]

Figure 17:
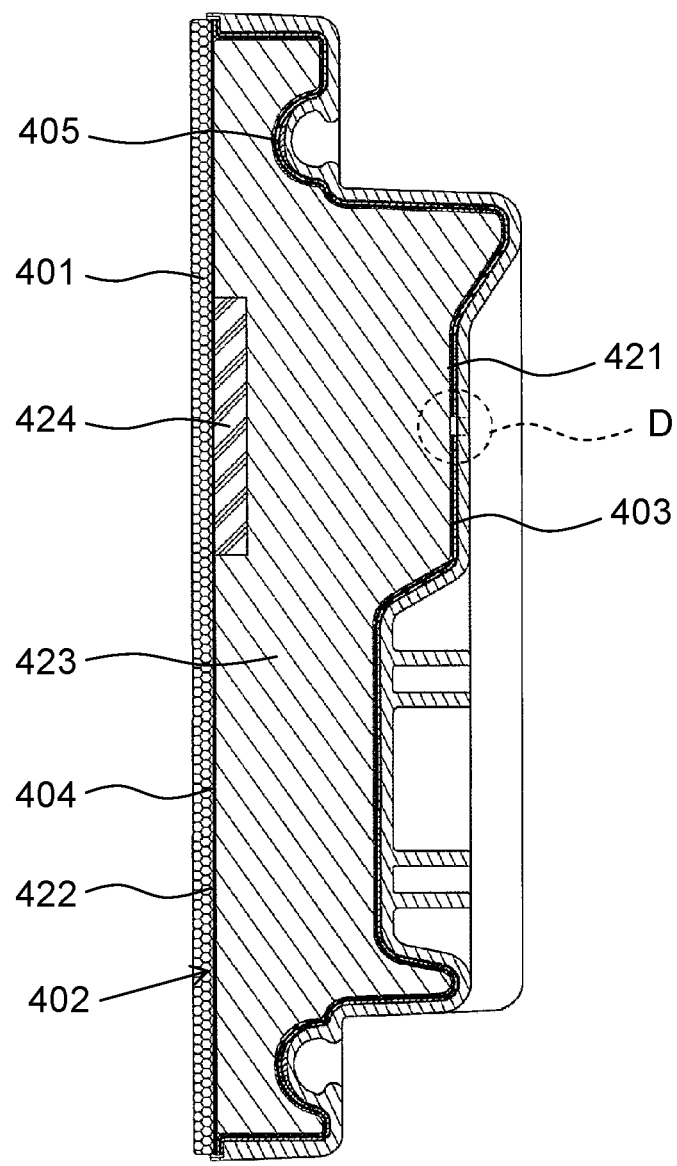
FIG. 17 is a longitudinal sectional view illustrating a general configuration of a vacuum heat insulator according to a second exemplary embodiment of the present disclosure (a cross-sectional view of the vacuum heat insulator taken in front-rear and up-down directions of the vacuum heat insulator).
Figure 18:
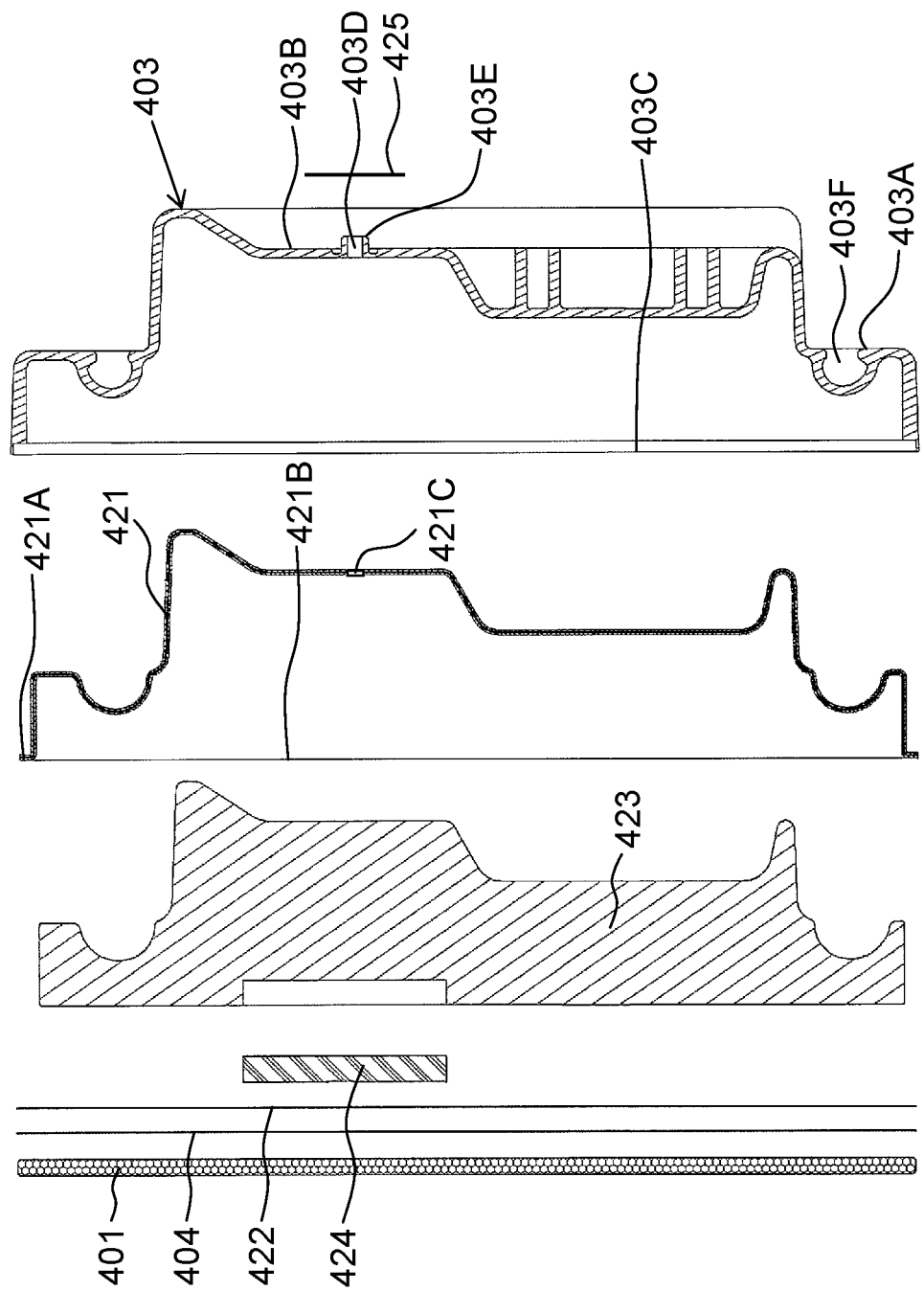
FIG. 18 is a developed view illustrating respective developed members which constitute the vacuum heat insulator according to the second exemplary embodiment of the present disclosure.
Figure 19:
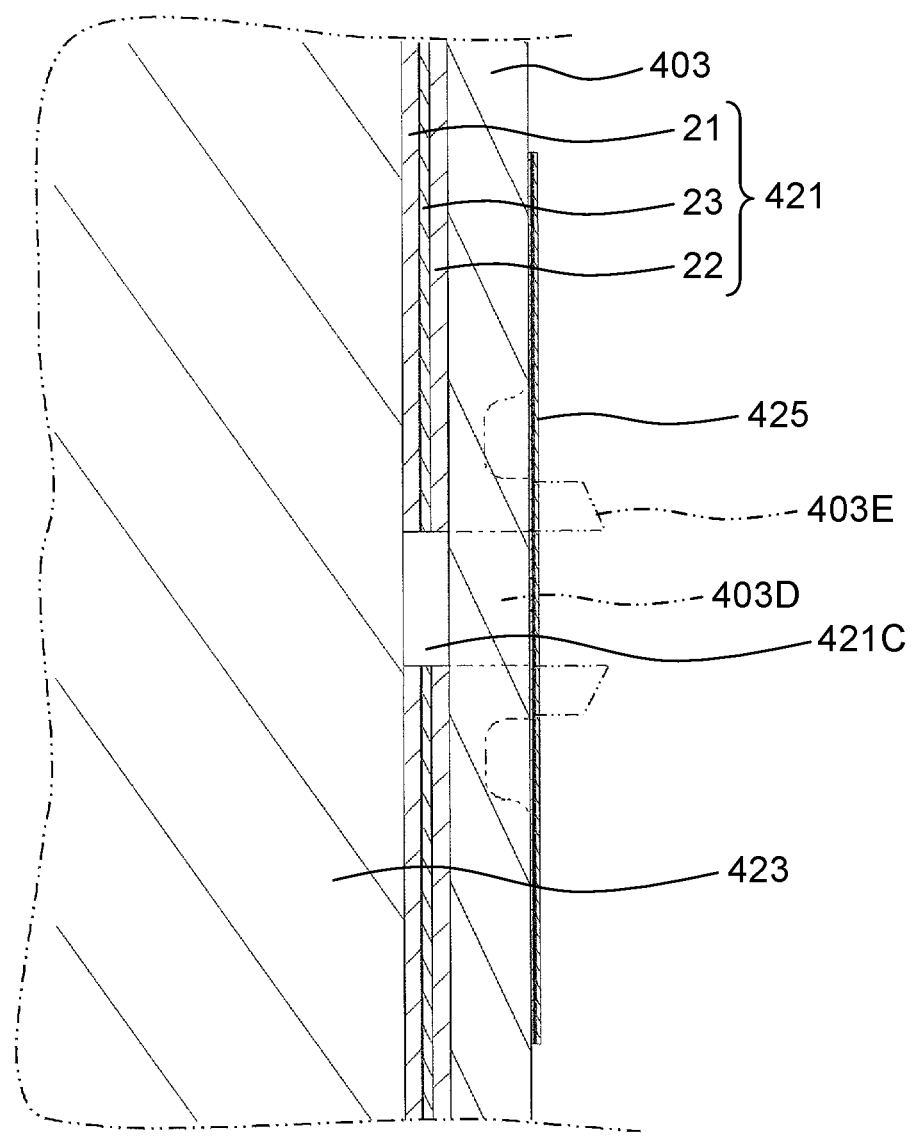
FIG. 19 is a schematic view illustrating enlarged part D shown in FIG. 17 and included in the vacuum heat insulator according to the second exemplary embodiment of the present disclosure.

FIG. 17 is a longitudinal sectional view illustrating a general configuration of the vacuum heat insulator according to the second exemplary embodiment of the present disclosure. FIG. 18 is a developed view illustrating respective developed members which constitute the vacuum heat insulator according to the second exemplary embodiment of the present disclosure. FIG. 19 is a schematic view illustrating enlarged part D shown in FIG. 17 and included in the vacuum heat insulator according to the second exemplary embodiment of the present disclosure.

As illustrated in FIGS. 17 to 19, a basic configuration of vacuum heat insulator 101B according to the present exemplary embodiment is similar to the basic configuration of vacuum heat insulator 101A according to the first exemplary embodiment. However, following points are different.

According to vacuum heat insulator 101B of the present exemplary embodiment, second through hole 403D is formed in second main face 403B of inner box 403 at a portion facing first through hole 421C of first member 421. Boss 403E is further provided at a circumferential edge of second through hole 403D as illustrated in FIG. 18. Boss 403E is heated and welded during manufacture of vacuum heat insulator 101B to close second through hole 403D by boss 403E. Boss 403E is configured to have a height, a thickness and other dimensions sufficient for closing second through hole 403D.

According to vacuum heat insulator 101B of the present exemplary embodiment, sealing member 425 is fixed to second main face 403B in such a manner as to seal second through hole 403D.

[Method for Manufacturing Vacuum Heat Insulator]

A method for manufacturing vacuum heat insulator 101B according to the present exemplary embodiment is now described with reference to FIGS. 17 to 24.

Figure 20:
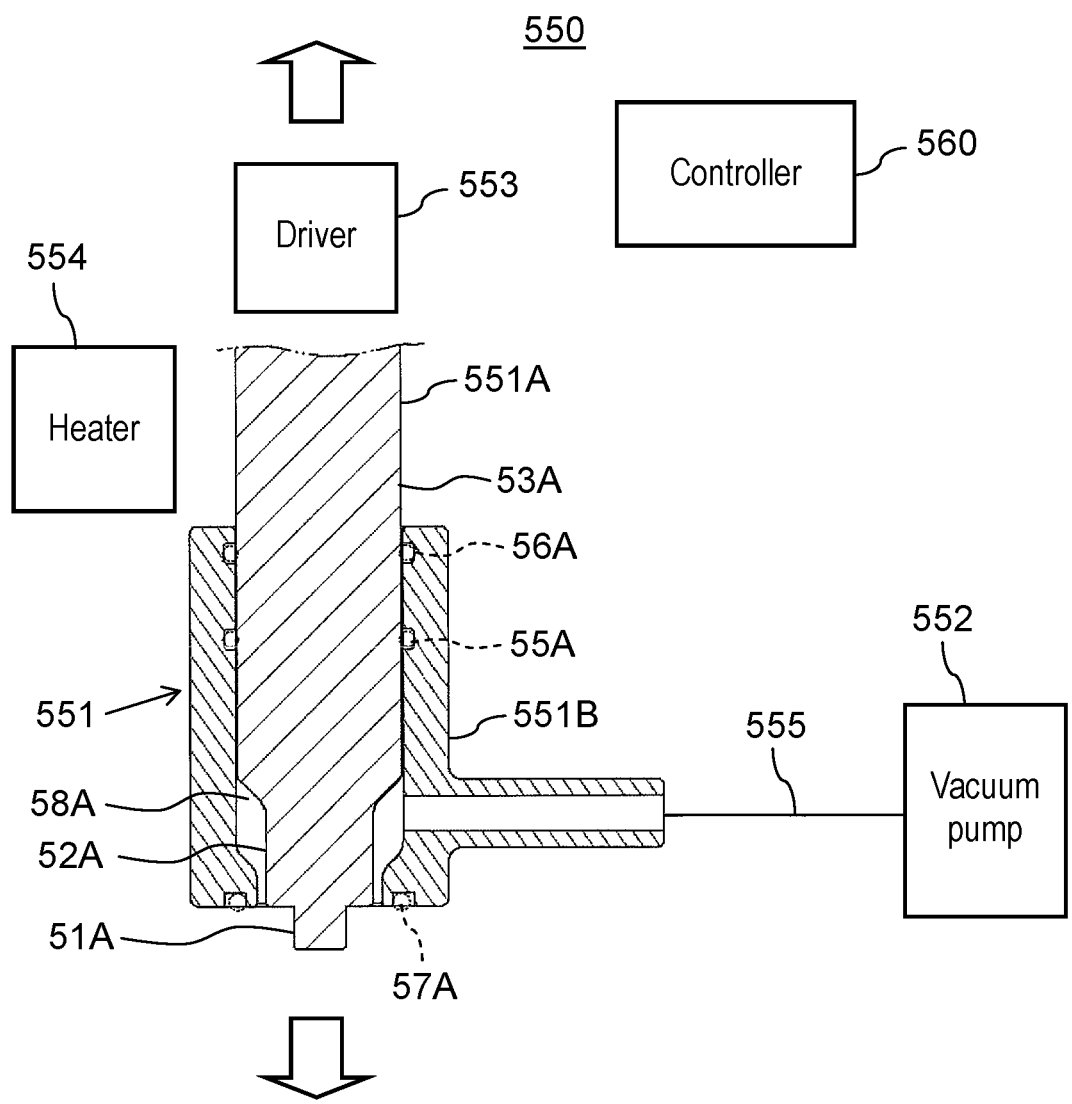
FIG. 20 is a schematic view illustrating a general configuration of a vacuum-sealing device used to manufacture the vacuum heat insulator according to the second exemplary embodiment of the present disclosure.

Discussed initially with reference to FIG. 20 is an example of a vacuum-sealing device used to manufacture gas vacuum heat insulator 101B according to the present exemplary embodiment.

FIG. 20 is a schematic view illustrating a general configuration of the vacuum-sealing device used to manufacture the vacuum heat insulator according to the second exemplary embodiment of the present disclosure. Concerning an up-down direction of vacuum-sealing device 550, an upward direction and a downward direction of vacuum-sealing device 550 correspond to an upward direction and a downward direction as viewed in FIG. 20 as indicated by arrows in the figure.

As illustrated in FIG. 20, vacuum-sealing device 550 includes vacuum-sealing device body 551, vacuum pump 552, driver 553, heater 554, and controller 560. Vacuum-sealing device body 551 includes body part 551A which has a substantially cylindrical shape and includes a step portion, and external cylinder part 551B which has a substantially cylindrical shape and includes a hollow portion. Vacuum-sealing device 550 is configured such that each of body part 551A and external cylinder part 551B is independently movable forward and backward by driver 553 in an up-down direction. Vacuum-sealing device 550 may be attached to an arm tip of a not-shown robot device.

Body part 551A includes distal end portion 51A, intermediate portion 52A, and rear end portion 53A. Body part 551A is configured such that a cross-sectional area of body part 551A decreases in a direction from rear end portion 53A toward distal end portion 51A. External cylinder part 551B is disposed in such a position as to surround an outer circumferential face of body part 551A. External cylinder part 551B is configured such that an inner circumferential face of outer cylinder part 551B slides on an outer circumferential face of rear end portion 53A of body part 551A. More specifically, sealing members 55A, 56A each having an annular shape are disposed on an inner circumferential face included in external cylinder part 551B and facing rear end portion 53A. Each of sealing members 55A, 56A may be constituted by an O-ring, for example.

A recess having an annular shape is formed at a distal end face of external cylinder part 551B. Sealing member 57A is further disposed at the recess. Sealing member 57A may be constituted by an O-ring, for example.

Clearance 58A is formed at least a part of a space between an inner circumferential face of external cylinder part 551B and outer circumferential faces of distal end portion 51A and intermediate portion 52A of body part 551A. An end of exhaust channel 555 is connected to external cylinder part 551B to communicate with clearance 58A. The other end of exhaust channel 555 is connected to vacuum pump 552.

Any modes of driver 553 may be adopted as long as each of body part 551A and external cylinder part 551B can be independently driven by driver 553. For example, driver 553 may have a mechanism utilizing gas pressure, oil pressure, a servomotor or the like.

Any modes of heater 554 may be adopted as long as distal end portion 51A of body part 551A can be heated by heater 554. For example, heater 554 may be constituted by an electric heater.

Any modes of controller 560 may be adopted as long as respective devices constituting vacuum-sealing device 550 can be controlled by controller 560. Controller 560 includes an arithmetic processing unit such as a microprocessor and a CPU, a storage unit constituted by a memory or the like and storing programs under which respective control operations are executed, and a clock unit. Controller 560 performs various controls for vacuum-sealing device 550 under predetermined control programs stored in the storage unit and read and executed by the arithmetic processing unit.

Controller 560 may be constituted not only by a single controller but also by a group of controllers. In case of controller 560 constituted by a group of controllers, a plurality of controllers control vacuum-sealing device 550 in cooperation with each other. In addition, controller 560 may be constituted by a microcontroller, or by an MPU, a programmable logic controller (PLC), a logic circuit or the like.

A method for manufacturing vacuum heat insulator 101B according to the present exemplary embodiment is now described with reference to FIGS. 21 through 24.

Figure 21:
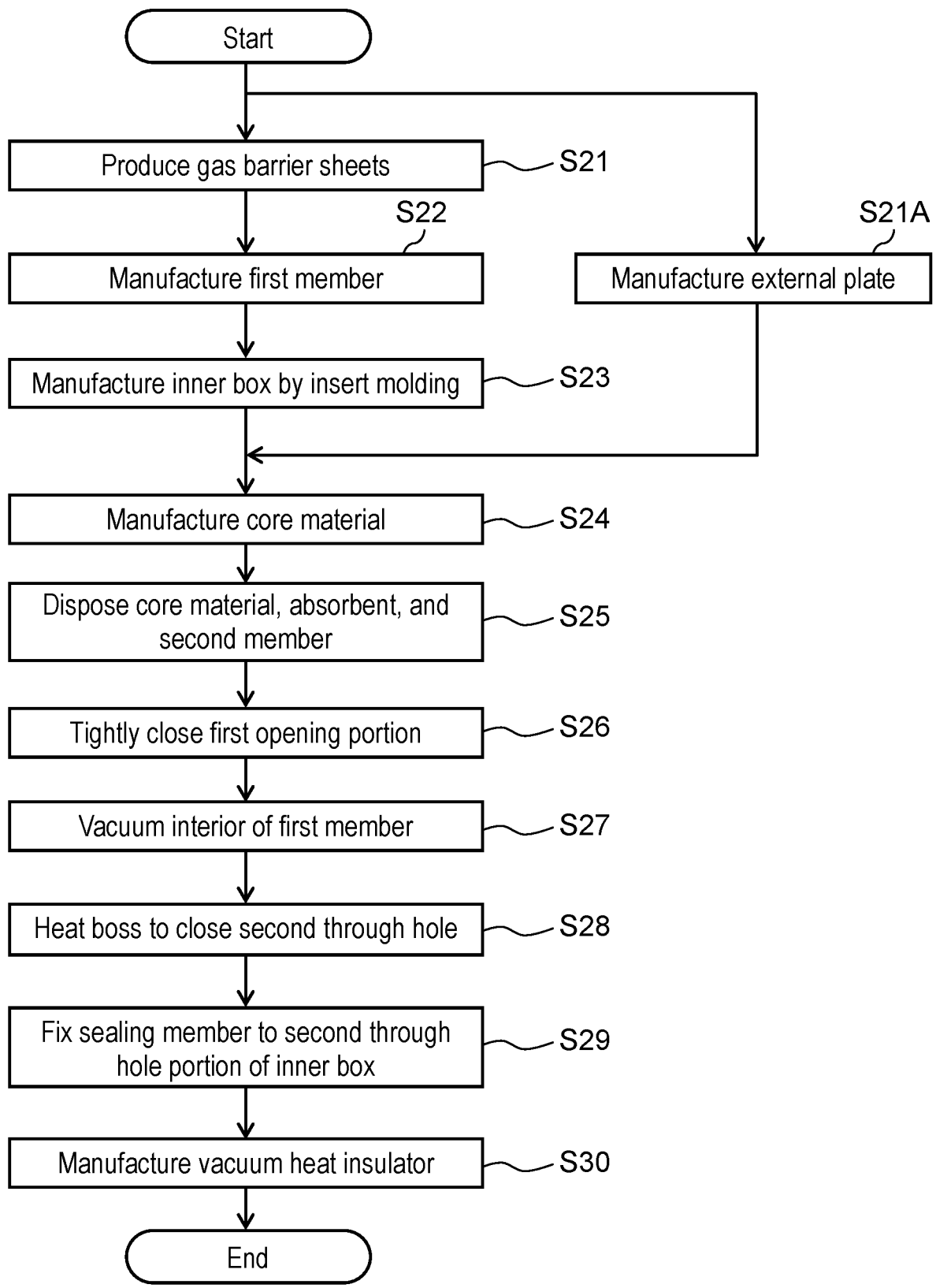
FIG. 21 is a flowchart showing respective steps of a method for manufacturing the vacuum heat insulator according to the second exemplary embodiment of the present disclosure.
Figure 22:
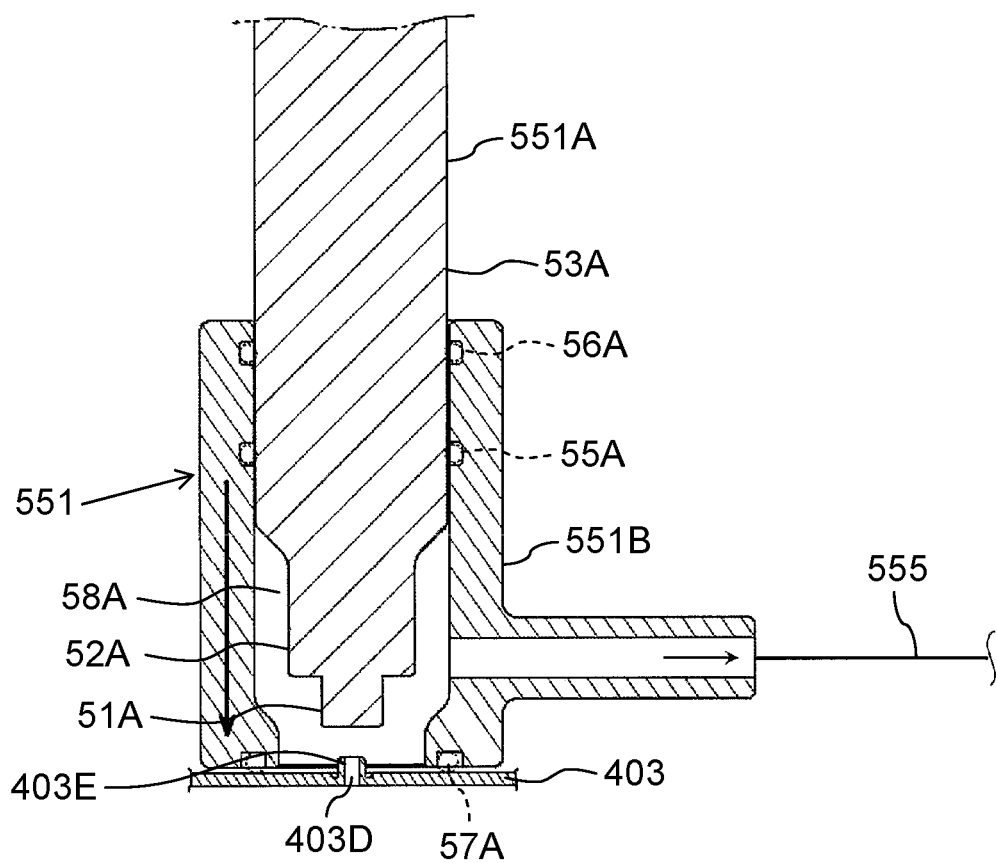
FIG. 22 is a schematic view illustrating a manufacturing step performed in step S27 (a step for vacuuming the interior of a first member) shown in FIG. 21.
Figure 23:
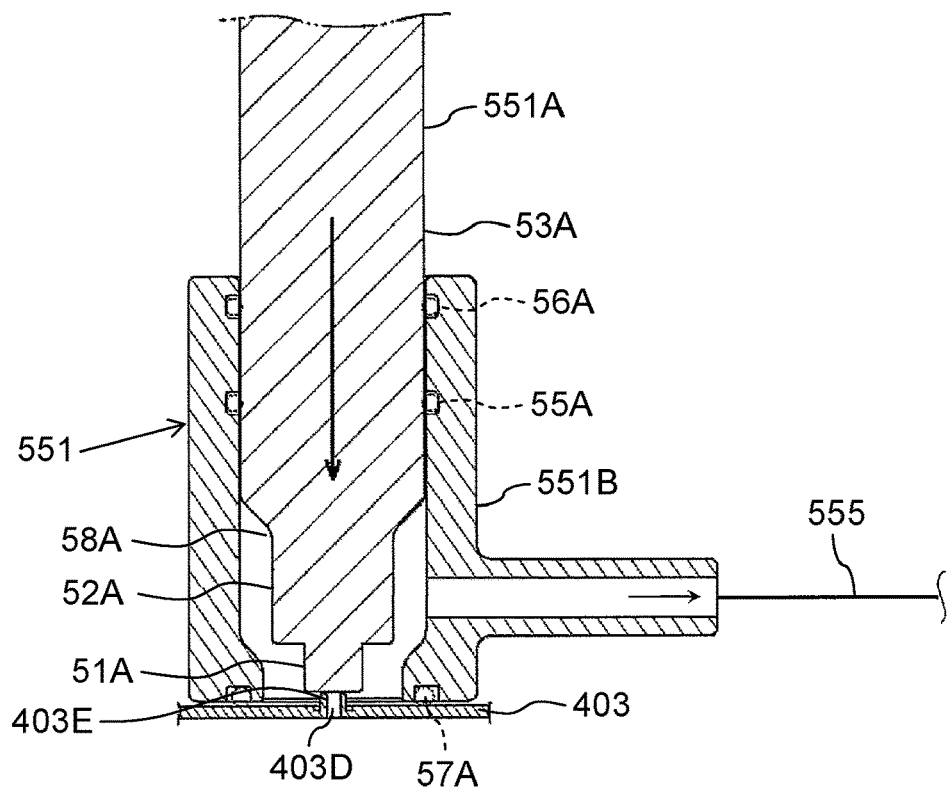
FIG. 23 is a schematic view illustrating a manufacturing step performed in step S28 (a step for heating a boss to close a second through hole) shown in FIG. 21.
Figure 24:
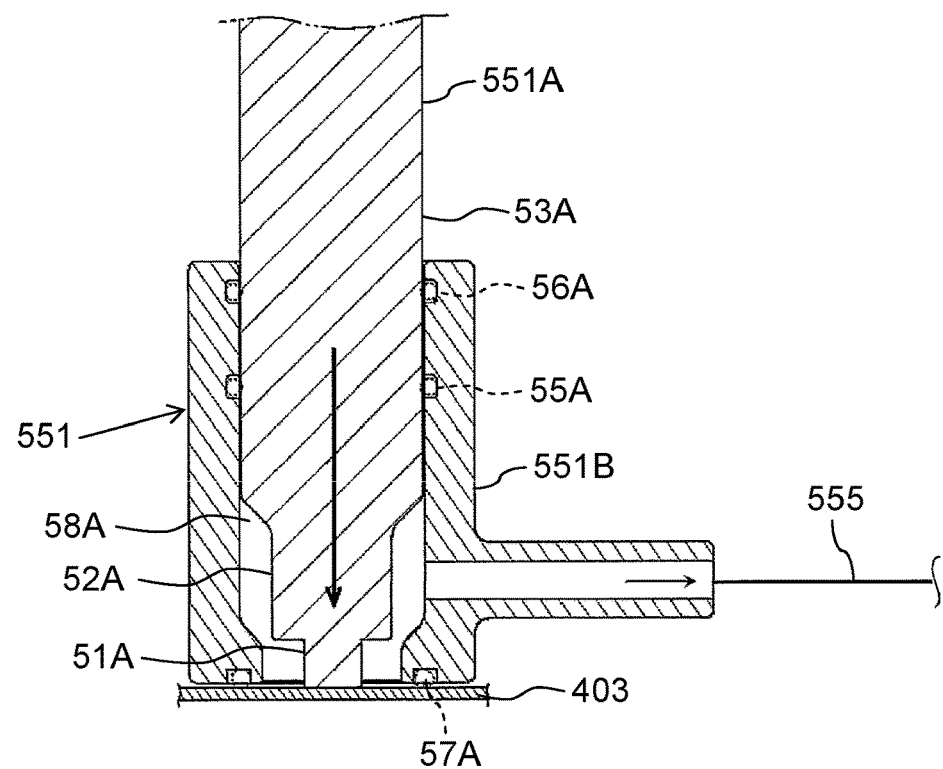
FIG. 24 is another schematic view illustrating the manufacturing step performed in step S28 (the step for heating the boss to close the second through hole) shown in FIG. 21.

FIG. 21 is a flowchart showing respective steps of the method for manufacturing the vacuum heat insulator according to the second exemplary embodiment of the present disclosure. FIG. 22 is a schematic view illustrating a manufacturing step performed in step S27 shown in FIG. 21. FIGS. 23 and 24 are schematic views each illustrating a manufacturing step performed in step S28 shown in FIG. 21.

As shown in FIG. 21, gas barrier sheets are produced (step S21). The method for manufacturing the gas barrier sheets is performed in a manner similar to the method for manufacturing gas barrier container 402 of vacuum heat insulator 101B in the first exemplary embodiment. Accordingly, this method is not repeatedly described in detail.

External plate 401 is further manufactured by cutting a glass plate or the like into pieces in an appropriate size, for example (step S21A). Either step S21 or S21A may be initially performed.

The gas barrier sheets produced in step S21 are subsequently processed into a shape identical to the shape of the inner face (inner space) of inner box 403 by vacuum molding to manufacture first member 421 having a box shape and including first opening portion 421B and first through hole 421C (step S22). First through hole 421C may be formed by punching or other methods after manufacture of first member 421.

Inner box 403 is subsequently manufactured by insert molding (step S23). More specifically, first member 421 is placed in a metal mold used for manufacturing inner box 403. Resin such as thermoplastic resin constituting inner box 403 is poured into the metal mold to manufacture inner box 403 including second through hole 403D and boss 403E.

Second through hole 403D may be formed by using a metal mold including second through hole 403D, or punching second through hole 403D, for example, after insert molding.

According to the mode of the present exemplary embodiment presented by way of example, first member 421 and inner box 403 are joined to each other by insert molding. However, in a different adoptable mode, first member 421 and inner box 403 may be joined (bonded) to each other by an adhesive or the like.

Core material 423 is subsequently manufactured (step S24). A method for manufacturing core material 423 is similar to the corresponding method of the first exemplary embodiment. Accordingly, details of the method are not repeatedly described herein.

Core material 423 and absorbent 424 are subsequently disposed in an inner space defined by first member 421 and second member 422. Second member 422 is further disposed in such a position as to cover first opening portion 421B (step S25). Thereafter, first opening portion 421B of first member 421 is tightly closed by second member 422 (step S26).

More specifically, first opening portion 421B is tightly closed by heating a contact portion of second member 422 in contact with flange portion 421A of first member 421, and compression-bonding and welding the contact portion of second member 422 to flange portion 421A, for example. Alternatively, first opening portion 421B may be tightly closed by bonding second member 422 and flange portion 421A by an adhesive.

The inner space defined by first member 421 and second member 422 is subsequently vacuumed by vacuum-sealing device 550 (step S27). More specifically, controller 560 drives a not-shown robot device to shift vacuum-sealing device body 551 to such a position that the distal end face of vacuum-sealing device body 551 comes above first through hole 421C of first member 421 (second through hole 403D of inner box 403). Thereafter, controller 560 operates driver 553 to shift external cylinder part 551B downward and bring the distal end face of external cylinder part 551B and inner box 403 into contact with each other as illustrated in FIG. 22. Controller 560 then operates vacuum pump 552.

Accordingly, vacuuming of the inner space defined by first member 421 and second member 422 is achieved via first through hole 421C, second through hole 403D, the inner space of external cylinder part 551B (clearance 58A), and exhaust channel 555.

Boss 403E of inner box 403 is subsequently heated to close second through hole 403D (step S28). More specifically, when a degree of vacuum of the inner space defined by first member 421 and second member 422 reaches a predetermined degree, controller 560 drives driver 553 to shift body part 551A downward and bring distal end portion 51A of body part 551A into contact with boss 403E (see FIG. 23). Controller 560 subsequently operates heater 554 to heat boss 403E via distal end portion 51A of body part 551A.

As a result, resin constituting boss 403E is dissolved to close second through hole 403D (see FIG. 24).

Sealing member 425 is subsequently disposed in such a position as to cover a portion including second through hole 403D in inner box 403, and fixed to second main face 403B of inner box 403 (step S29). Fixation of sealing member 425 to second main face 403B may be achieved either by heating sealing member 425 for thermal welding, or by an adhesive.

Thereafter, vacuum heat insulator 101B is manufactured (step S30). More specifically, gas barrier container 402 and external plate 401 are bonded via sheet-shaped adhesive 404 placed on a front face of gas barrier container 402 (inner box 403) to manufacture vacuum heat insulator 101B.

Vacuum heat insulator 101B thus configured according to the present exemplary embodiment achieves advantageous effects similar to those of vacuum heat insulator 101A according to the first exemplary embodiment.

Third Exemplary Embodiment

[Configuration of Vacuum Heat Insulator]

Figure 25:
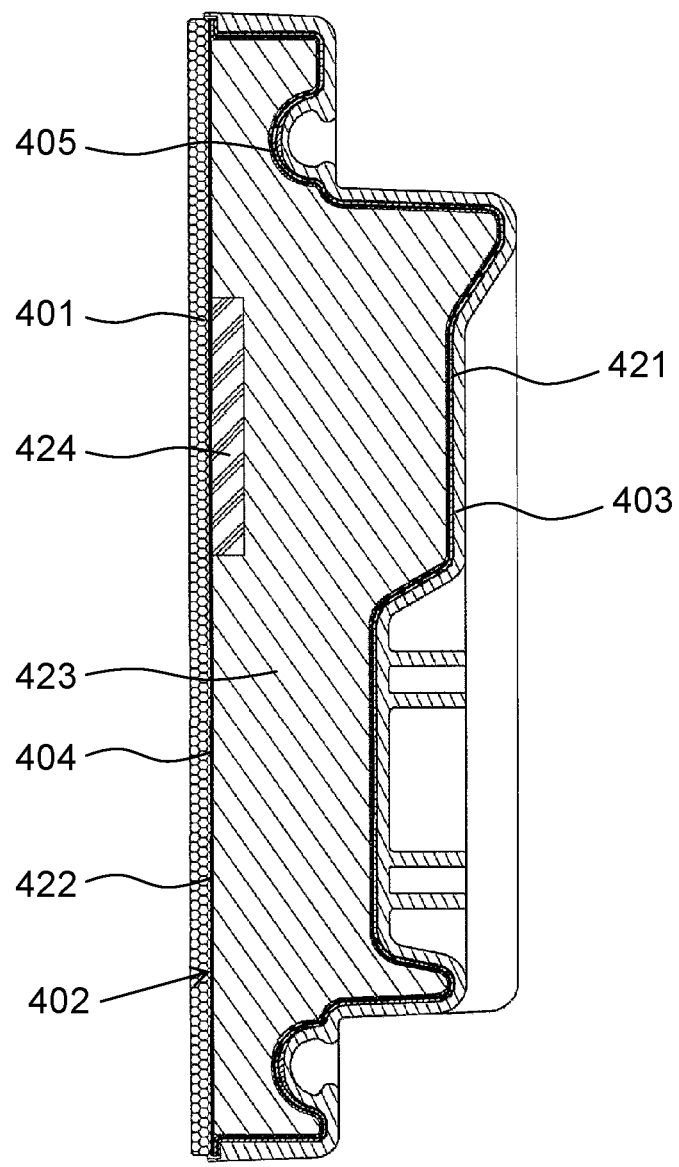
FIG. 25 is a longitudinal sectional view of a vacuum heat insulator, illustrating a general configuration of a vacuum heat insulator according to a third exemplary embodiment of the present disclosure.
Figure 26:
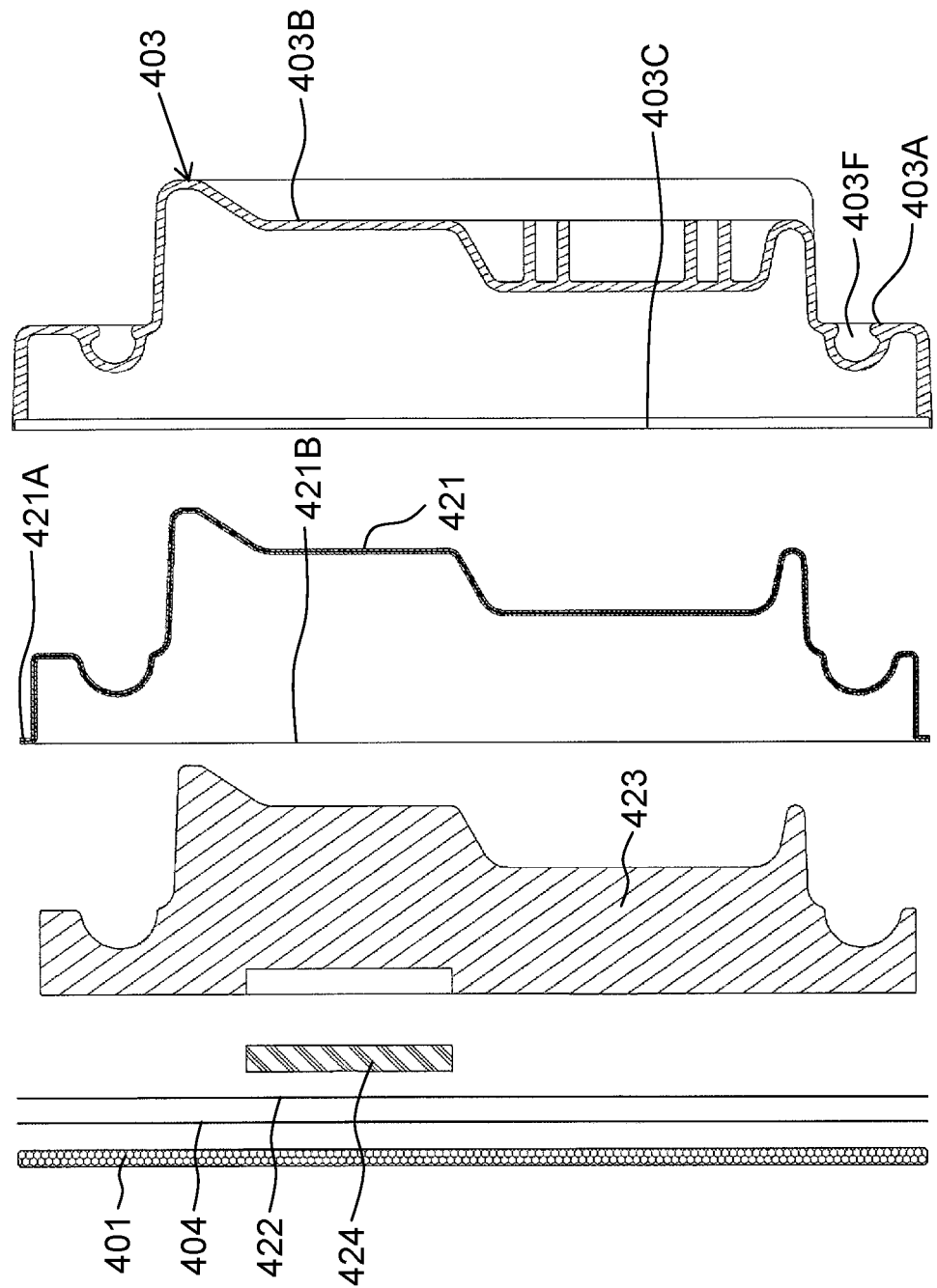
FIG. 26 is a developed view illustrating respective developed members which constitute the vacuum heat insulator according to the third exemplary embodiment of the present disclosure.

FIG. 25 is a longitudinal sectional view illustrating a general configuration of a vacuum heat insulator according to a third exemplary embodiment of the present disclosure. FIG. 26 is a developed view illustrating respective developed members which constitute the vacuum heat insulator according to the third exemplary embodiment of the present disclosure.

As illustrated in FIGS. 25 and 26, vacuum heat insulator 101C according to the third exemplary embodiment of the present disclosure has a basic configuration similar to the basic configuration of vacuum heat insulator 101A of the first exemplary embodiment. However, vacuum heat insulator 101C is different from vacuum heat insulator 101A in that first through hole 421C is not formed in first member 421, and that sealing member 425 for sealing first through hole 421C is not provided.

[Method for Manufacturing Gas Barrier Container]

Figure 27:
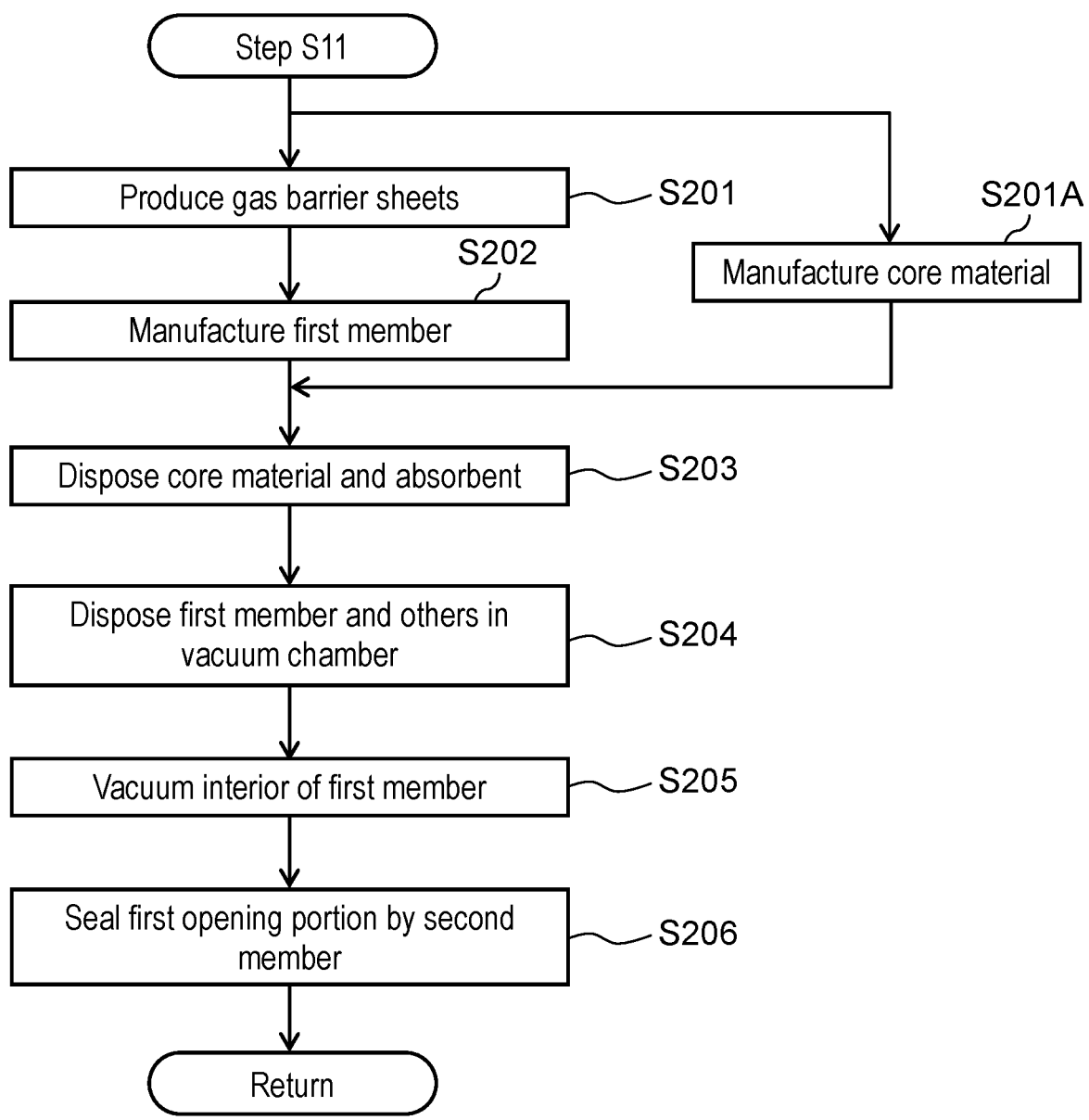
FIG. 27 is a flowchart showing respective steps of a method for manufacturing a gas barrier container of the vacuum heat insulator according to the third exemplary embodiment of the present disclosure.

Described now with reference to FIGS. 25 to 27 is a method for manufacturing gas barrier container 402 of vacuum heat insulator 101C according to the third exemplary embodiment of the present disclosure. The method for manufacturing vacuum heat insulator 101C of the third exemplary embodiment of the present disclosure is executed in a manner similar to the method for manufacturing vacuum heat insulator 101A of the first exemplary embodiment.

FIG. 27 is a flowchart showing respective steps of the method for manufacturing the gas barrier container of the vacuum heat insulator according to the third exemplary embodiment of the present disclosure.

As shown in FIG. 27, gas barrier sheets are initially produced (step S201). Core material 423 is subsequently manufactured (step S201A). Either step S201 or S201A may be initially performed. The method for manufacturing the gas barrier sheets and core material 423 is similar to the method for manufacturing the gas barrier sheets and core material 423 of gas barrier container 402 of vacuum heat insulator 101A in the first exemplary embodiment. Accordingly, this method is not repeatedly described in detail.

The gas barrier sheets produced in step S201 are subsequently processed into a shape identical to the shape of the inner face (inner space) of inner box 403 by vacuum molding to manufacture first member 421 having a box shape and including first opening portion 421B (step S202). First member 421 may be manufactured by pressure molding or hot press molding, for example.

Core material 423 and absorbent 424 are subsequently disposed in the inner space defined by first member 421 and second member 422 (step S203). Thereafter, first member 421, core material 423, and absorbent 424 are disposed in a vacuum chamber (step S204).

The interior of first member 421 is then vacuumed by vacuuming an interior of the vacuum chamber (step S205). When a degree of vacuum of the inner space defined by first member 421 and second member 422 reaches a predetermined degree, second member 422 seals first opening portion 421B of first member 421 (step S206). More specifically, first opening portion 421B is tightly closed by heating a contact portion of second member 422 in contact with flange portion 421A of first member 421, and compression-bonding and welding the contact portion of second member 422 to flange portion 421A, for example. Alternatively, first opening portion 421B may be tightly closed by bonding between second member 422 and flange portion 421A by an adhesive.

Vacuum heat insulator 101C thus configured according to the present exemplary embodiment achieves advantageous effects similar to those of vacuum heat insulator 101A according to the first exemplary embodiment.

Fourth Exemplary Embodiment

[Configuration of Vacuum Heat Insulator]

Figure 28:
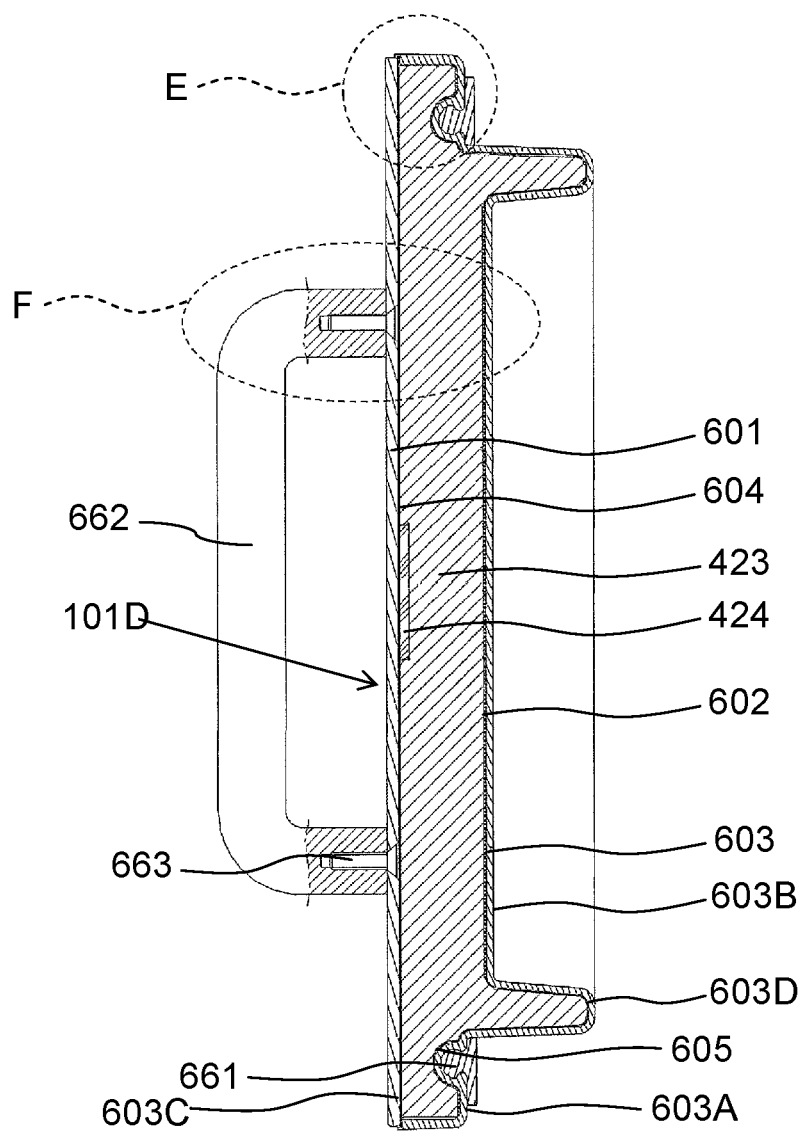
FIG. 28 is a schematic view illustrating a general configuration of a vacuum heat insulator according to a fourth exemplary embodiment of the present disclosure.
Figure 29:
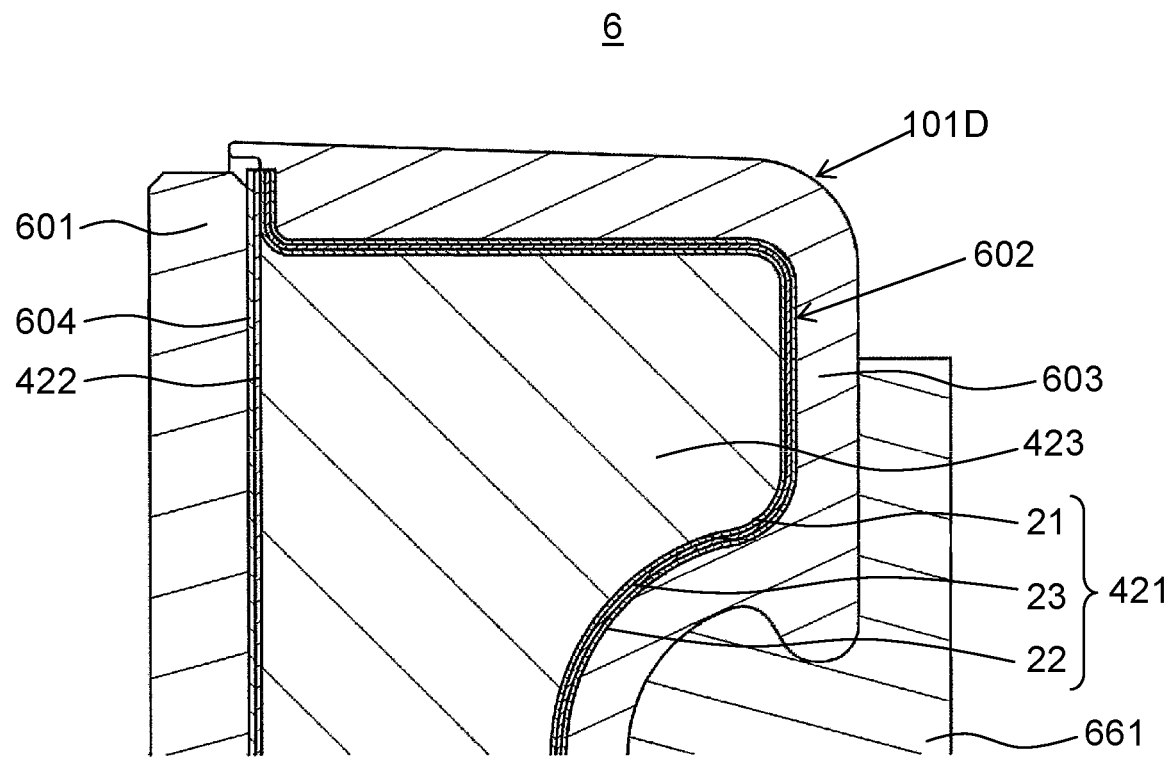
FIG. 29 is a cross-sectional view illustrating enlarged part E shown in FIG. 28 and included in the vacuum heat insulator according to the fourth exemplary embodiment of the present disclosure.

FIG. 28 is a schematic view illustrating a general configuration of a vacuum heat insulator according to a fourth exemplary embodiment of the present disclosure. FIG. 29 is a cross-sectional view illustrating enlarged part E shown in FIG. 28 and included in the vacuum heat insulator according to the fourth exemplary embodiment of the present disclosure, while FIG. 30 is a cross-sectional view illustrating enlarged part F shown in FIG. 28 and included in the vacuum heat insulator according to the fourth exemplary embodiment of the present disclosure.

Figure 30:
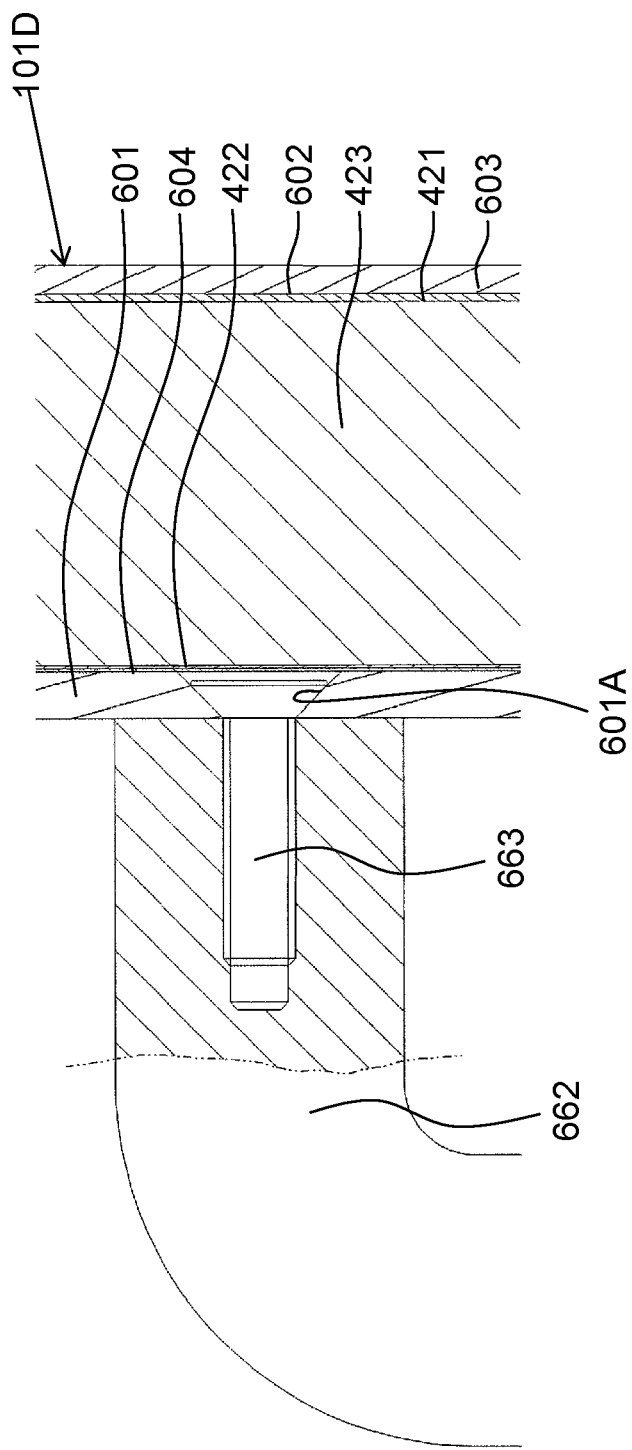
FIG. 30 is a cross-sectional view illustrating enlarged part F shown in FIG. 28 and included in the vacuum heat insulator according to the fourth exemplary embodiment of the present disclosure.

As illustrated in FIGS. 28 to 30, vacuum heat insulator 101D according to the fourth exemplary embodiment of the present disclosure constitutes a part of second freezing compartment door 6 of heat insulation device 100A illustrated in FIGS. 1 and 2. More specifically, second freezing compartment door 6 includes vacuum heat insulator 101D according to the present exemplary embodiment, gasket 661, handle 662, and screws 663 for fixing handle 662 to vacuum heat insulator 101D. Vacuum heat insulator 101D according to the present exemplary embodiment includes external plate 601, gas barrier container 602, and inner box 603 which houses gas barrier container 602.

External plate 601 has a flat plate shape, and is constituted by a glass plate or a precoated steel plate, for example. External plate 601 and gas barrier container 602 are bonded to each other by sheet-shaped (film-shaped) adhesive 604. Adhesive 604 may be constituted by modified silicone or modified polyolefin, for example.

Two through holes 601A are formed at appropriate positions of external plate 601. As illustrated in FIG. 30, each of through holes 601A has a tapered shape which has a larger opening area on the inner face side than on the outer face side so as to store a head of corresponding screw 663 in corresponding through hole 601A.

As illustrated in FIG. 28, a front face of inner box 603 is opened through an opening. More specifically, inner box 603 has a box shape which has second opening portion 603C constituting the opening of the front face. Second opening portion 603C of inner box 603 is closed by external plate 601. A rear face of inner box 603 has a stepped shape, and includes first main face 603A forming a circumferential edge portion of the rear face, and second main face 603B forming a central portion of the rear face. Gasket 661 is attached to first main face 603A of inner box 603. Projections 603D are respectively provided on one and the other end portions of second main face 603B.

Adhesive 605 is disposed on a face included in an inner face of inner box 603 and facing gas barrier container 602 (counter face). Adhesive 605 may be constituted by modified silicone, for example. Adhesive 605 may be applied to either an entire surface of the counter face of inner box 603, or a part of the counter face.

When adhesive 605 is applied to a part of the counter face of inner box 603, it is preferable that adhesive 605 covers at least a part facing gasket 661. This configuration prevents communication (flow in and out of air) between the outside and a space formed between gas barrier container 602 and inner box 603, thereby further reducing a heat absorbing load imposed on a heat insulation device (refrigerator).

Gas barrier container 602 of vacuum heat insulator 101D of the present exemplary embodiment has a configuration similar to the configuration of gas barrier container 402 of vacuum heat insulator 101A of the first exemplary embodiment. Accordingly, this configuration is not repeatedly described in detail.

Vacuum heat insulator 101D thus configured according to the present exemplary embodiment achieves advantageous effects similar to those of vacuum heat insulator 101A according to the first exemplary embodiment. Particularly, vacuum heat insulator 101D according to the present exemplary embodiment has such a complicated shape which includes projections 603D provided at both ends of second main face 603B of inner box 603. Accordingly, remarkable advantageous effects are achievable.

Fifth Exemplary Embodiment

[Configuration of Vacuum Heat Insulator]

Figure 31:
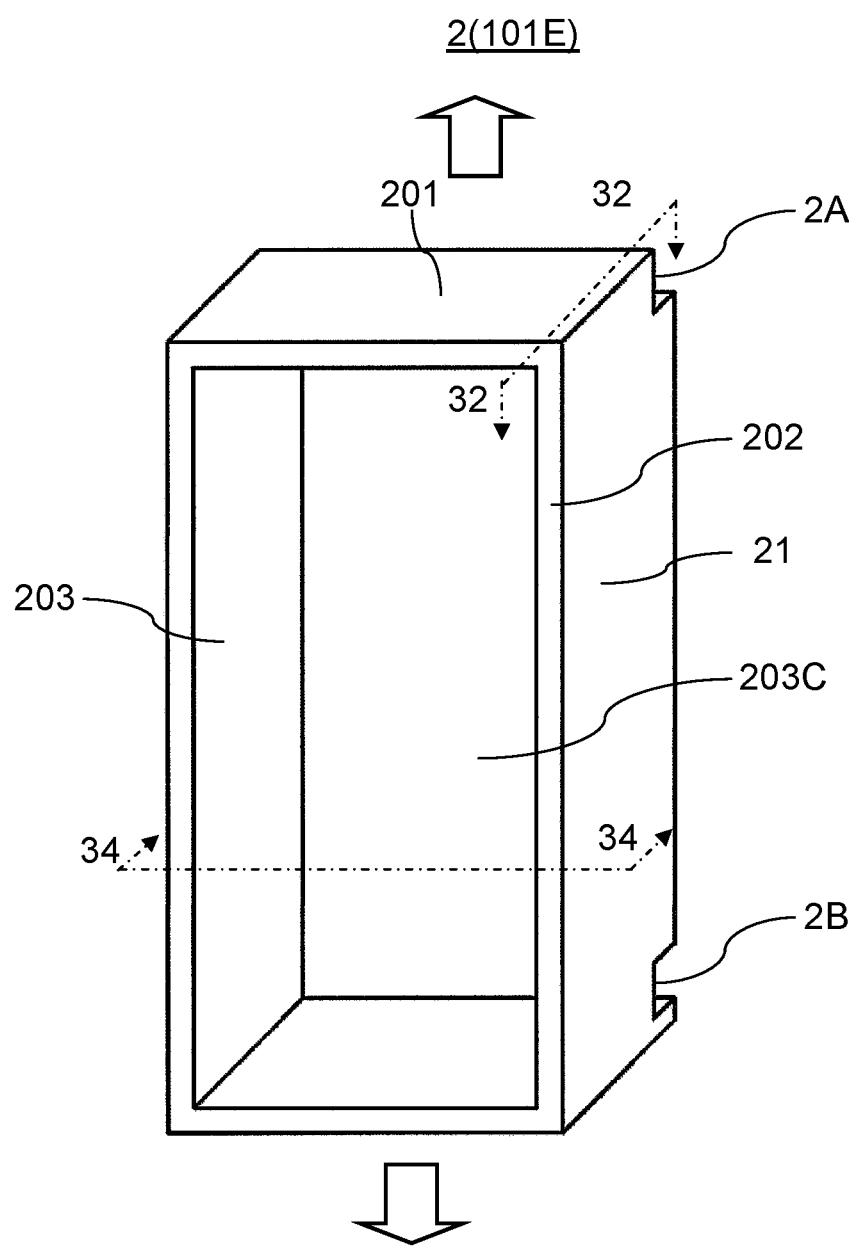
FIG. 31 is a perspective view illustrating a general configuration of a refrigerator body provided with a vacuum heat insulator according to a fifth exemplary embodiment of the present disclosure.
Figure 32:
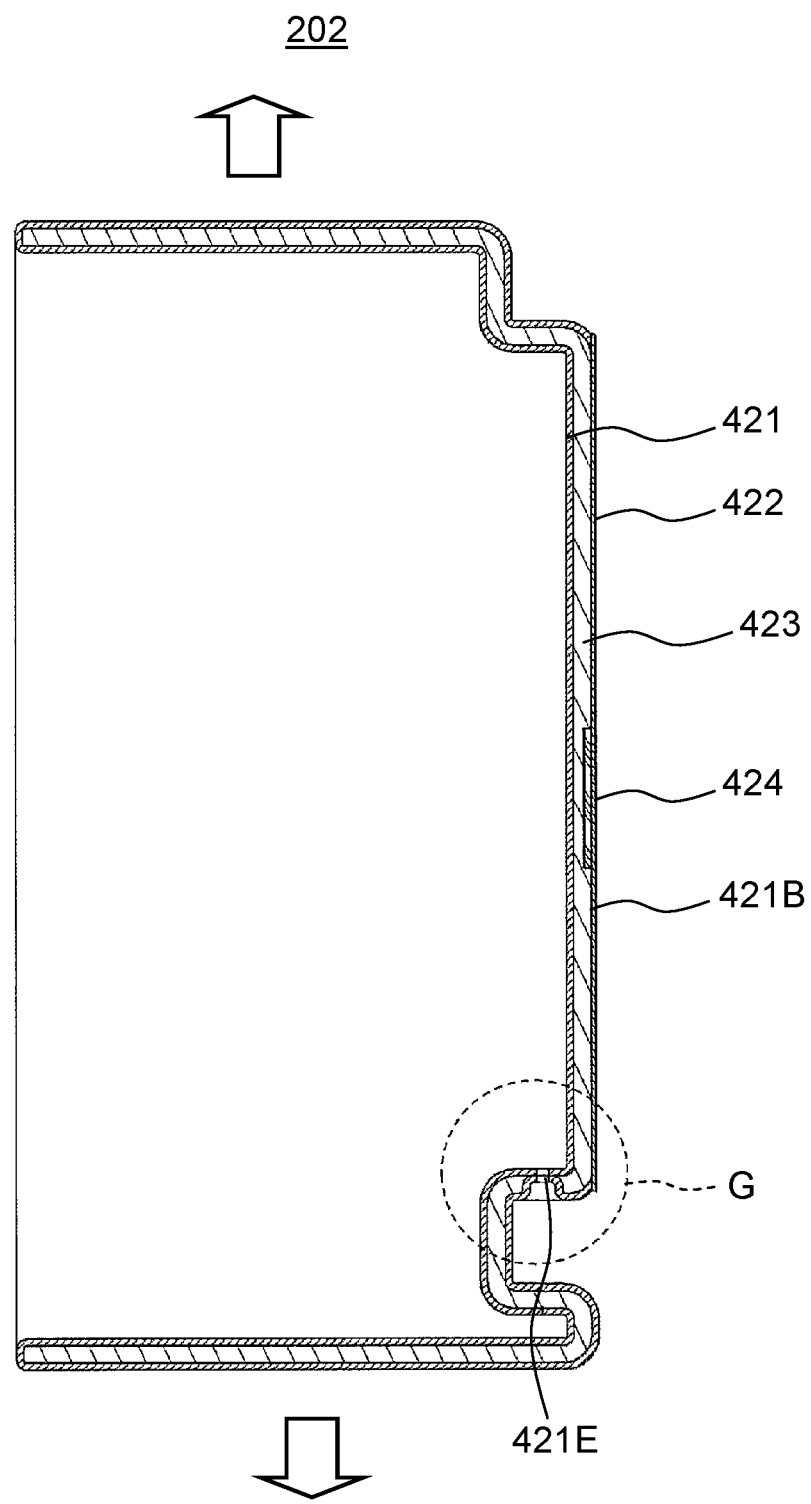
FIG. 32 is a cross-sectional view illustrating a gas barrier container of the vacuum heat insulator according to the fifth exemplary embodiment of the present disclosure, taken along line 32-32 in FIG. 31.
Figure 33:
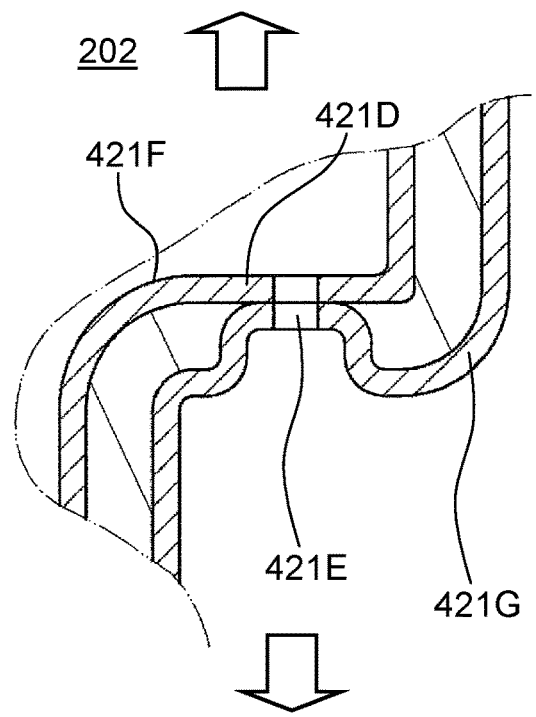
FIG. 33 is a cross-sectional view illustrating enlarged part G shown in FIG. 32 and included in the gas barrier container of the vacuum heat insulator according to the fifth exemplary embodiment of the present disclosure.
Figure 34:
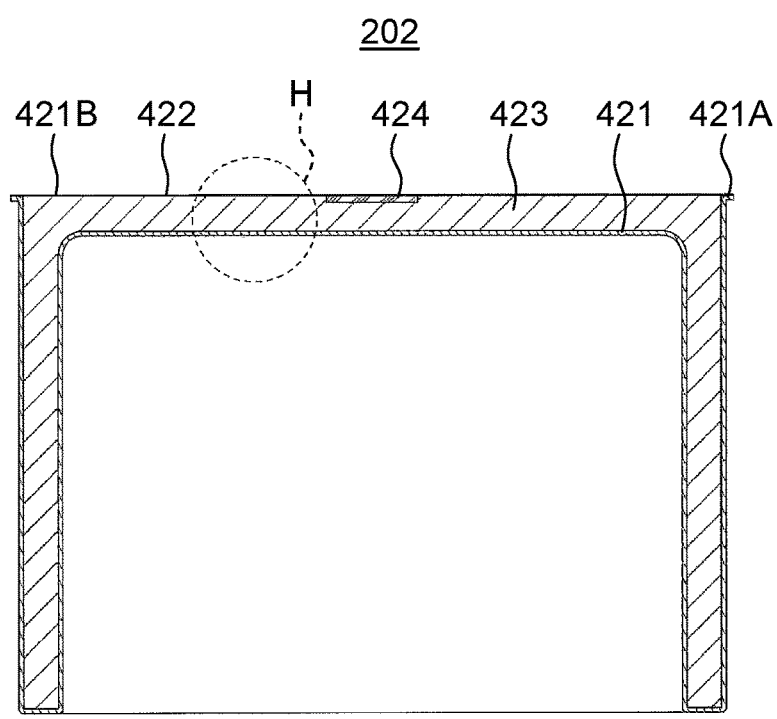
FIG. 34 is a cross-sectional view illustrating the vacuum heat insulator according to the fifth exemplary embodiment of the present disclosure, taken along line 34-34 in FIG. 31.
Figure 35:
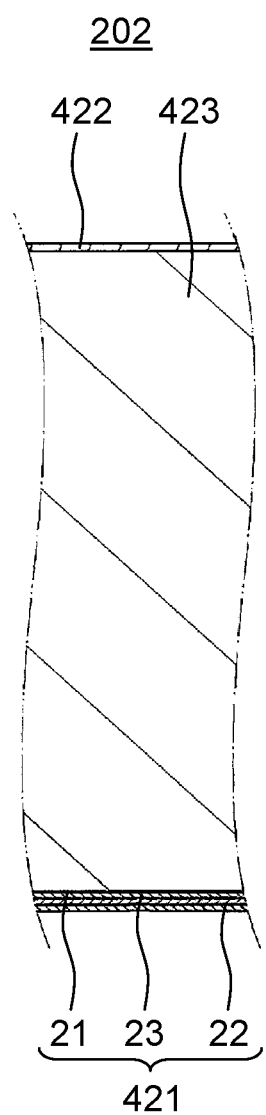
FIG. 35 is a cross-sectional view illustrating enlarged part H shown in FIG. 34 and included in the vacuum heat insulator according to the fifth exemplary embodiment of the present disclosure.
Figure 36:
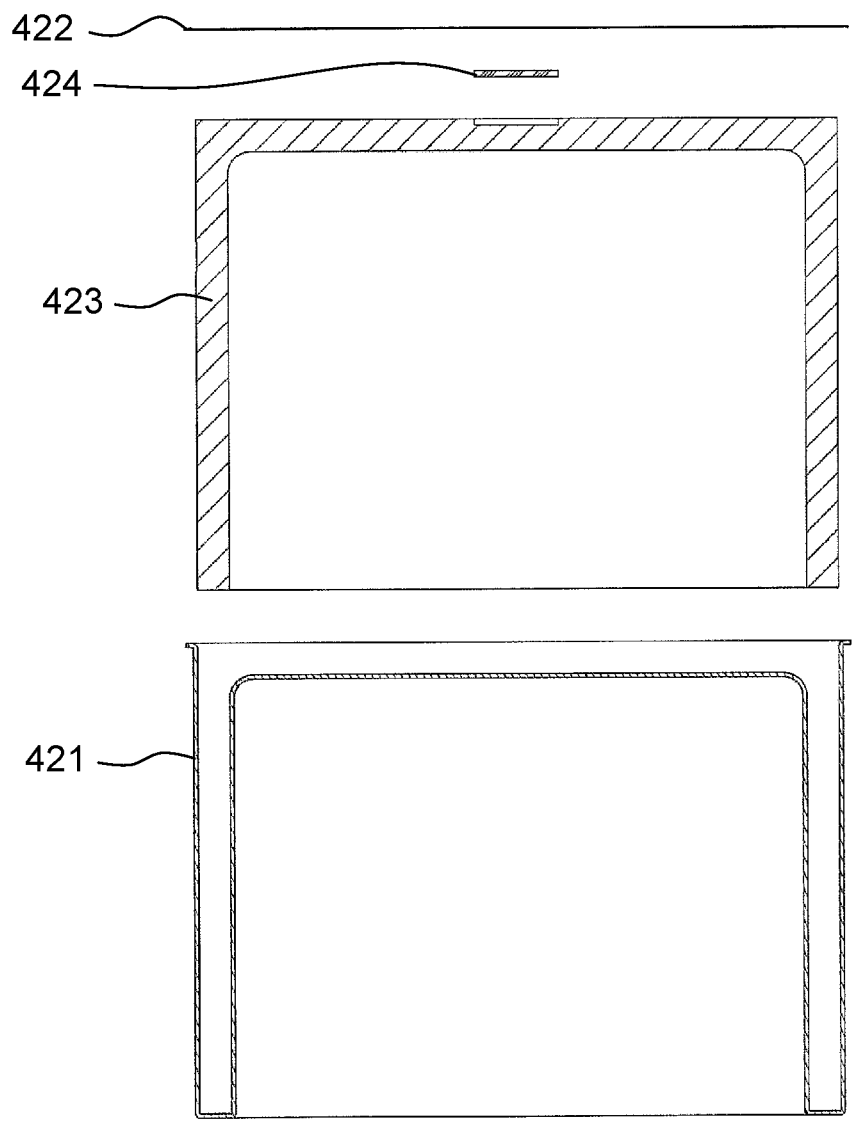
FIG. 36 is a developed view illustrating respective developed members which constitute the vacuum heat insulator according to the fifth exemplary embodiment of the present disclosure.

FIG. 31 is a perspective view illustrating a general configuration of a vacuum heat insulator (refrigerator body) according to a fifth exemplary embodiment of the present disclosure. FIG. 32 is a cross-sectional view illustrating a gas barrier container of the vacuum heat insulator according to the fifth exemplary embodiment of the present disclosure, taken along line 32-32 in FIG. 31. FIG. 33 is a cross-sectional view illustrating enlarged part G shown in FIG. 32 and included in the gas barrier container according to the fifth exemplary embodiment of the present disclosure. FIG. 34 is a cross-sectional view illustrating the vacuum heat insulator according to the fifth exemplary embodiment of the present disclosure, taken along line 34-34 in FIG. 31. FIG. 35 is a cross-sectional view illustrating enlarged part H shown in FIG. 34 and included in the vacuum heat insulator according to the fifth exemplary embodiment of the present disclosure. FIG. 36 is a developed view illustrating respective developed members which constitute the vacuum heat insulator according to the fifth exemplary embodiment of the present disclosure.

Concerning an up-down direction of refrigerator body 2, an upward direction and a downward direction of refrigerator body 2 correspond to an upward direction and a downward direction as viewed in FIG. 31 as indicated by arrows in the figure. Concerning an up-down direction of gas barrier container 202, an upward direction and a downward direction of gas barrier container 202 correspond to an upward direction and a downward direction as viewed in FIGS. 32 to 34 as indicated by arrows in the figures.

As illustrated in FIGS. 31 to 36, vacuum heat insulator 101E according to the fifth exemplary embodiment of the present disclosure constitutes a part of refrigerator body 2 of heat insulation device 100A illustrated in FIGS. 1 and 2. As illustrated in FIG. 31, vacuum heat insulator 101E according to the present exemplary embodiment includes gas barrier container 202 which has a box shape including an opened front face, external plates 201 respectively attached to five outside main faces of gas barrier container 202, and inner box 203 attached to an inner face of gas barrier container 202.

Each of external plates 201 has a flat plate shape, and is constituted by a steel plate, for example. External plates 201 and gas barrier container 202 are bonded to each other by a sheet-shaped (film-shaped) adhesive. The adhesive may be constituted by modified silicone or modified polyolefin, for example.

More specifically, inner box 203 has a front face opened via an opening, and has a box shape which includes second opening portion 203C constituting the opening of the front face. Second opening portion 203C is closed by respective doors of refrigerating compartment door 3 through second freezing compartment door 6 (see FIGS. 1 and 2).

An adhesive is disposed on a face included in an inner face of inner box 203 and facing gas barrier container 202. The adhesive may be constituted by modified silicone, for example. The adhesive may be applied to either an entire surface of the inner face of inner box 203, or a part of the inner face of inner box 203.

As illustrated in FIG. 2, refrigerator body 2 further includes through hole 210 between evaporator 9 and evaporating dish 20. More specifically, through hole 210 is formed in an upper face constituting recess 2B.

Through hole 210 is constituted by a through hole formed in an upper face constituting recess 2B of external plate 201, a through hole formed in an upper face constituting recess 2B of inner box 203, and through hole 421E formed in an upper face constituting recess 2B of gas barrier container 202 (see FIGS. 2, 32, and 33).

Through hole 421E of gas barrier container 202 may be formed in a following manner, for example. At least a part of either one of opposite portions of first member 421 constituting recess 2B of gas barrier container 202 (upper part 421F and lower part 421G in this example (see FIG. 33)) is heated to thermally weld upper portion 421F and lower portion 421G and produce thermally welded portion 421D having a planar shape. Subsequently, thermally welded portion 421D is drilled to form through hole 421E.

Gas barrier container 202 of vacuum heat insulator 101E according to the present exemplary embodiment has a basic configuration similar to the basic configuration of gas barrier container 402 of vacuum heat insulator 101A according to the first exemplary embodiment. Accordingly, this configuration is not repeatedly described in detail.

Vacuum heat insulator 101E thus configured according to the present exemplary embodiment achieves advantageous effects similar to those of vacuum heat insulator 101A according to the first exemplary embodiment.

Sixth Exemplary Embodiment

[Configuration of Vacuum Heat Insulator]

Figure 37:
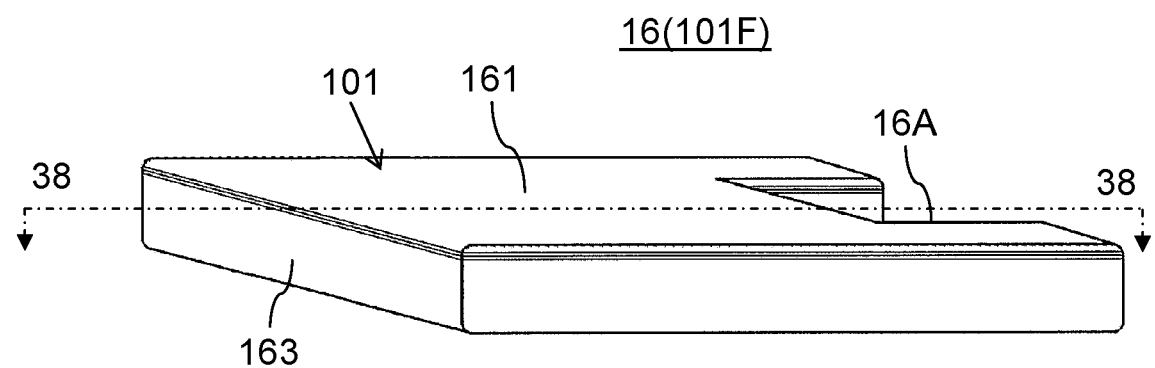
FIG. 37 is a perspective view schematically illustrating a general configuration of a vacuum heat insulator according to a sixth exemplary embodiment of the present disclosure.
Figure 38:
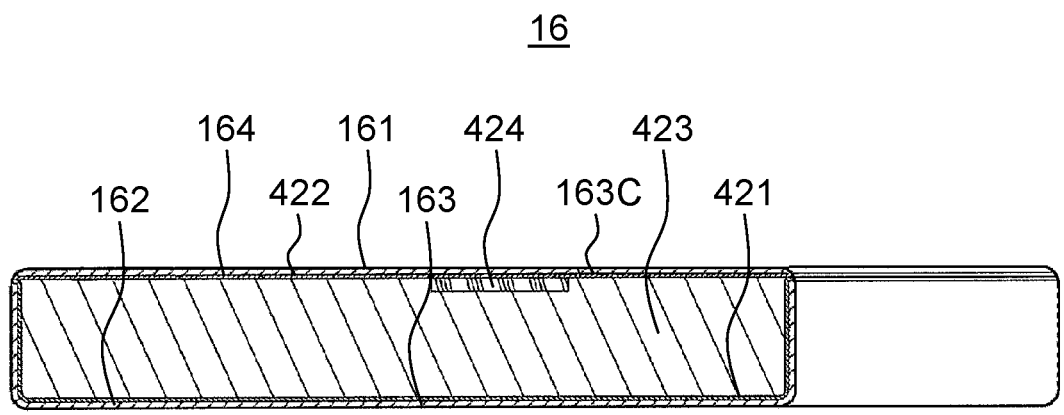
FIG. 38 is a cross-sectional view illustrating the vacuum heat insulator according to the sixth exemplary embodiment of the present disclosure, taken along line 38-38 in FIG. 37.

FIG. 37 is a perspective view schematically illustrating a general configuration of a vacuum heat insulator according to a sixth exemplary embodiment of the present disclosure. FIG. 38 is a cross-sectional view illustrating the vacuum heat insulator according to the sixth exemplary embodiment of the present disclosure, taken along line 38-38 in FIG. 37.

As illustrated in FIGS. 37 and 38, vacuum heat insulator 101F according to the sixth exemplary embodiment of the present disclosure constitutes partition wall 16 of heat insulation device 100A illustrated in FIGS. 1 and 2. Partition wall 16 has a plate shape. Recess 16A formed on the rear side of heat insulation device 100A is used to contain a duct which constitutes cooling channel 10, a damper (not shown) which controls a flow rate of cool air, or the like. Vacuum heat insulator 101F according to the present exemplary embodiment includes external plate 161, gas barrier container 162, and inner box 163 which houses gas barrier container 162.

External plate 161 has a flat plate shape, and includes a recess formed on the rear side of heat insulation device 100A. External plate 161 is produced by resin molding, for example. External plate 161 and gas barrier container 162 are bonded to each other by sheet-shaped (film-shaped) adhesive 164. Adhesive 164 may be constituted by modified silicone or modified polyolefin, for example.

Inner box 163 has an upper face opened via an opening, and has a box shape which includes second opening portion 163C constituting the opening of the upper face. Second opening portion 163C of inner box 163 is closed by external plate 161.

An adhesive (not shown) is disposed on a face included in an inner face of inner box 163 and facing gas barrier container 162 (counter face). The adhesive may be constituted by modified silicone, for example. The adhesive may be applied to either an entire surface of the counter face, or a part of the counter face.

Gas barrier container 162 of vacuum heat insulator 101F of the present exemplary embodiment has a configuration similar to the configuration of gas barrier container 402 of vacuum heat insulator 101A of the first exemplary embodiment. Accordingly, this configuration is not repeatedly described in detail.

Vacuum heat insulator 101E thus configured according to the present exemplary embodiment achieves advantageous effects similar to those of vacuum heat insulator 101A according to the first exemplary embodiment.

Seventh Exemplary Embodiment

[Configuration of Vacuum Heat Insulator]

Figure 39:
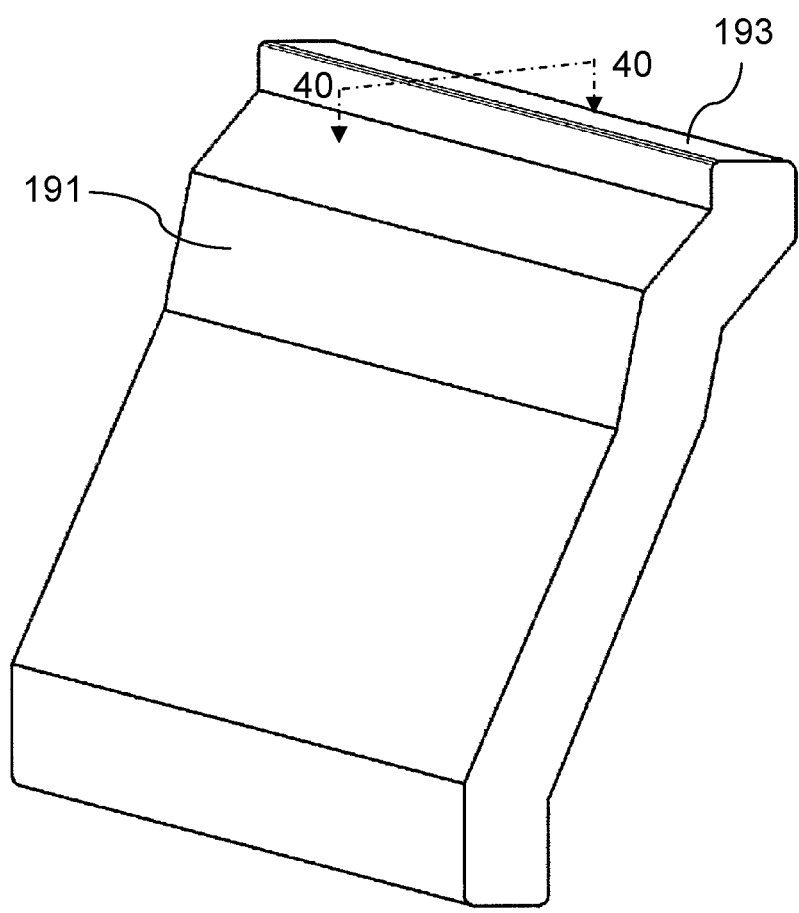
FIG. 39 is a perspective view schematically illustrating a general configuration of a vacuum heat insulator according to a seventh exemplary embodiment of the present disclosure.
Figure 40:
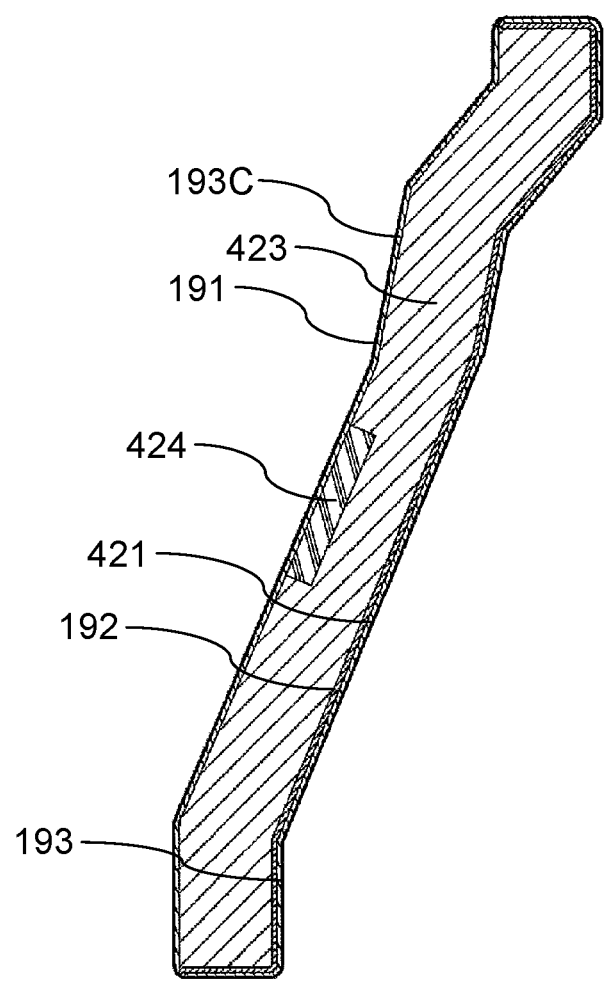
FIG. 40 is a cross-sectional view illustrating the vacuum heat insulator according to the seventh exemplary embodiment of the present disclosure, taken along line 40-40 in FIG. 39.

FIG. 39 is a perspective view schematically illustrating a general configuration of a vacuum heat insulator according to a seventh exemplary embodiment of the present disclosure. FIG. 40 is a cross-sectional view illustrating the vacuum heat insulator according to the seventh exemplary embodiment of the present disclosure, taken along line 40-40 in FIG. 39.

As illustrated in FIGS. 39 and 40, vacuum heat insulator 101G according to the seventh exemplary embodiment of the present disclosure constitutes cooling compartment wall body 19 of heat insulation device 100A illustrated in FIGS. 1 and 2. Cooling compartment wall body 19 has a stepped shape, and connects partition wall 16 and partition wall 17. Vacuum heat insulator 101G according to the present exemplary embodiment includes external plate 191, gas barrier container 192, and inner box 193 which houses gas barrier container 192.

External plate 191 has a plurality of steps, and has a flat plate shape as viewed from a front of heat insulation device 100A. External plate 191 is produced by resin molding, for example. External plate 191 and gas barrier container 192 are bonded to each other by a sheet-shaped (film-shaped) adhesive (not shown). The adhesive may be constituted by modified silicone or modified polyolefin, for example.

Inner box 193 has a front face opened via an opening, and has a box shape which includes second opening portion 193C constituting the opening of the front face. Second opening portion 193C of inner box 193 is closed by external plate 191.

An adhesive (not shown) is disposed on a face included in an inner face of inner box 193 and facing gas barrier container 192 (counter face). The adhesive may be constituted by modified silicone, for example. The adhesive may be applied to either an entire surface of the counter face, or a part of the counter face.

Gas barrier container 192 of vacuum heat insulator 101G of the present exemplary embodiment has a configuration similar to the configuration of gas barrier container 402 of vacuum heat insulator 101A of the first exemplary embodiment. Accordingly, this configuration is not repeatedly described in detail.

Vacuum heat insulator 101G thus configured according to the present exemplary embodiment achieves advantageous effects similar to those of vacuum heat insulator 101A according to the first exemplary embodiment.

Eighth Exemplary Embodiment

[Configuration of Heat Insulation Device]

Figure 41:
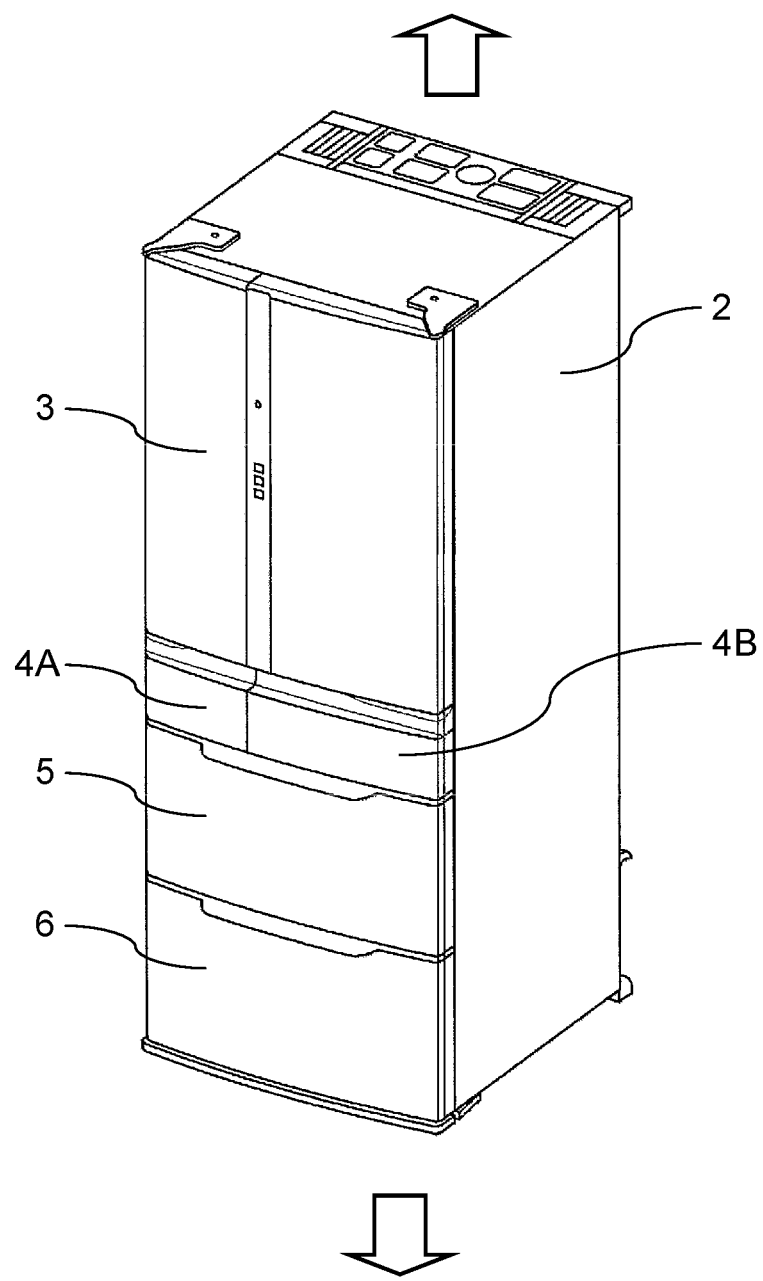
FIG. 41 is a perspective view of an external appearance of a heat insulation device (refrigerator) provided with a vacuum heat insulation housing according to an eighth exemplary embodiment of the present disclosure.
Figure 42:
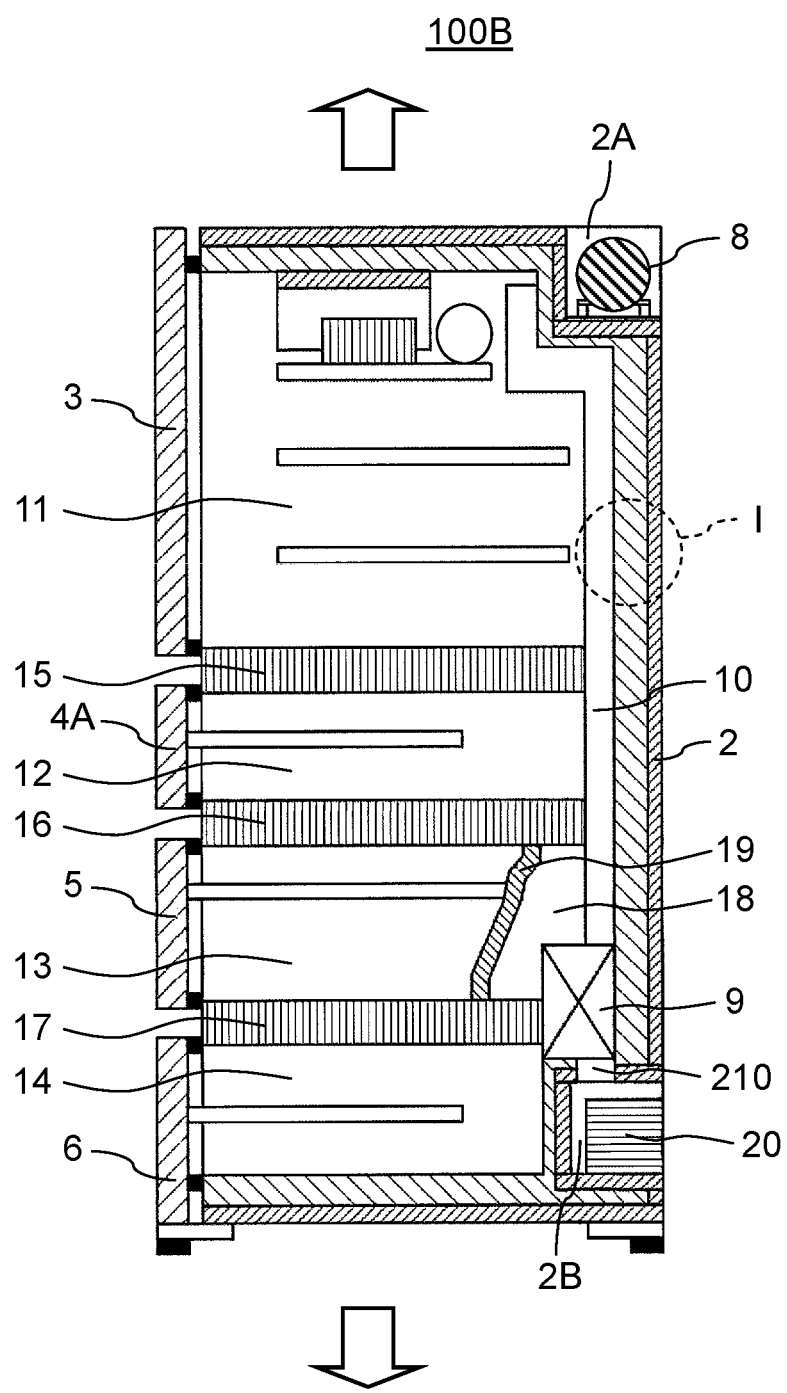
FIG. 42 is a cross-sectional view of a heat insulation container according to the eighth exemplary embodiment of the present disclosure.
Figure 43:
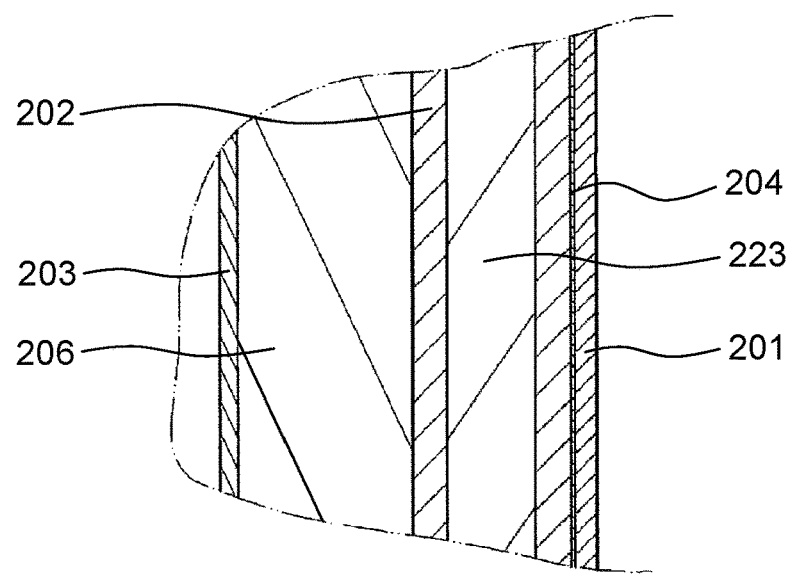
FIG. 43 is a cross-sectional view illustrating enlarged part I shown in FIG. 42 and included in the heat insulation device according to the eighth exemplary embodiment of the present disclosure.

FIG. 41 is a perspective view of a heat insulation device (refrigerator) provided with a vacuum heat insulation housing according to an eighth exemplary embodiment of the present disclosure. FIG. 42 is a cross-sectional view of the heat insulation container according to the eighth exemplary embodiment of the present disclosure. FIG. 43 is a cross-sectional view illustrating enlarged part I shown in FIG. 42 and included in the heat insulation device according to the eighth exemplary embodiment of the present disclosure.

Concerning an up-down direction of refrigerator body 2, an upward direction and a downward direction of refrigerator body 2 correspond to an upward direction and a downward direction as viewed in FIGS. 41 and 42 as indicated by arrows in the figures.

As illustrated in FIGS. 41 to 43, heat insulation device 100B according to the eighth exemplary embodiment of the present disclosure includes refrigerator body 2 which includes a plurality of storage compartments, refrigerating compartment door 3, ice-making compartment door 4A, first freezing compartment door 4B, vegetable compartment door 5, second freezing compartment door 6, compressor 8, and evaporator 9.

Recess 2A recessed downward from a top face of refrigerator body 2 is formed in a rear side upper part of refrigerator body 2. Recess 2A constitutes a machine compartment where compressor 8 is disposed. Recess 2B recessed toward a front face of refrigerator body 2 from a rear face of refrigerator body 2 is formed in a lower part of refrigerator body 2.

An inner space of refrigerator body 2 is sectioned into the plurality of storage compartments by partition walls 15 to 17. More specifically, refrigerating compartment 11 is provided in the upper part of refrigerator body 2. Ice-making compartment 12 and a first freezing compartment (not shown) are provided side by side below refrigerating compartment 11. Vegetable compartment 13 is further provided below ice-making compartment 12 and the first freezing compartment. Second freezing compartment 14 is provided below vegetable compartment 13.

The front face of refrigerator body 2 is opened. Respective doors of refrigerating compartment door 3 through second freezing compartment door 6 are provided on the front face of refrigerator body 2. More specifically, rotary type refrigerating compartment door 3 is disposed at refrigerating compartment 11. Ice-making compartment door 4A, first freezing compartment door 4B, vegetable compartment door 5, and second freezing compartment door 6, each of which is of a drawer type including a rail and the like, are disposed at ice-making compartment 12, the first freezing compartment, vegetable compartment 13, and second freezing compartment 14, respectively.

Compressor 8 is disposed in recess 2A. According to the mode of the present exemplary embodiment presented by way of example, compressor 8 is disposed in the upper part of refrigerator body 2. However, in a different adoptable mode, compressor 8 may be positioned in a central part or a lower part of refrigerator body 2.

Cooling compartment 18 is further provided on a rear side central part of refrigerator body 2. Cooling compartment 18 on a rear side of vegetable compartment 13 is sectioned from vegetable compartment 13 by cooling compartment wall body 19 which connects partition wall 16 and partition wall 17. Evaporator 9 is disposed in cooling compartment 18.

Evaporator 9 is configured to perform heat exchange between refrigerant supplied from compressor 8 and air present within cooling compartment 18. According to this configuration, air around evaporator 9 is cooled, and supplied in a cooled state via cooling channel 10 toward refrigerating compartment 11 and others by a fan or the like. Cooling channel 10 is constituted by a space formed between a partition wall (not shown) and the rear face of refrigerator body 2.

Evaporating dish 20 is disposed in recess 2B to store water generated from evaporator 9. Refrigerator body 2 further includes through hole 210 formed between evaporator 9 and evaporating dish 20.

According to heat insulation device 100B of the present exemplary embodiment, at least one of refrigerator body 2, refrigerating compartment door 3, ice-making compartment door 4A, first freezing compartment door 4B, vegetable compartment door 5, second freezing compartment door 6, partition walls 15 to 17, and cooling compartment wall body 19 includes a heat insulating wall which houses vacuum heat insulator 101H according to the present exemplary embodiment.

[Configuration of Refrigerator Body (Vacuum Heat Insulator)]

Described now with reference to FIGS. 41 through 43 is refrigerator body 2 presented by way of example of the vacuum heat insulator according to the eighth exemplary embodiment of the present disclosure.

As illustrated in FIGS. 41 to 43, refrigerator body 2 presented by way of example of vacuum heat insulator 101H of the eighth exemplary embodiment of the present disclosure includes external plate 201, gas barrier container 202, inner box 203, and foamed heat insulating material 206 disposed between gas barrier container 202 and inner box 203. For example, external plate 201 may be constituted by a metal plate made of aluminum, stainless steel, iron or other metal materials having an excellent gas barrier property, or a glass plate.

External plate 201 and gas barrier container 202 are bonded to each other by sheet-shaped (film-shaped) adhesive 204. Adhesive 204 may be constituted by modified silicone or modified polyolefin, for example. This configuration brings external plate 201 and gas barrier container 202 into tight contact with each other, thereby further preventing gas permeation through gas barrier container 202. i.e., gas permeation from external plate 201 into gas barrier container 202.

Gas barrier container 202 is molded by blow molding or other methods according to the present exemplary embodiment. Examples of material constituting gas barrier container 202 include thermoplastic resin. Core material 223 is disposed in an inner space of gas barrier container 202.

Core material 223 may be constituted by open-cell urethane foam, for example. The open-cell urethane foam may be a material having characteristics disclosed in PTL 2, for example. In this case, core material 223 has a shape identical to a shape of an inner face (inner space) of first member 421. Core material 223 may be made of glass fibers, rock wool, alumina fibers, or polyethylene terephthalate fibers, for example.

A configuration of a wall of gas barrier container 202 is now described with reference to FIGS. 44 to 50.

Figure 44:
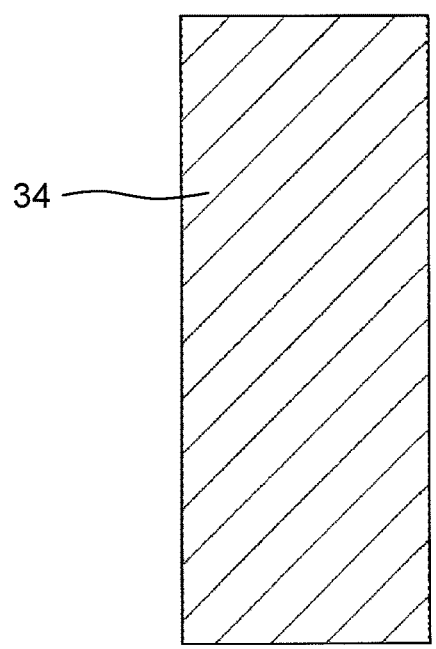
FIG. 44 is a cross-sectional view illustrating an example of a wall of a gas barrier container included in a vacuum heat insulator according to the eighth exemplary embodiment of the present disclosure.

FIG. 44 is a cross-sectional view illustrating an example of the wall of the gas barrier container of the vacuum heat insulator according to the eighth exemplary embodiment of the present disclosure. FIGS. 45 to 49 are cross-sectional views each illustrating a different example of the wall of the gas barrier container of the vacuum heat insulator according to the present exemplary embodiment.

The wall of gas barrier container 202 in the example illustrated in FIG. 44 is constituted by single layer 34. Single layer 34 may be made of material having an excellent gas barrier property, such as an ethylene-vinyl alcohol copolymer, or material exhibiting low moisture permeability, such as liquid crystal polymer, polyethylene, and polypropylene.

This configuration prevents gas permeation into gas barrier container 202 by easy material configuration, thereby maintaining a predetermined degree of vacuum inside gas barrier container 202. Accordingly, deterioration of heat insulation performance is avoidable.

Figure 45:
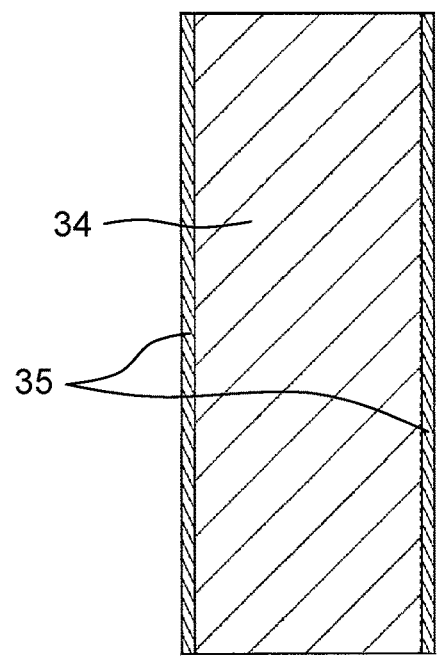
FIG. 45 is a cross-sectional view illustrating another example of the wall of the gas barrier container included in the vacuum heat insulator according to the eighth exemplary embodiment of the present disclosure.

According to the example illustrated in FIG. 45, the wall of gas barrier container 202 is constituted by single layer 34, and high barrier layers 35 respectively provided on one and the other faces of single layer 34. Each of high barrier layers 35 may be made of metal such as aluminum and stainless steel. In this case, the wall of gas barrier container 202 may be constituted by a laminated film. The metal layer constituting each of high barrier layers 35 may be metallic foil such as aluminum foil, or aluminum or the like deposited on the surface of the laminated film.

High barrier layers 35 disposed on each face of single layer 34 increase a barrier property against air, water or the like. This configuration prevents gas permeation into gas barrier container 202 by low-cost material configuration, thereby maintaining a predetermined degree of vacuum inside gas barrier container 202. Accordingly, deterioration of heat insulation performance is avoidable.

Figure 46:
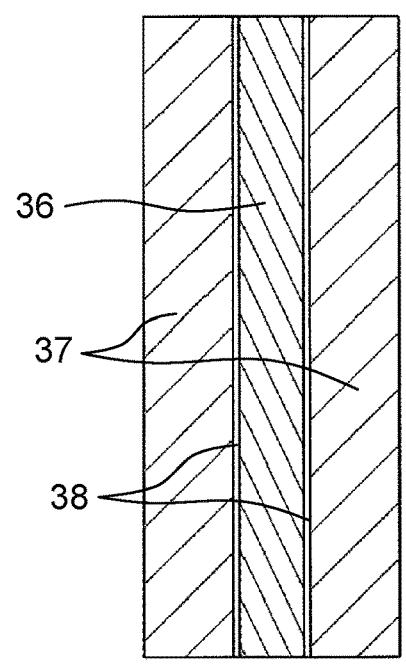
FIG. 46 is a cross-sectional view illustrating a further example of the wall of the gas barrier container included in the vacuum heat insulator according to the eighth exemplary embodiment of the present disclosure.

According to the example illustrated in FIG. 46, the wall of gas barrier container 202 is constituted by air barrier layer 36, water barrier layers 37 respectively disposed on one and the other faces of air barrier layer 36, and adhesive layers 38 for bonding air barrier layer 36 and water barrier layers 37.

Air barrier layer 36 may be made of material having an excellent gas barrier property, such as an ethylene-vinyl alcohol copolymer. Each of water barrier layers 37 may be made of material exhibiting low moisture permeability, such as polyethylene and polypropylene. Each of adhesive layers 38 may be made of modified polyolefin such as modified polyethylene and modified polypropylene.

Figure 47:
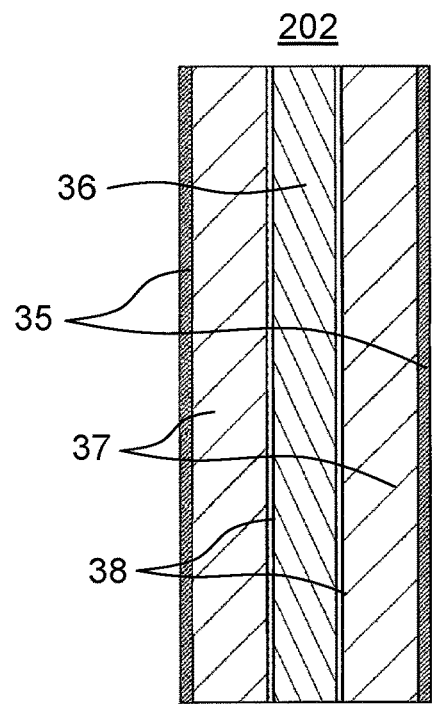
FIG. 47 is a cross-sectional view illustrating a still further example of the wall of the gas barrier container included in the vacuum heat insulator according to the eighth exemplary embodiment of the present disclosure.

According to the example illustrated in FIG. 47, the wall of gas barrier container 202 is constituted by air barrier layer 36, water barrier layers 37 respectively disposed on one and the other faces of air barrier layer 36, adhesive layers 38 for bonding air barrier layer 36 and water barrier layers 37, and high barrier layers 35 disposed on the outer face sides of water barrier layers 37. Each of high barrier layers 35 through adhesive layers 38 is configured as above. Accordingly, these configurations are not repeatedly described in detail.

According to the example illustrated in FIG. 47, a gas barrier property on the external plate side of the wall of gas barrier container 202 may be different from a corresponding property on the core material side. For example, the gas barrier properties on the external plate side and the core material side of the wall of gas barrier container 202 may be varied such that the gas barrier property of gas barrier container 202 on the external plate side becomes higher than the gas barrier property on the core material side.

Figure 48:
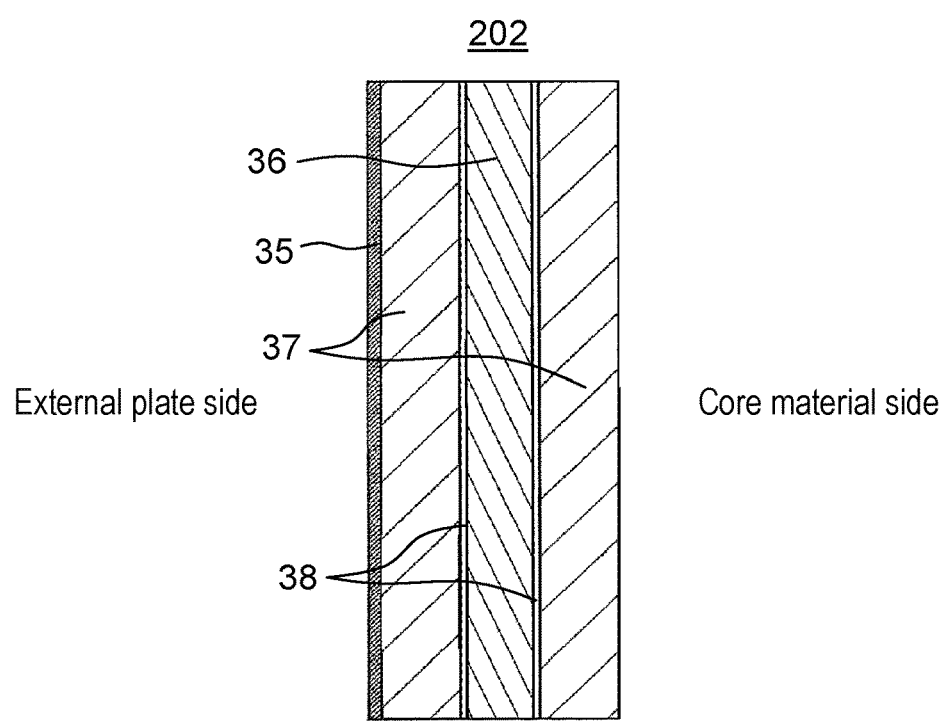
FIG. 48 is a cross-sectional view illustrating a still further example of the wall of the gas barrier container included in the vacuum heat insulator according to the eighth exemplary embodiment of the present disclosure.

According to the example illustrated in FIG. 48, the wall of gas barrier container 202 is constituted by air barrier layer 36, water barrier layers 37 respectively disposed on one and the other faces of air barrier layer 36, adhesive layers 38 for bonding air barrier layer 36 and water barrier layers 37, and high barrier layer 35 disposed on the outer face side of water barrier layer 37 located on the external plate side. In this configuration, high barrier layer 35 is disposed on the high-temperature external plate side of the wall of gas barrier container 202. Accordingly, a sufficient gas barrier property can be maintained even under a high-temperature environment. This configuration prevents gas permeation into gas barrier container 202, thereby maintaining a predetermined degree of vacuum inside gas barrier container 202. Accordingly, deterioration of heat insulation performance is also avoidable.

Figure 49:
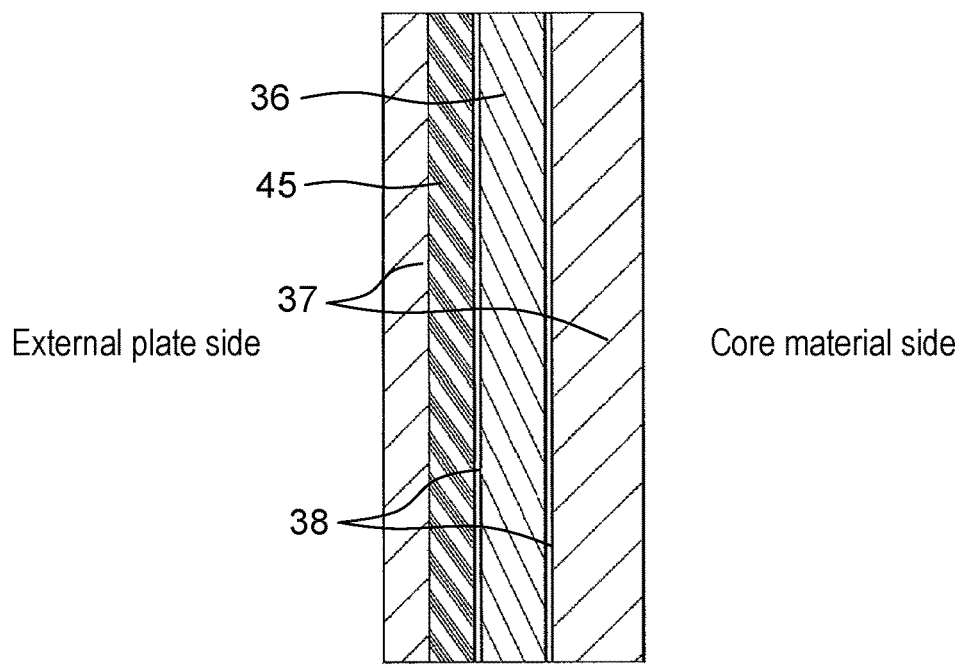
FIG. 49 is a cross-sectional view illustrating a still further example of the wall of the gas barrier container included in the vacuum heat insulator according to the eighth exemplary embodiment of the present disclosure.

According to the example illustrated in FIG. 49, the wall of gas barrier container 202 is constituted by air barrier layer 36, water barrier layers 37 respectively disposed on one and the other faces of air barrier layer 36, adhesive layers 38 for bonding air barrier layer 36 and water barrier layers 37, and waste mixture layer 45 disposed on the external plate side of the wall of gas barrier container 202 and located between water barrier layer 37 and air barrier layer 36.

Each of high barrier layer 35 through adhesive layers 38 is configured as above. Accordingly these configurations are not repeatedly described in detail.

Figure 50:
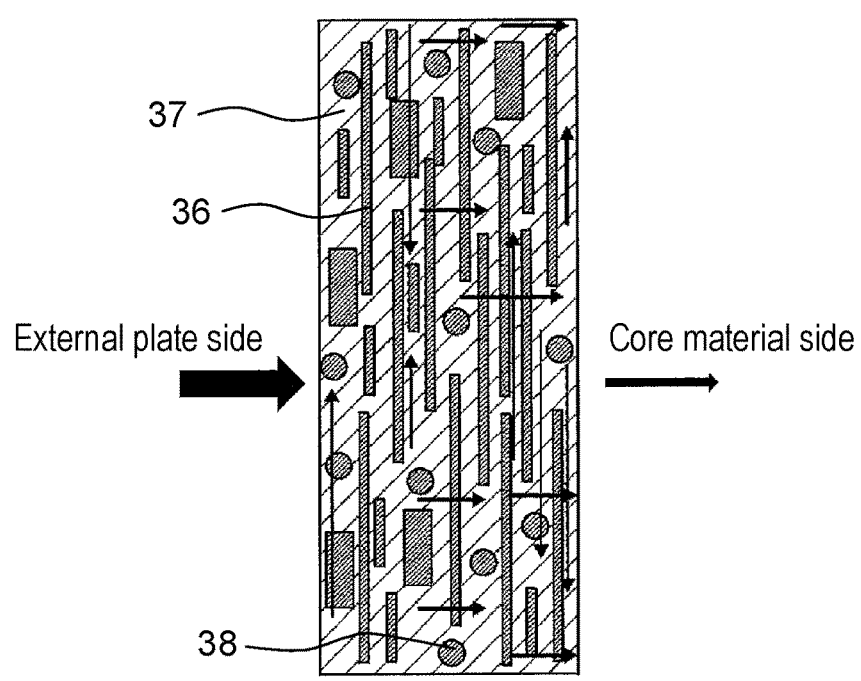
FIG. 50 is a cross-sectional view illustrating a general configuration of a waste mixture layer constituting the wall of the gas barrier container included in the vacuum heat insulator according to the eighth exemplary embodiment of the present disclosure.

Waste mixture layer 45 is described herein with reference to FIG. 50.

FIG. 50 is a cross-sectional view illustrating a general configuration of the waste mixture layer constituting the wall of the gas barrier container of the vacuum heat insulator according to the eighth exemplary embodiment of the present disclosure.

As illustrated in FIG. 50, waste mixture layer 45 is a layer of a mixture including air barrier layer 36, water barrier layer 37, and adhesive layer 38. An ethylene-vinyl alcohol copolymer or the like constituting air barrier layer 36 is bonded with polyethylene or polypropylene constituting water barrier layer 37 via modified polyolefin or the like constituting adhesive layer 38.

Waste mixture layer 45 includes a mixture of air barrier layer 36 and water barrier layer 37. In this case, heat is transferred in a "labyrinth" from the external side of refrigerator 1 (external plate side) toward the internal side of refrigerator 1 (core material side). Accordingly, heat transfer efficiency deteriorates. In addition, waste mixture layer 45 has a more excellent gas barrier property against air, water or the like than a gas barrier property of a single layer made of polyethylene, polypropylene or the like. Accordingly, the wall of gas barrier container 202 may be constituted only by waste mixture layer 45 when an ambient temperature of gas barrier container 202 is appropriate.

As presented above, various structures of the wall of gas barrier container 202 are adoptable. An optimal structure may be selected from these structures in accordance with required gas barrier performance.

Figure 51:
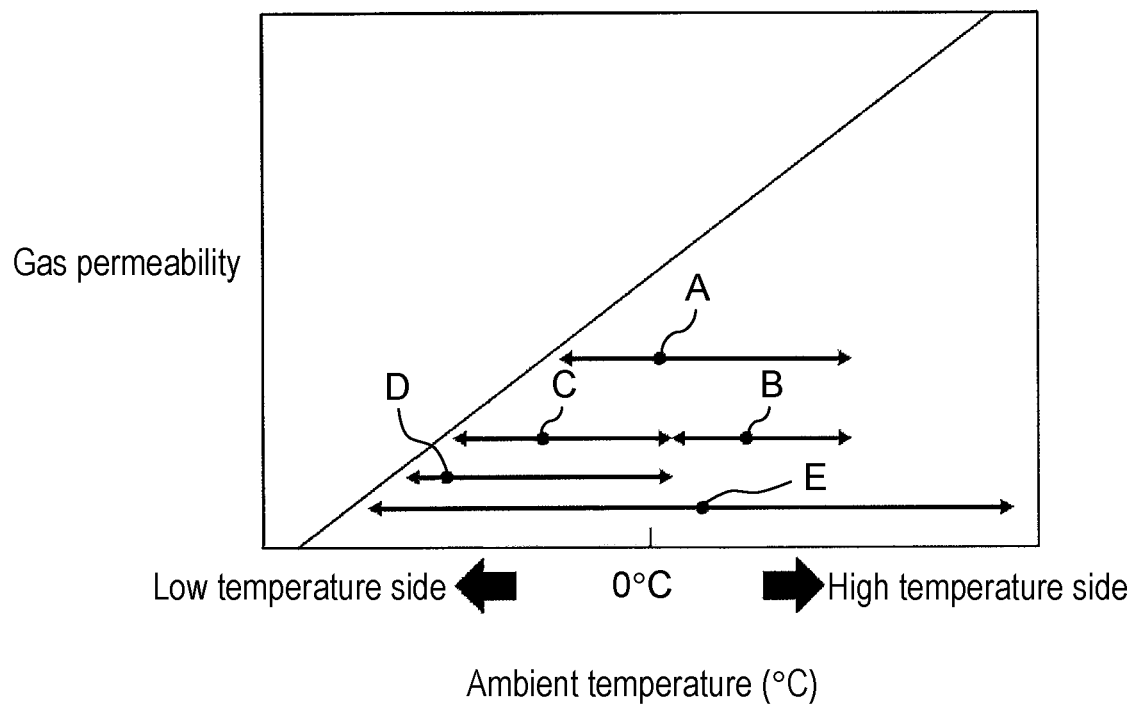
FIG. 51 is a chart showing a relationship between an operating environment temperature (ambient temperature) and gas permeability of resin having a gas barrier property and contained in the gas barrier container of the vacuum heat insulator according to the eighth exemplary embodiment of the present disclosure.

Described next with reference to FIG. 51 is a relationship between operating environment temperatures and gas permeability of resin having a gas barrier property and corresponding to a material of gas barrier container 202.

FIG. 51 is a chart showing a relationship between operating environment temperatures (ambient temperatures) and gas permeability of resin having a gas barrier property and corresponding to a material of the gas barrier container of the vacuum heat insulator according to the eighth exemplary embodiment of the present disclosure.

As shown in FIG. 51, the gas permeability of the resin having a gas barrier property deteriorates with generation of small clearances between material molecules. These clearances increase as the temperature of the ambient environment rises. On the other hand, the clearances between molecules decrease at low temperatures. In this case, the gas permeability tends to improve with reduction of the clearances. In other words, there is such a characteristic that the gas barrier performance deteriorates as a temperature rises.

Accordingly, optimization of heat insulation performance and cost reduction are achievable by selecting the wall (thickness or material) of gas barrier container 202 satisfying optimal gas barrier performance in accordance with a temperature zone of an operating position or an operating environment.

The structure of the wall of gas barrier container 202 therefore may be varied to optimize gas permeability in accordance with ambient temperatures of respective positions constituting heat insulation device 100B.

For example, in the chart showing the relationship between the ambient temperatures and the gas permeability of resin material in FIG. 51, the gas permeability can be set to a low value at a position of an ambient temperature in a low temperature range, such as a range indicated by C or D. In this case, the wall of gas barrier container 202 may be constituted by single layer 34 as in the example illustrated in FIG. 44. At a position of an ambient temperature only in a high temperature range of 0° C. or higher, such as a range indicated by B in FIG. 51, high barrier layer 35 constituted by metal foil or the like may be disposed on each face of single layer 34 in the wall of gas barrier container 202 to increase only a gas barrier property on the high temperature side as in the example illustrated in FIG. 45.

At a position in a wide range of ambient temperatures from a low temperature range to a high temperature range as in a range indicated by A in FIG. 51, a different gas barrier configuration is required for each type of permeation gas. In this case, the wall of gas barrier container 202 may have a multilayer configuration including air barrier layer 36 and water barrier layers 37 as in the example illustrated in FIG. 46. At a position in a wider range of ambient temperatures, such as a range indicated by E in FIG. 51, than the range indicated by A, the wall of gas barrier container 202 may have a multilayer configuration of air barrier layer 36, water barrier layers 37, and high barrier layers 35 as in the example illustrated in FIG. 47.

More specifically, when an outside air temperature of heat insulation device 100B is 20° C., for example, respective positions of the wall of gas barrier container 202 constituting heat insulation device 100B have following temperatures in a condition that ambient temperatures vary for each position of heat insulation device 100B.

A high ambient temperature of refrigerator body 2 is approximately 40° C. under effect of the outside air temperature and compressor 8, while a low ambient temperature of refrigerator body 2 is approximately −30° C. under effect of evaporator 9. Accordingly, for the wall of gas barrier container 202 constituting refrigerator body 2, such resin may be selected which has a gas barrier property satisfying the range indicated by E in the chart showing the relationship between the ambient temperatures and the gas permeability shown in FIG. 51.

Similarly, a high ambient temperature of refrigerating compartment door 3 is approximately 20° C. under effect of the outside air temperature, while a low ambient temperature of refrigerating compartment door 3 is approximately 2° C. under effect of refrigerating compartment 11. Accordingly, for the wall of gas barrier container 202 constituting refrigerating compartment door 3, such resin may be selected which has a gas barrier property satisfying the range indicated by B in the chart showing the relationship between the ambient temperatures and the gas permeability shown in FIG. 51.

A high ambient temperature of ice-making compartment door 4A is approximately 20° C. under effect of the outside air temperature, while a low ambient temperature of ice-making compartment door 4A is approximately −18° C. under effect of a compartment temperature of ice-making compartment 12. Accordingly, for the wall of gas barrier container 202 constituting ice-making compartment door 4A, such resin may be selected which has a gas barrier property satisfying the range indicated by A in the chart showing the relationship between the ambient temperatures and the gas permeability shown in FIG. 51.

A high ambient temperature of vegetable compartment door 5 is approximately 20° C. under effect of the outside air temperature, while a low ambient temperature of vegetable compartment door 5 is approximately 5° C. under effect of a compartment temperature of vegetable compartment 13. Accordingly, for the wall of gas barrier container 202 constituting vegetable compartment door 5, such resin may be selected which has a gas barrier property satisfying the range indicated by B in the chart showing the relationship between the ambient temperatures and the gas permeability shown in FIG. 51.

A high ambient temperature of second freezing compartment door 6 is approximately 20° C. under effect of the outside air temperature, while a low ambient temperature of second freezing compartment door 6 is approximately −18° C. under effect of a compartment temperature of second freezing compartment 14. Accordingly, for the wall of gas barrier container 202 constituting second freezing compartment door 6, such resin may be selected which satisfies the range indicated by A in the chart showing the relationship between the ambient temperatures and the gas permeability shown in FIG. 51.

A high ambient temperature of partition wall 15 is approximately 5° C. under effect of the compartment temperature of refrigerating compartment 11, while a low ambient temperature of partition wall 15 is approximately −18° C. under effect of a compartment temperature of ice-making compartment 12. Accordingly, for the wall of gas barrier container 202 constituting partition wall 15, such resin may be selected which has a gas barrier property satisfying the range indicated by C in the chart showing the relationship between the ambient temperatures and the gas permeability shown in FIG. 51.

A high ambient temperature of partition wall 16 is approximately 5° C. under effect of the compartment temperature of vegetable compartment 13, while a low ambient temperature of partition wall 16 is approximately −18° C. under effect of the compartment temperature of ice-making compartment 12. Accordingly, for the wall of gas barrier container 202 constituting partition wall 16, such resin may be selected which has a gas barrier property satisfying the range indicated by C in the chart showing the relationship between the ambient temperatures and the gas permeability shown in FIG. 51.

A high ambient temperature of partition wall 17 is approximately 5° C. under effect of the compartment temperature of vegetable compartment 13, while a low ambient temperature of partition wall 17 is approximately −18° C. under effect of the compartment temperature of second freezing compartment 14. Accordingly, for the wall of gas barrier container 202 constituting partition wall 17, such resin may be selected which has a gas barrier property satisfying the range indicated by C in the chart showing the relationship between the ambient temperatures and the gas permeability shown in FIG. 51.

A high ambient temperature of cooling compartment wall body 19 is approximately 5° C. under effect of the compartment temperature of vegetable compartment 13, while a low ambient temperature of cooling compartment wall body 19 is approximately −20° C. under effect of a compartment temperature of cooling compartment 18. Accordingly, for the wall of gas barrier container 202 constituting cooling compartment wall body 19, such resin may be selected which has a gas barrier property satisfying the range indicated by D in the chart showing the relationship between the ambient temperatures and the gas permeability shown in FIG. 51.

[Advantageous Effects of Vacuum Heat Insulator and Heat Insulation Device Provided with Same]

Described are advantageous effects of vacuum heat insulator 101H, and heat insulation device 100B provided with the same according to the present exemplary embodiment configured as above.

According to vacuum heat insulator 101H of the present exemplary embodiment, external plate 201 is constituted by a metal plate having an excellent gas barrier property, or a glass plate. Accordingly, sufficient reduction of gas permeation from the outside to the inside of vacuum heat insulator 101H (heat insulation device 100B) is achievable.

Moreover, according to vacuum heat insulator 101H of the present exemplary embodiment, external plate 201 and gas barrier container 202 are bonded via sheet-shaped adhesive 204. This configuration brings external plate 201 and gas barrier container 202 into tight contact with each other, thereby preventing generation of a clearance between external plate 201 and gas barrier container 202. This configuration therefore further prevents gas permeation from external plate 201 into gas barrier container 202, thereby achieving sufficient reduction of deterioration of heat insulation performance.

Furthermore, according to vacuum heat insulator 101H of the present exemplary embodiment, gas barrier container 202 is produced by blow molding capable of producing any shapes. This configuration forms the inner face shape of gas barrier container 202 identical to the inner face shape of inner box 203, thereby preventing generation of a clearance between gas barrier container 202 and inner box 203.

Accordingly, convection of air between gas barrier container 202 and inner box 203 decreases, wherefore heat insulation performance improves. Moreover, rigidity and strength of vacuum heat insulator 101H increase by tight contact between gas barrier container 202 and inner box 203.

Ninth Exemplary Embodiment

[Configuration of Vacuum Heat Insulator]

Figure 52:
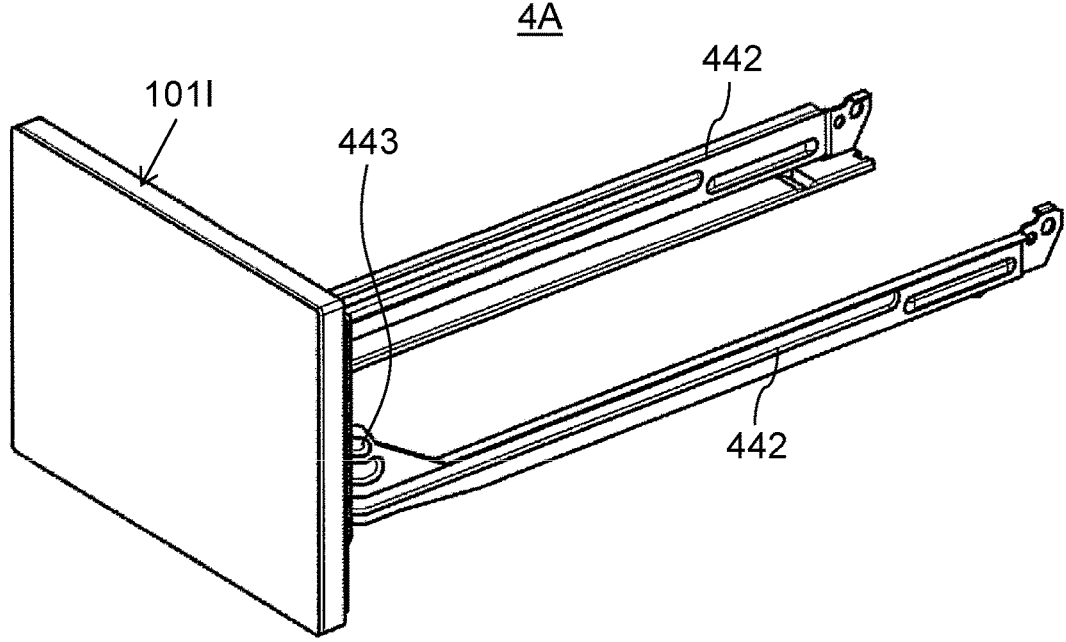
FIG. 52 is a perspective view schematically illustrating a general configuration of an ice-making compartment door provided with a vacuum heat insulator according to a ninth exemplary embodiment of the present disclosure.
Figure 53:
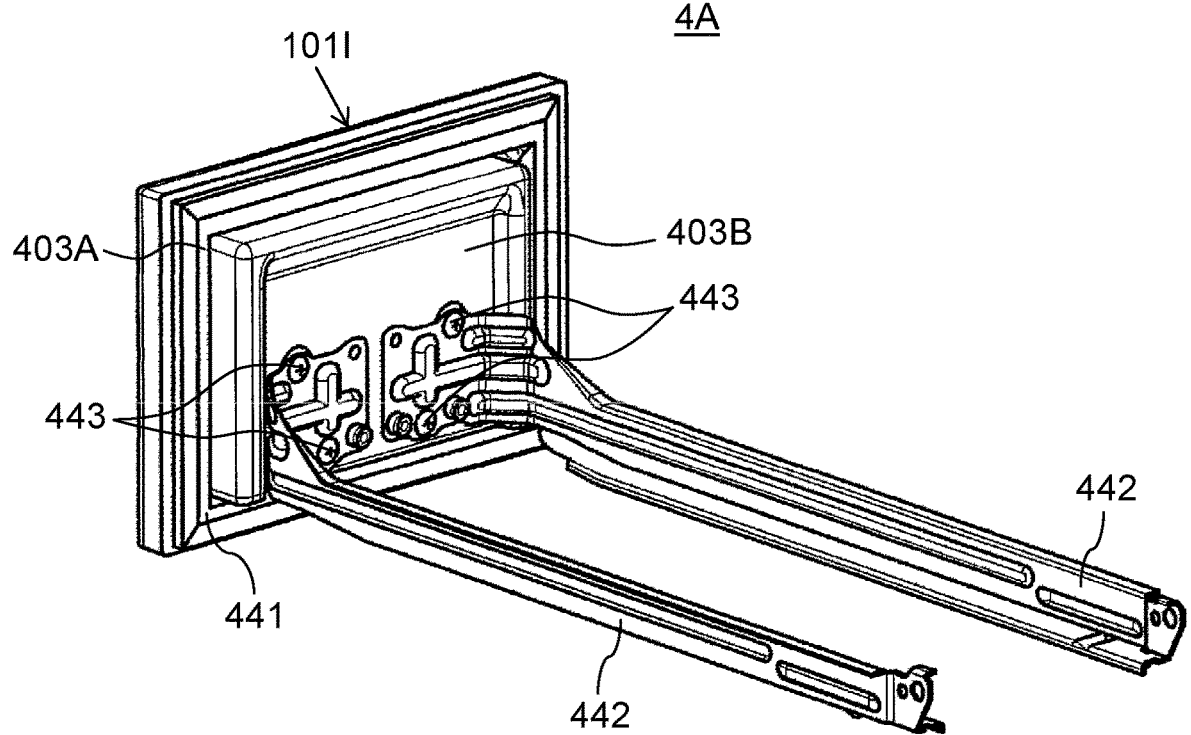
FIG. 53 is a perspective view of the ice-making compartment door provided with the vacuum heat insulator according to the ninth exemplary embodiment of the present disclosure as viewed from a rear of the ice-making compartment door.
Figure 54:
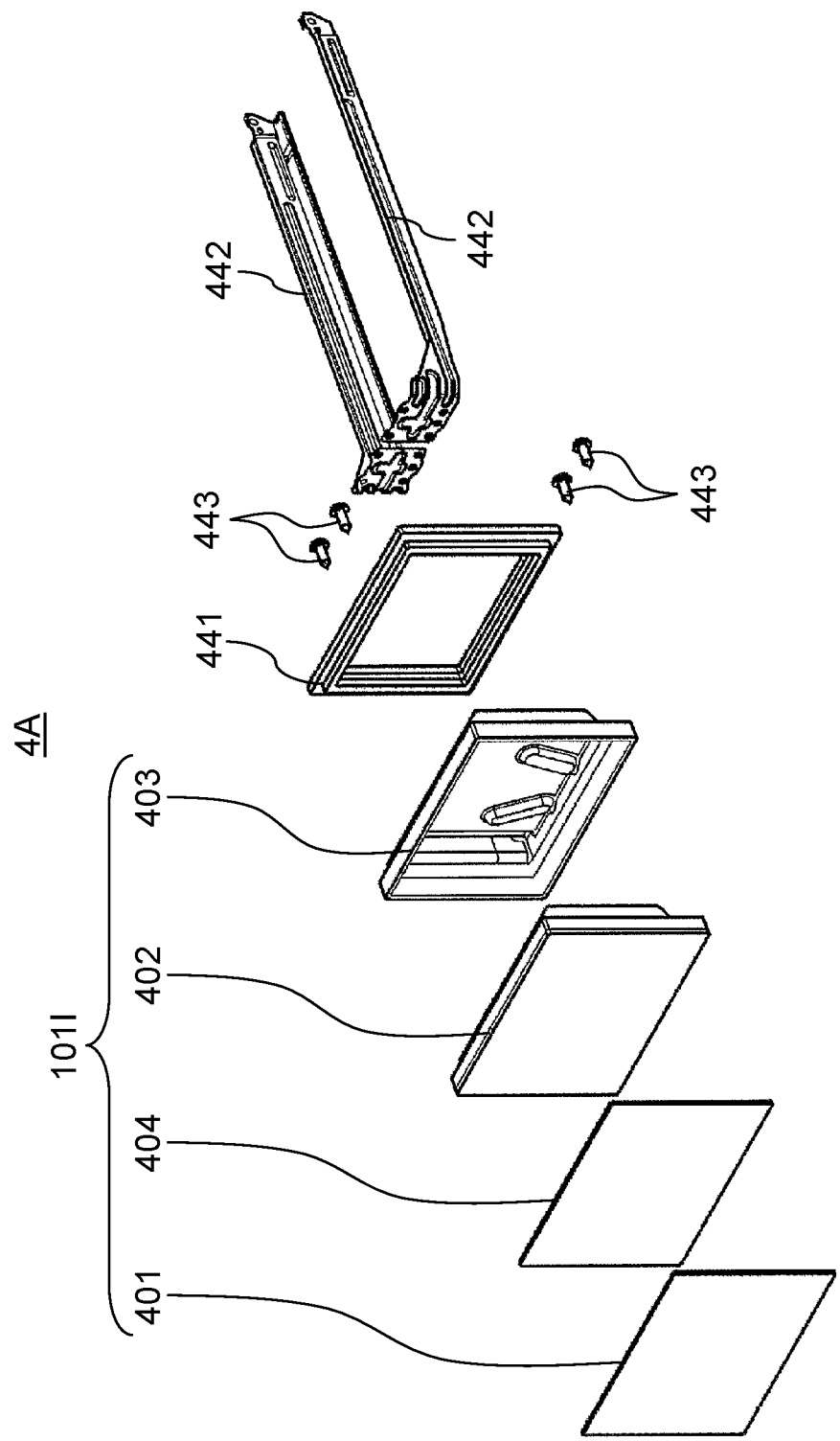
FIG. 54 is a developed view illustrating respective developed members which constitute the ice-making compartment door provided with the vacuum heat insulator according to the ninth exemplary embodiment of the present disclosure.
Figure 55:
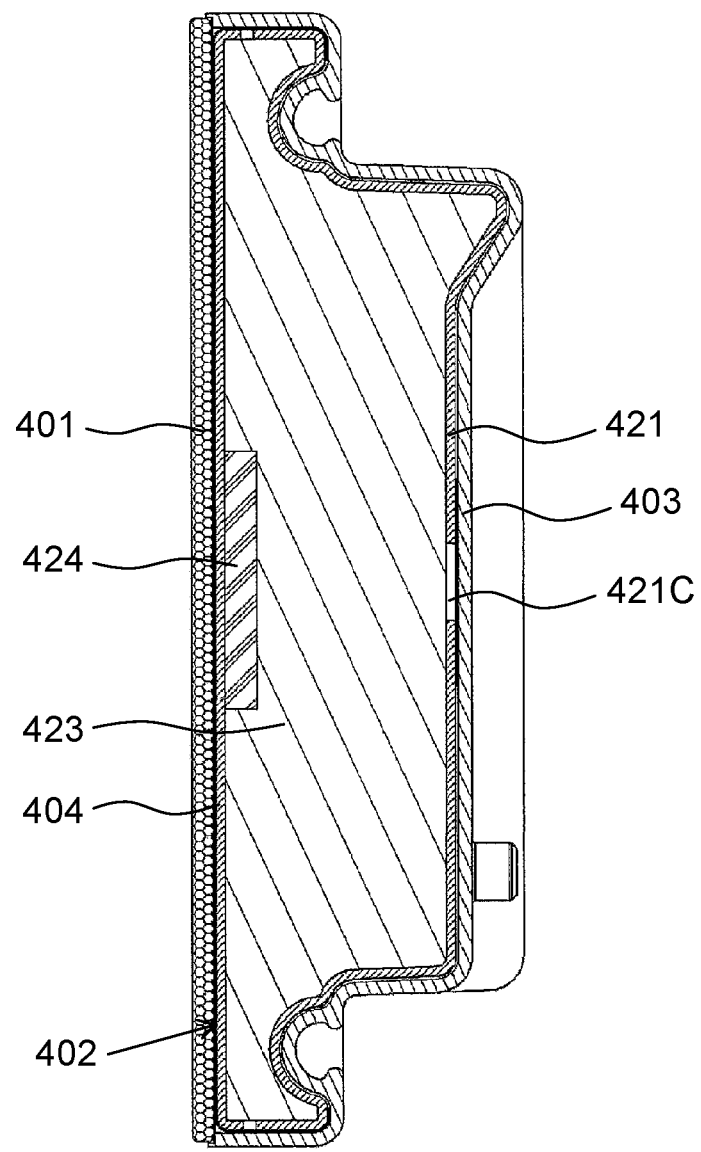
FIG. 55 is a longitudinal sectional view of the ice-making compartment door provided with the vacuum heat insulator according to the ninth exemplary embodiment of the present disclosure (a cross-sectional view of the ice-making compartment door taken in front-rear and up-down directions of the ice-making compartment door).
Figure 56:
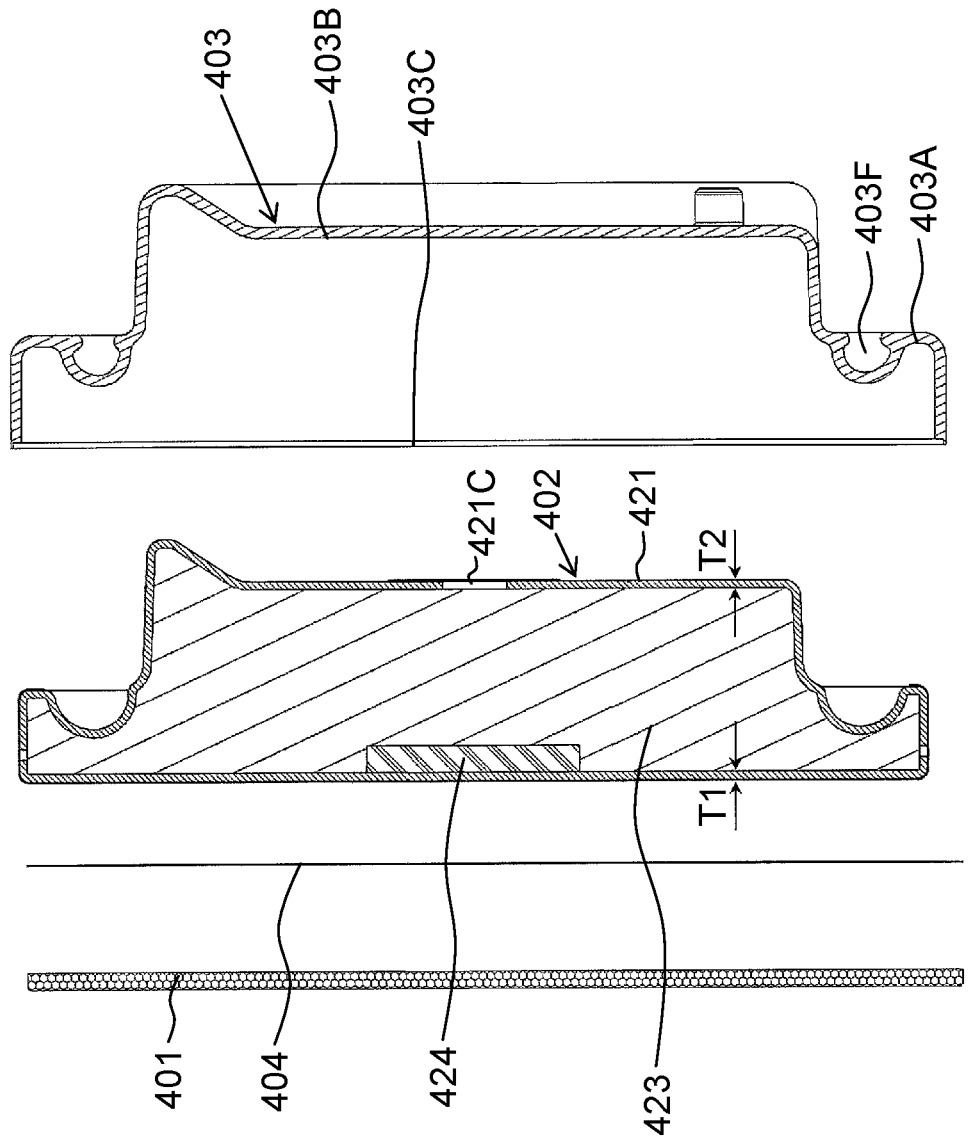
FIG. 56 is a developed view illustrating respective developed members which constitute the vacuum heat insulator according to the ninth exemplary embodiment of the present disclosure.

FIG. 52 is a perspective view schematically illustrating a general configuration of an ice-making compartment door provided with a vacuum heat insulator according to a ninth exemplary embodiment of the present disclosure. FIG. 53 is a perspective view of the ice-making compartment door provided with the vacuum heat insulator according to the ninth exemplary embodiment of the present disclosure as viewed from a rear of the ice-making compartment door. FIG. 54 is a developed view illustrating respective developed members which constitute the ice-making compartment door provided with the vacuum heat insulator according to the ninth exemplary embodiment of the present disclosure. FIG. 55 is a longitudinal sectional view illustrating the vacuum heat insulator according to the ninth exemplary embodiment of the present disclosure, while FIG. 56 is a developed view illustrating respective developed members which constitute the vacuum heat insulator according to the ninth exemplary embodiment of the present disclosure.

Figure 57:
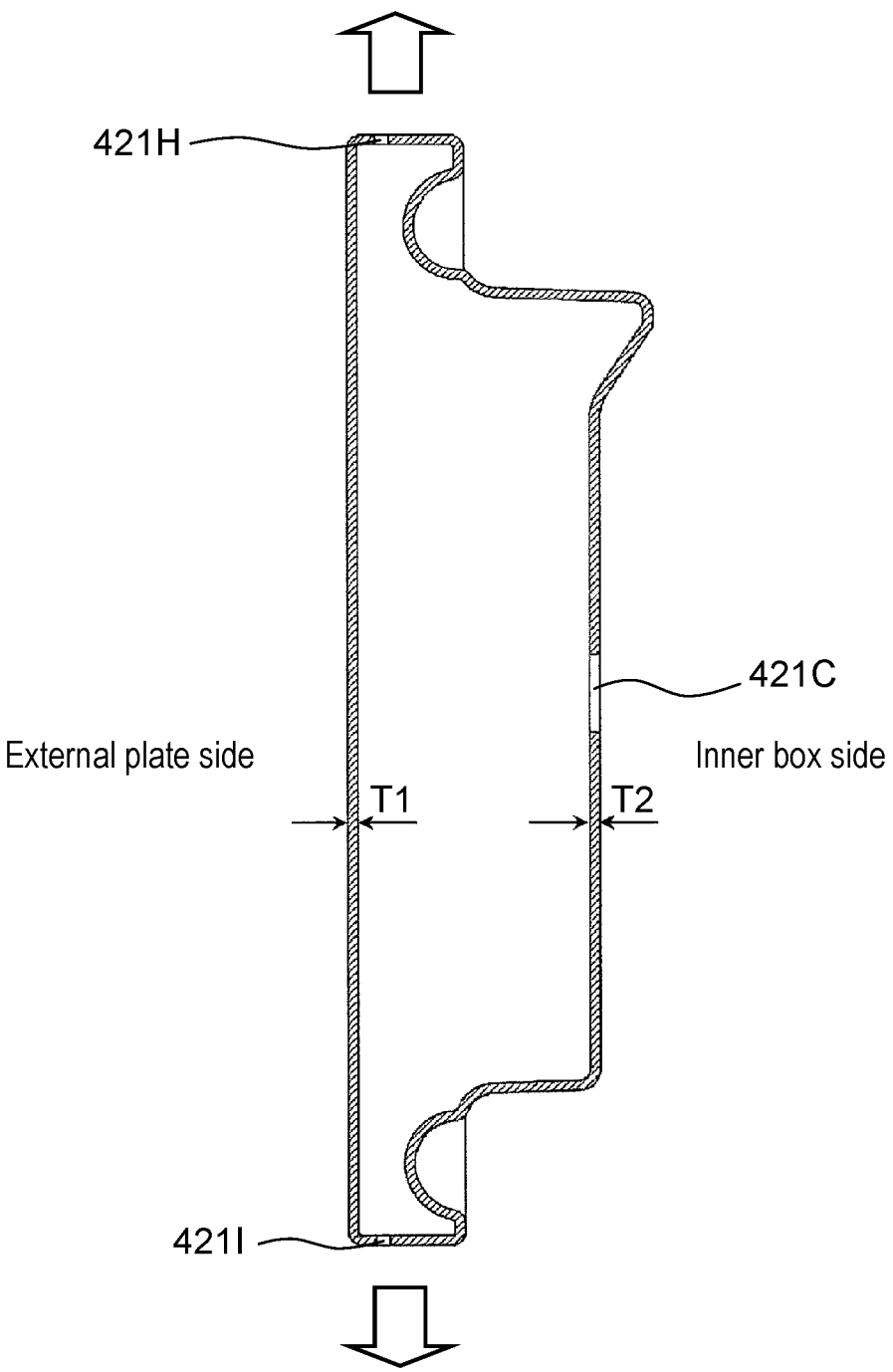
FIG. 57 is a longitudinal sectional view of a first member included in a gas barrier container of the ice-making compartment door provided with the vacuum heat insulator according to the ninth exemplary embodiment of the present disclosure.
Figure 58:
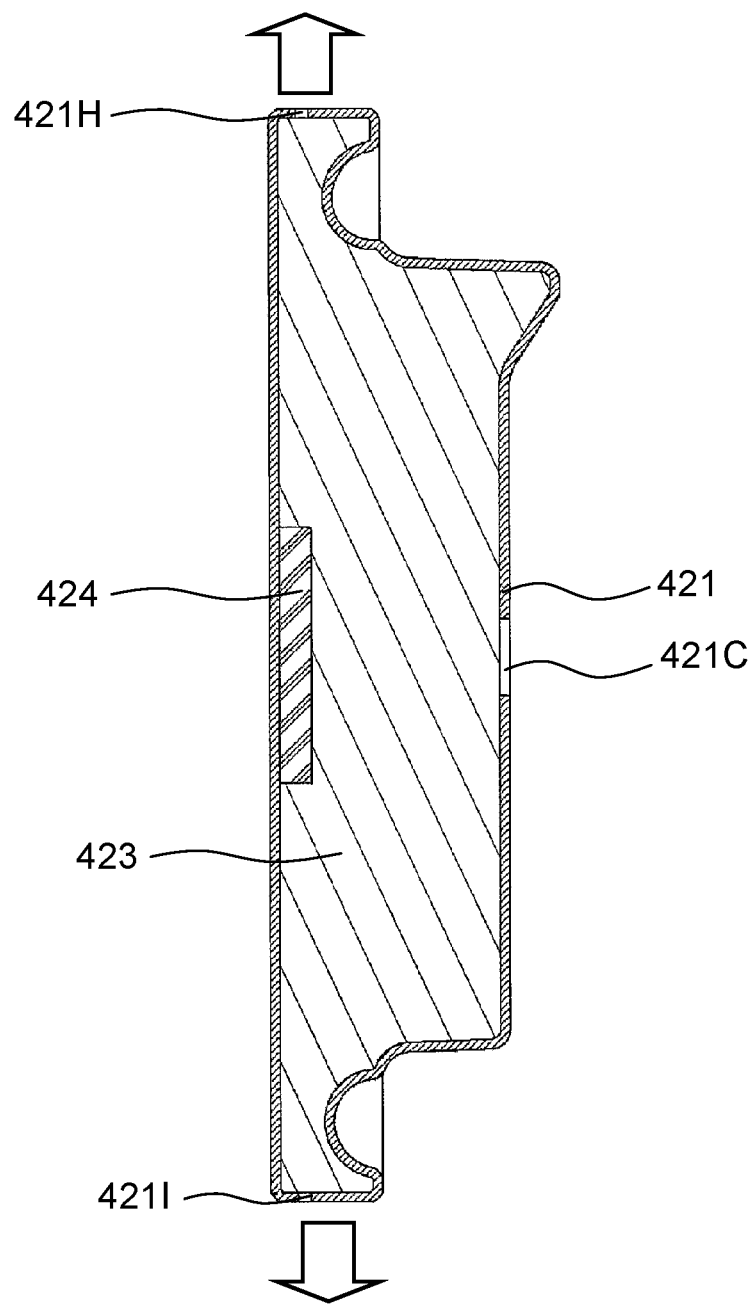
FIG. 58 is a longitudinal sectional view illustrating the gas barrier container of the vacuum heat insulator according to the ninth exemplary embodiment of the present disclosure.
Figure 59:
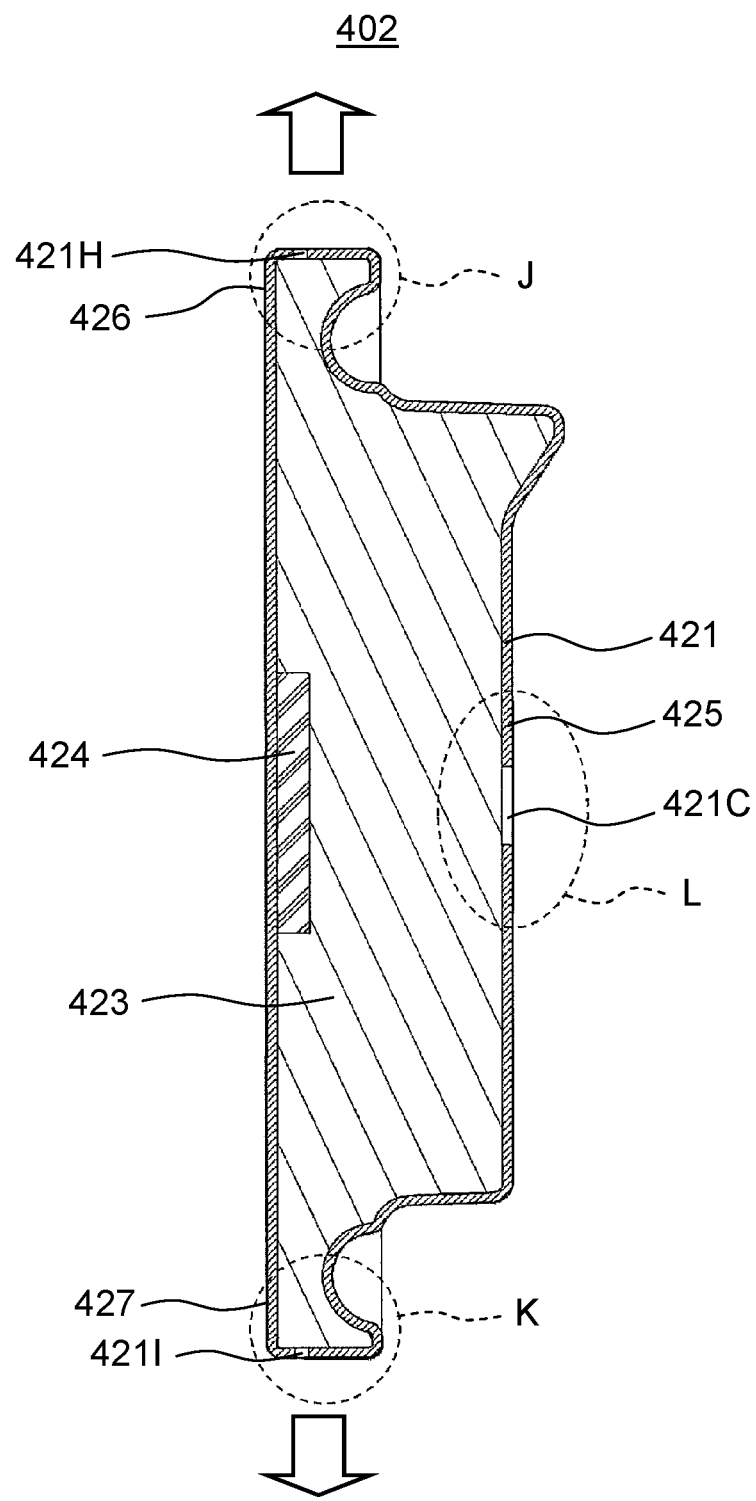
FIG. 59 is a longitudinal sectional view illustrating the gas barrier container of the vacuum heat insulator according to the ninth exemplary embodiment of the present disclosure.

FIG. 57 is a longitudinal sectional view illustrating a first member of a gas barrier container of the vacuum heat insulator according to the ninth exemplary embodiment of the present disclosure. FIG. 58 is a longitudinal sectional view illustrating the gas barrier container of the vacuum heat insulator according to the ninth exemplary embodiment of the present disclosure. FIG. 59 is a longitudinal sectional view illustrating the gas barrier container of the vacuum heat insulator according to the ninth exemplary embodiment of the present disclosure. FIGS. 57 to 59 each illustrate a sealing step performed for the gas barrier container of the vacuum heat insulator according to the ninth exemplary embodiment of the present disclosure.

Figure 60:
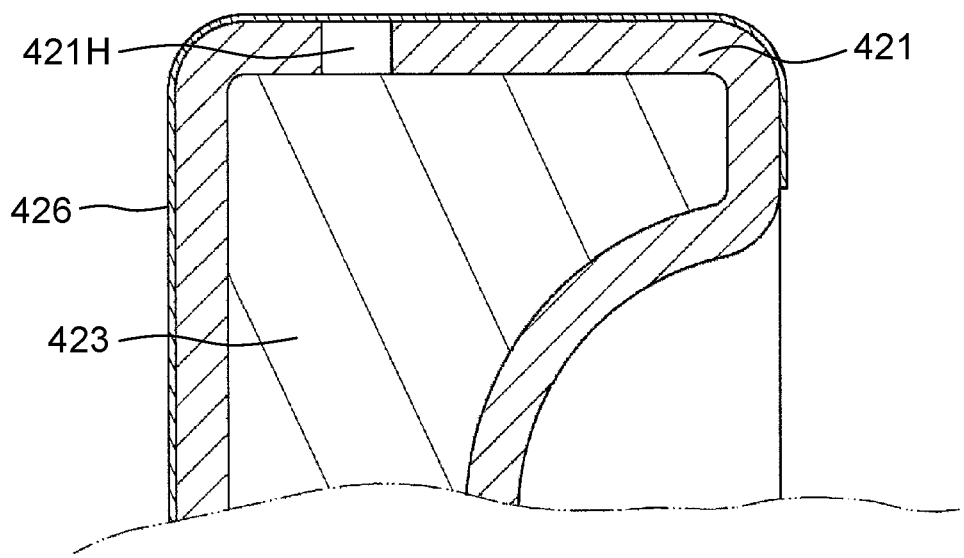
FIG. 60 is a schematic view illustrating enlarged part J shown in FIG. 59 and included in the gas barrier container of the vacuum heat insulator according to the ninth exemplary embodiment of the present disclosure.
Figure 61:
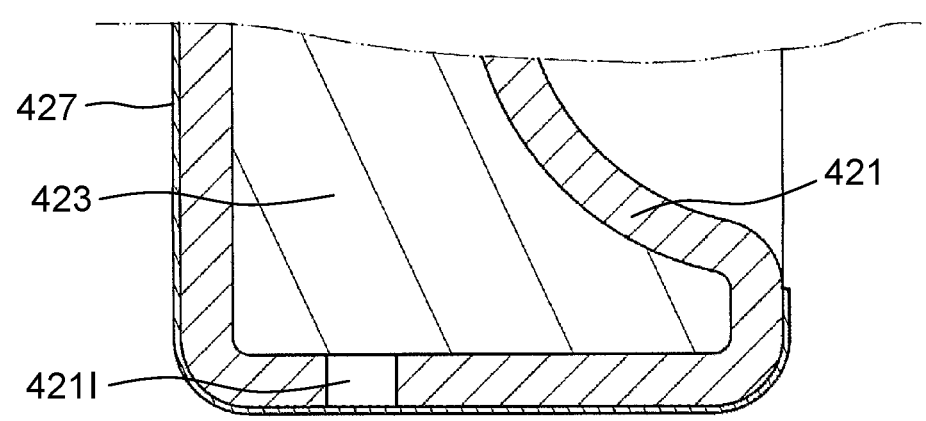
FIG. 61 is a schematic view illustrating enlarged part K shown in FIG. 59 and included in the gas barrier container of the vacuum heat insulator according to the ninth exemplary embodiment of the present disclosure.
Figure 62:
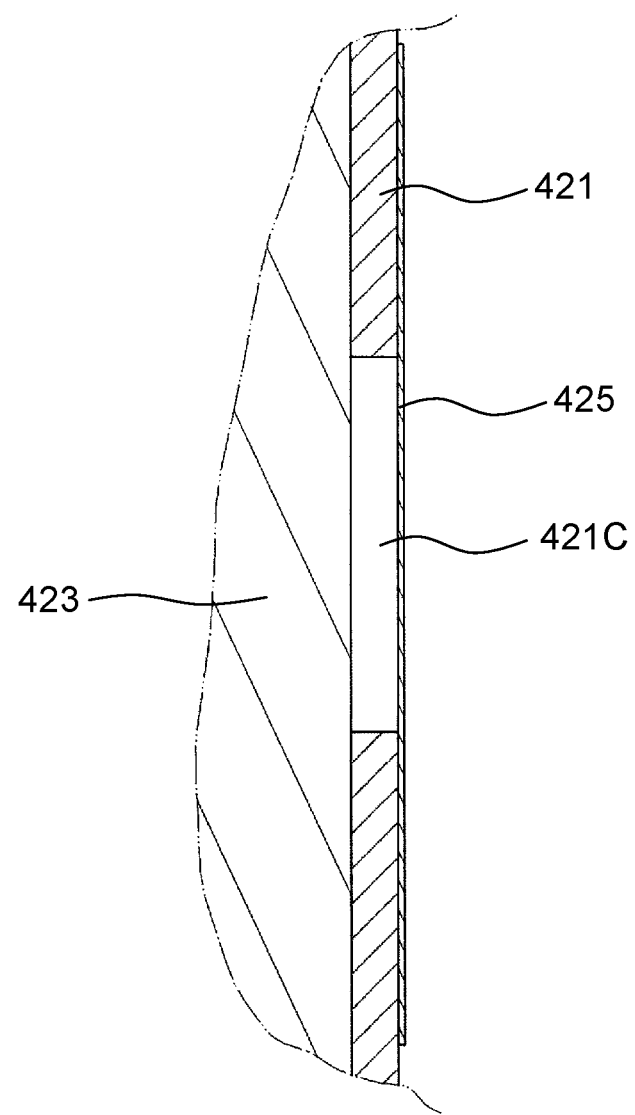
FIG. 62 is a schematic view illustrating enlarged part L shown in FIG. 59 and included in the gas barrier container of the vacuum heat insulator according to the ninth exemplary embodiment of the present disclosure.

FIG. 60 is a schematic view illustrating enlarged part J shown in FIG. 59 and included in the gas barrier container of the vacuum heat insulator according to the ninth exemplary embodiment of the present disclosure. FIG. 61 is a schematic view illustrating enlarged part K shown in FIG. 59 and included in the gas barrier container of the vacuum heat insulator according to the ninth exemplary embodiment of the present disclosure. FIG. 62 is a schematic view illustrating enlarged part L shown in FIG. 59 and included in the gas barrier container of the vacuum heat insulator according to the ninth exemplary embodiment of the present disclosure.

As illustrated in FIGS. 52 to 54, vacuum heat insulator 101I according to the ninth exemplary embodiment of the present disclosure constitutes a part of ice-making compartment door 4A illustrated in FIGS. 41 and 42 according to the eighth embodiment of the present disclosure. More specifically, ice-making compartment door 4A includes vacuum heat insulator 101I, gasket 441, a pair of frames 442, and a plurality of screws 443. As illustrated in FIGS. 55 to 59, vacuum heat insulator 101I includes external plate 401, gas barrier container 402, and inner box 403 which houses gas barrier container 402.

External plate 401 has a flat plate shape, and is constituted by a glass plate or a precoated steel plate, for example. External plate 401 and gas barrier container 402 are bonded to each other by sheet-shaped (film-shaped) adhesive 404. Adhesive 404 may be constituted by modified silicone or modified polyolefin, for example.

Inner box 403 has a box shape including second opening portion 403C, and has a front face opened via second opening portion 403C. Second opening portion 403C of inner box 403 is closed by external plate 401. A rear face of inner box 403 has a stepped shape, and includes first main face 403A forming a circumferential edge portion of the rear face, and second main face 403B forming a central portion of the rear face (see FIGS. 53 and 56).

Gasket groove 403F formed in first main face 403A of inner box 403 to receive gasket 441 is so shaped as to surround second main face 403B. The pair of frames 442 are fastened to a lower part of second main face 403B of inner box 403 by screws 443 (see FIGS. 52 and 53).

An adhesive (not shown) is disposed on a face included in an inner face of inner box 403 and facing gas barrier container 402 (counter face). The adhesive may be constituted by modified silicone, for example. The adhesive may be applied to either an entire surface of the counter face included in the inner face of inner box 403, or a part of the counter face included in the inner face of inner box 403.

When the adhesive is applied to a part of the counter face included in the inner face of inner box 403, it is preferable that the adhesive covers at least a part facing gasket 441. This configuration prevents communication (flow in and out of air) between the outside and a space formed between gas barrier container 402 and inner box 403, thereby further reducing a heat absorbing load imposed on heat insulation device 100B (refrigerator).

Gas barrier container 402 includes first member 421, core material 423, and absorbent 424. Core material 423 and absorbent 424 are disposed in an inner space defined by first member 421 and second member 422. Gas barrier container 402 is configured to have a predetermined degree of vacuum inside gas barrier container 402.

First member 421 is box-shaped, and is a molded component produced by blow molding in a shape corresponding to the inner shape of inner box 403.

A wall constituting first member 421 may be any one of the walls illustrated in FIGS. 44 to 49. For example, the wall constituting first member 421 may be configured such that thickness T1 of a portion of the wall adjacent to external plate 401 and thickness T2 of a portion of the wall adjacent to inner box 403 are equalized as illustrated in FIGS. 56 and 57. In this case, a material of the portion of the wall adjacent to external plate 401 may have a higher gas barrier property than that of the portion of the wall adjacent to inner box 403.

Alternatively, the wall constituting first member 421 may be configured such that thickness T1 of the portion of the wall adjacent to external plate 401 is larger than thickness T2 of the portion of the wall adjacent to inner box 403. This configuration increases the gas barrier property of ice-making compartment door 4A adjacent to external plate 401 having a high ambient temperature, thereby maintaining a sufficient gas barrier property for a high temperature. Accordingly, sufficient reduction of deterioration of heat insulation performance is achievable.

An interior of gas barrier container 402 at an appropriate position of a rear face of first member 421 (an interior of first member 421) is filled with urethane or the like constituting core material 423. First through hole 421C is further formed in the rear face of first member 421. First through hole 421C is a hole through which an interior of gas barrier container 402 is vacuumed (see FIG. 59). Sealing member 425 is provided at a circumferential edge of first through hole 421C (see FIG. 62). Sealing member 425 is configured to seal first through hole 421C.

Air escapement hole 421H is further formed in an upper face of first member 421. Air escapement hole 421H is a hole through which air inside first member 421 is discharged to the outside at the time of filling of urethane or the like.

Sealing member 426 is provided at a circumferential edge of air escapement hole 421H (see FIGS. 59 and 60). Similarly, air escapement hole 421I is formed in a lower face of first member 421. Sealing member 427 is provided at a circumferential edge of air escapement hole 421I (see FIGS. 59 and 61).

Each of air escapement hole 421H and air escapement hole 421I corresponds to an air injection hole formed for blow molding of first member 421. Each of sealing member 426 and sealing member 427 is so disposed as to cover a parting line (not shown) formed at the time of blow molding of first member 421.

During filling of urethane via first through hole 421C of first member 421, air is discharged from an interior of first member 421 to the outside through air escapement hole 421H and air escapement hole 421I. When a degree of vacuum of the inner space defined by first member 421 and second member 422 reaches a predetermined degree in a state that the inner space defined by first member 421 and second member 422 is filled with urethane, first through hole 421C, air escapement hole 421H, and air escapement hole 421I are sealed by sealing members 425 to 427, respectively.

For example, each of sealing members 425 to 427 may be constituted by a laminated film. The laminated film may be made of thermoplastic resin such as low density polyethylene film, linear low density polyethylene film, middle density polyethylene film, high density polyethylene film, polypropylene film, and polyacrylonitrile film, or a mixture of these materials.

The laminated film may include a metal layer made of aluminum, stainless steel or other metal materials. In this case, the metal layer may be formed inside the laminated film, or on a surface of the laminated film. Furthermore, the metal layer may be metal foil such as aluminum foil. Alternatively, the metal layer may be formed by vapor deposition of aluminum or the like on the surface of the laminated film.

Any modes of sealing members 425 to 427 may be adopted as long as a gas barrier property is given to sealing members 425 to 427. For example, sealing members 425 to 427 may be constituted by glass plates or precoated steel plates. When sealing members 425 to 427 are constituted by laminated films, sealing members 425 to 427 may be welded to first member 421 to seal first through hole 421C and others. When sealing member 425 to 427 are constituted by glass plates or precoated steel plates, sealing members 425 to 427 may be bonded to first member 421 by an adhesive to seal first through hole 421C and others.

Core material 423 may be constituted by open-cell urethane foam, for example. The open-cell urethane foam may be a material having characteristics disclosed in PTL 2, for example. In this case, core material 423 has a shape identical to a shape of an inner face (inner space) of first member 421. Core material 423 may be made of glass fibers, rock wool, alumina fibers, or polyethylene terephthalate fibers, for example.

Examples of absorbent 424 include a moisture absorbent that absorbs and removes moisture, and a gas absorbent that absorbs gas such as atmospheric gas. For example, the moisture absorbent may be made of a chemical absorption substance such as calcium oxide or magnesium oxide, or a physical absorption substance such as zeolite.

The gas absorbent is constituted by an absorbing material capable of absorbing non-condensable gas contained in gas, and a container. Examples of the absorbing material include an alloy composed of zirconium, vanadium, and tungsten, an alloy composed of iron, manganese, yttrium, lanthanum, and one of rare-earth elements, Ba—Li alloy, and zeolite subjected to ion exchange with metal ion (e.g., copper ion).
[Advantageous Effects of Vacuum Heat Insulator and Heat Insulation Device Provided with Same]

Described are advantageous effects of vacuum heat insulator 101I, and heat insulation device 100B provided with the same configured as above according to the present exemplary embodiment.

According to vacuum heat insulator 101I of the present exemplary embodiment, external plate 401 is constituted by a metal plate having an excellent gas barrier property, or a glass plate. This configuration achieves sufficient reduction of gas permeation from the outside to the inside of vacuum heat insulator 101I (heat insulation device 100B).

Moreover, according to vacuum heat insulator 101I of the present exemplary embodiment, external plate 401 and gas barrier container 402 are bonded via sheet-shaped adhesive 404. This configuration brings external plate 401 and gas barrier container 402 into tight contact with each other, thereby preventing generation of a clearance between external plate 401 and gas barrier container 402. This configuration therefore further prevents the gas permeation from external plate 401 into gas barrier container 402, thereby achieving sufficient reduction of deterioration of heat insulation performance.

Furthermore, according to vacuum heat insulator 101I of the present exemplary embodiment, gas barrier container 402 is formed by blow molding capable of producing any shapes. This configuration equalizes the inner surface shape of gas barrier container 402 with the inner surface shape of inner box 403. In other words, this configuration forms an outer surface shape of first member 421 of gas barrier container 402 in a shape fitting with the inner face of inner box 403. Accordingly, generation of a clearance between gas barrier container 402 and inner box 403 is avoidable. This configuration further reduces convection of air between gas barrier container 402 and inner box 403, thereby improving heat insulation performance. Moreover, this configuration brings gas barrier container 402 and inner box 403 into tight contact, thereby improving rigidity and strength of vacuum heat insulator 101I.

According to vacuum heat insulator 101I of the present exemplary embodiment, first through hole 421C of first member 421 and sealing member 425 are disposed near inner box 403 which corresponds to the low temperature side. This configuration prevents exposure of sealing member 425 to a high temperature, thereby maintaining a sufficient bonding condition of sealing member 425. This configuration therefore retains a sufficient degree of vacuum inside gas barrier container 402, and achieves sufficient reduction of deterioration of heat insulation performance. Accordingly, vacuum heat insulator 101I of the present exemplary embodiment secures vacuum heat insulation performance for a long period of time.

According to vacuum heat insulator 101I of the present exemplary embodiment, first member 421 includes air escapement hole 421H and air escapement hole 421I. In this case, air is discharged from the interior of first member 421 through air escapement hole 421H and air escapement hole 421I at the time of filling of urethane into first member 421 and foaming of the urethane. Accordingly, first member 421 is allowed to be filled with an amount of urethane set beforehand, thereby achieving sufficient vacuum heat insulation performance.

According to vacuum heat insulator 101I of the present exemplary embodiment, absorbent 424 is provided inside gas barrier container 402. In this case, air or gas such as moisture having permeated gas barrier container 402 is absorbed by absorbent 424, wherefore a predetermined degree of vacuum can be maintained inside gas barrier container 402 for a long period of time. Accordingly, vacuum heat insulator 101I of the present exemplary embodiment secures vacuum heat insulation performance for a long period of time.

In addition, sealing members 425 to 427 are each constituted by a laminated film including a material identical to a material of a layer located outermost in the wall of first member 421. In this case, sealing members 425 to 427 are more rigidly welded to the wall of first member 421. Accordingly, the tightly closed conditions of first through hole 421C, air escapement hole 421H, and air escapement hole 421I are maintained for a long period of time. This configuration therefore retains a predetermined degree of vacuum inside gas barrier container 402, thereby securing vacuum heat insulation performance of vacuum heat insulator 101I according to the present exemplary embodiment for a long period of time.

According to vacuum heat insulator 101I of the present exemplary embodiment, sealing member 426 and sealing member 427 are so disposed as to cover the parting line (not shown) formed at the time of blow molding of first member 421. This configuration sufficiently retains tightly closed states of air escapement hole 421H and air escapement hole 421I of first member 421, thereby further preventing gas permeation into gas barrier container 402. This configuration therefore retains a predetermined degree of vacuum inside gas barrier container 402, thereby securing vacuum heat insulation performance of vacuum heat insulator 101I according to the present exemplary embodiment for a long period of time.

Modified Example of Ninth Exemplary Embodiment

A modified example of vacuum heat insulator 101I according to the ninth exemplary embodiment of the present disclosure is now described with reference to FIGS. 63 to 65.
[Configuration of Vacuum Heat Insulator]

Figure 63:
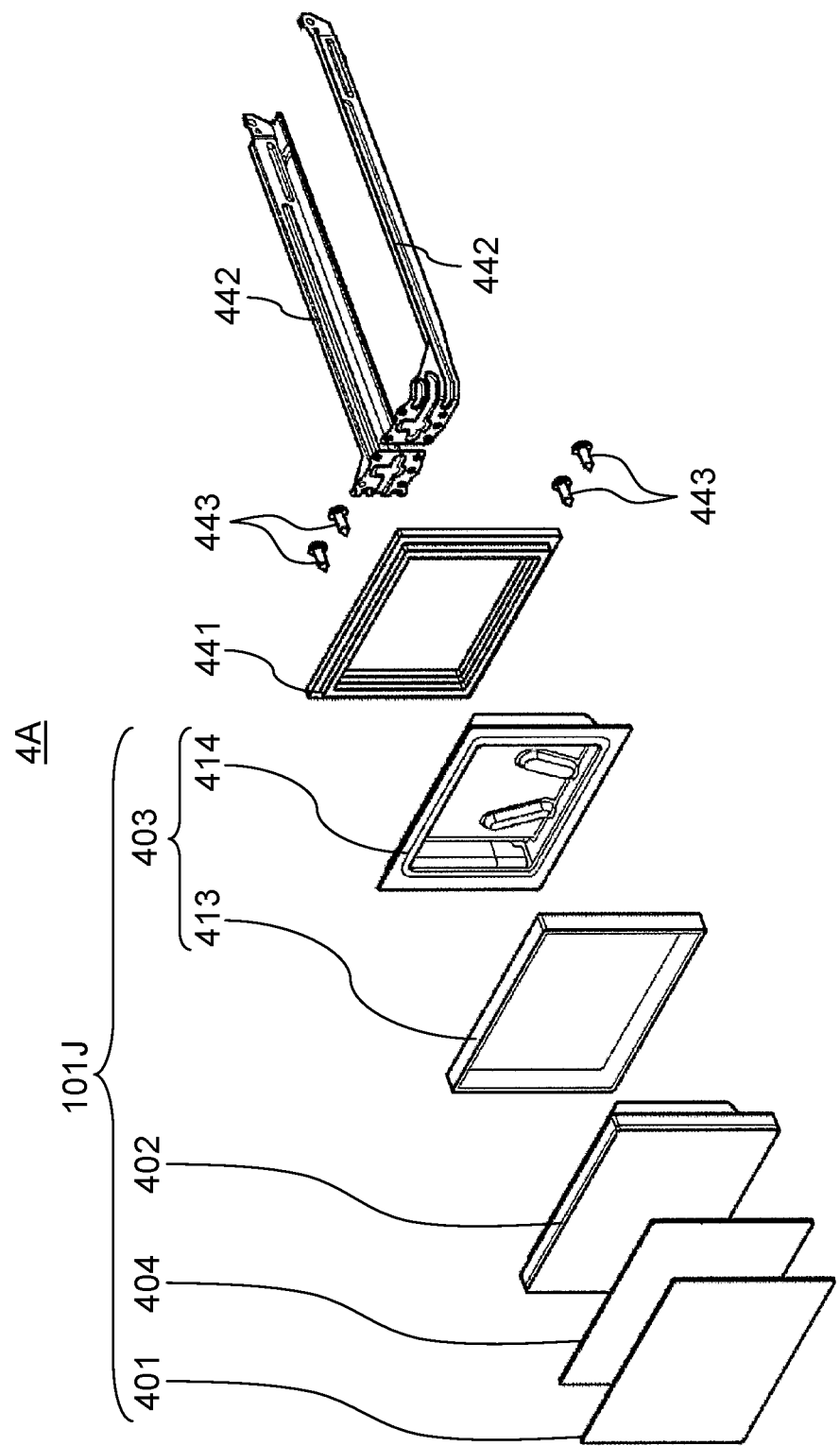
FIG. 63 is a developed view illustrating respective developed members which constitute an ice-making compartment door provided with a vacuum heat insulator according to a modified example of the ninth exemplary embodiment of the present disclosure.

FIG. 63 is a developed view illustrating respective developed members which constitute an ice-making compartment door provided with the vacuum heat insulator according to the modified example of the ninth exemplary embodiment of the present disclosure. FIG. 64 is a longitudinal sectional view of the vacuum heat insulator according to the ninth exemplary embodiment of the present disclosure. FIG. 65 is a developed view illustrating respective developed members which constitute the vacuum heat insulator according to the ninth exemplary embodiment of the present disclosure.

Figure 64:
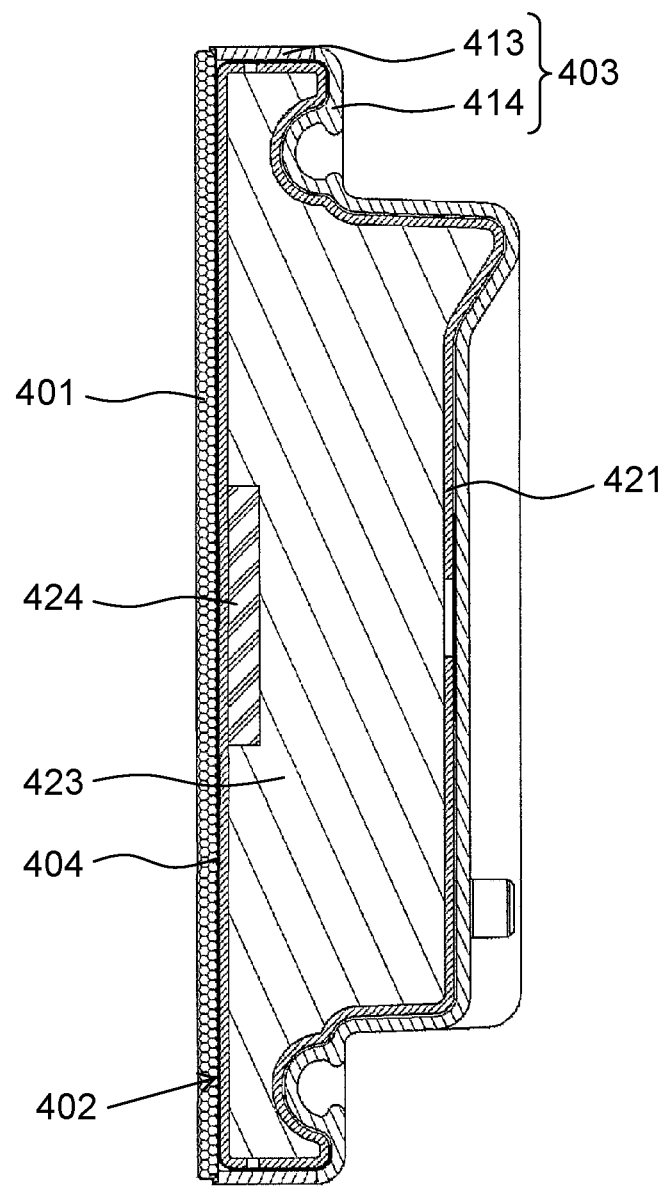
FIG. 64 is a longitudinal sectional view of the vacuum heat insulator according to the modified example of the ninth exemplary embodiment of the present disclosure.
Figure 65:
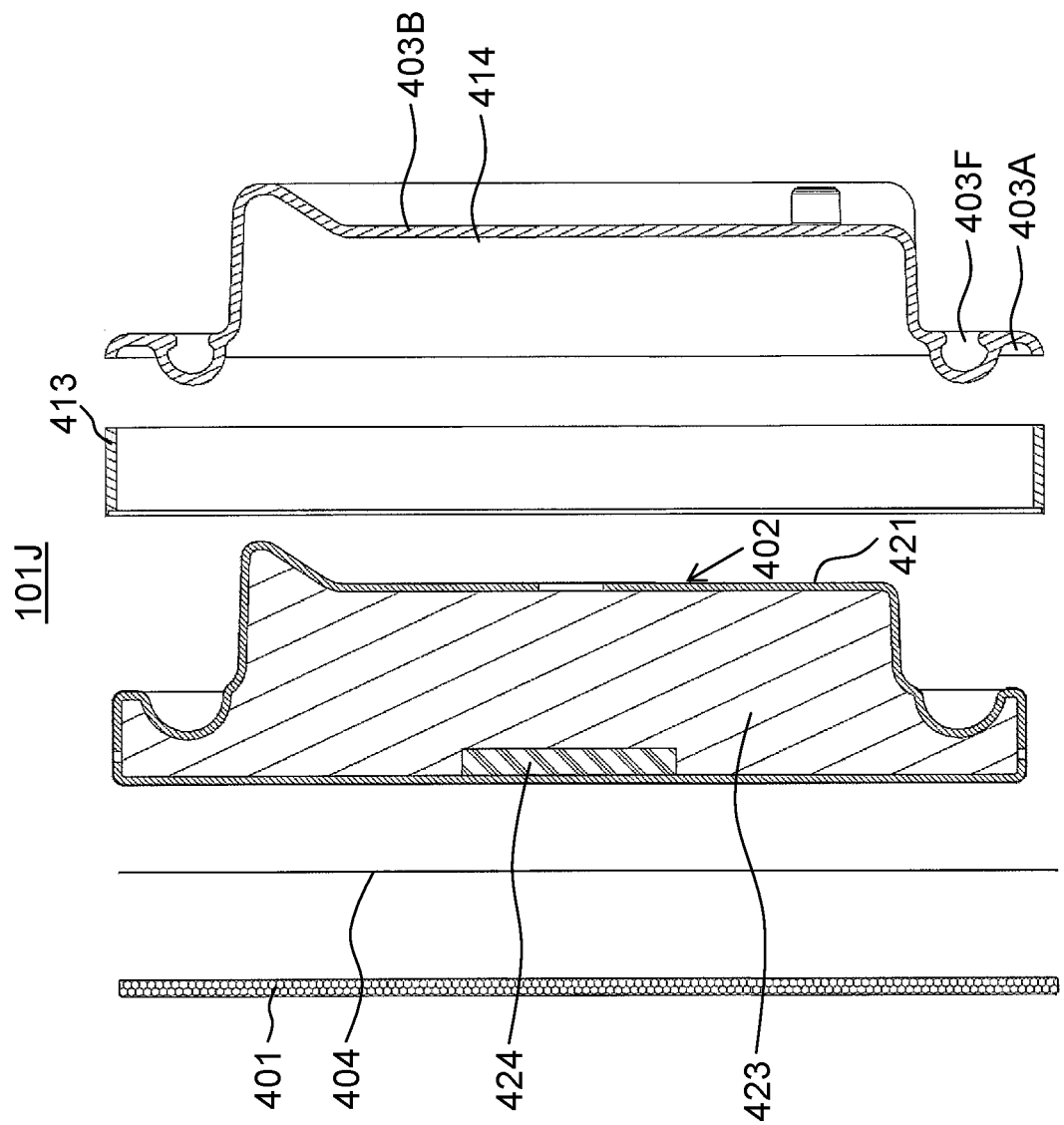
FIG. 65 is a developed view illustrating respective developed members which constitute the vacuum heat insulator according to the modified example of the ninth exemplary embodiment of the present disclosure.

As illustrated in FIGS. 63 to 65, a basic configuration of vacuum heat insulator 101J according to the modified example of the ninth exemplary embodiment of the present disclosure is similar to the basic configuration of vacuum heat insulator 101I according to the ninth exemplary embodiment. However, vacuum heat insulator 101J is different from vacuum heat insulator 101I in the configuration of inner box 403. More specifically, inner box 403 is constituted by circumferential edge member 413 having a frame shape, and bottom member 414 forming a face opposite to gas barrier container 402 (counter face). Circumferential edge member 413 may be constituted by either a plurality of members, or a single member. For example, circumferential edge member 413 may be constituted by four strip-shaped members forming four sides of inner box 403.

This configuration increases a degree of freedom in designing sides of ice-making compartment door 4A, thereby improving design and usability of a heat insulation door (ice-making compartment door 4A according to present Exemplary Embodiment to be provided.

While the sides of ice-making compartment door 4A are constituted by circumferential edge member 413 in the present modified example, other modes may be adopted. For example, in a different adoptable mode, the sides of ice-making compartment door 4A may be constituted by a part of external plate 401, and a pair of strip-shaped members. More specifically, for example, left and right sides of ice-making compartment door 4A may be formed by bending a pair of left and right sides of external plate 401, while upper and lower sides of ice-making compartment door 4A may be constituted by a pair of strip-shaped members.

The configuration of inner box 403 of vacuum heat insulator 101J according to the present modified example may be applied to the configuration of inner box 403 included in vacuum heat insulators 101A to 101I of the first to ninth exemplary embodiments described above.

Tenth Exemplary Embodiment

[Configuration of Vacuum Heat Insulator]

Figure 66:
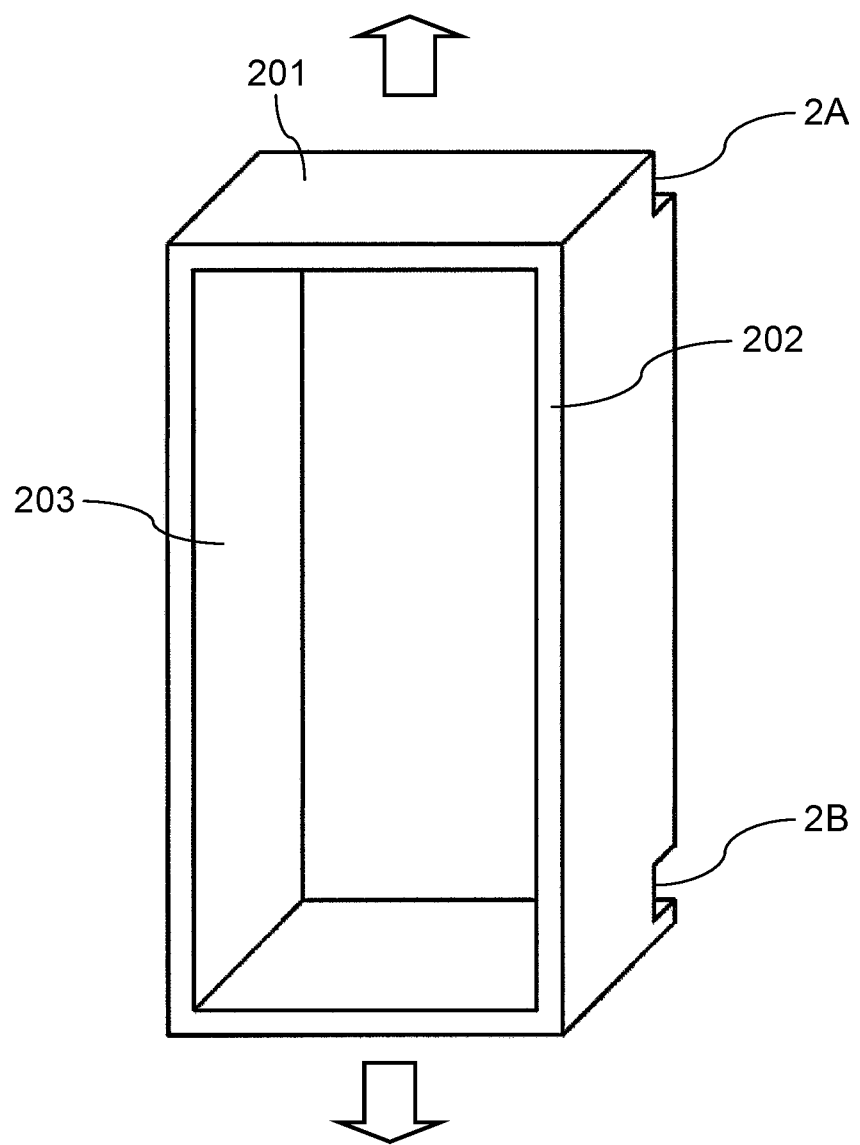
FIG. 66 is a perspective view illustrating a general configuration of a refrigerator body provided with a vacuum heat insulator according to a tenth exemplary embodiment of the present disclosure.
Figure 67:
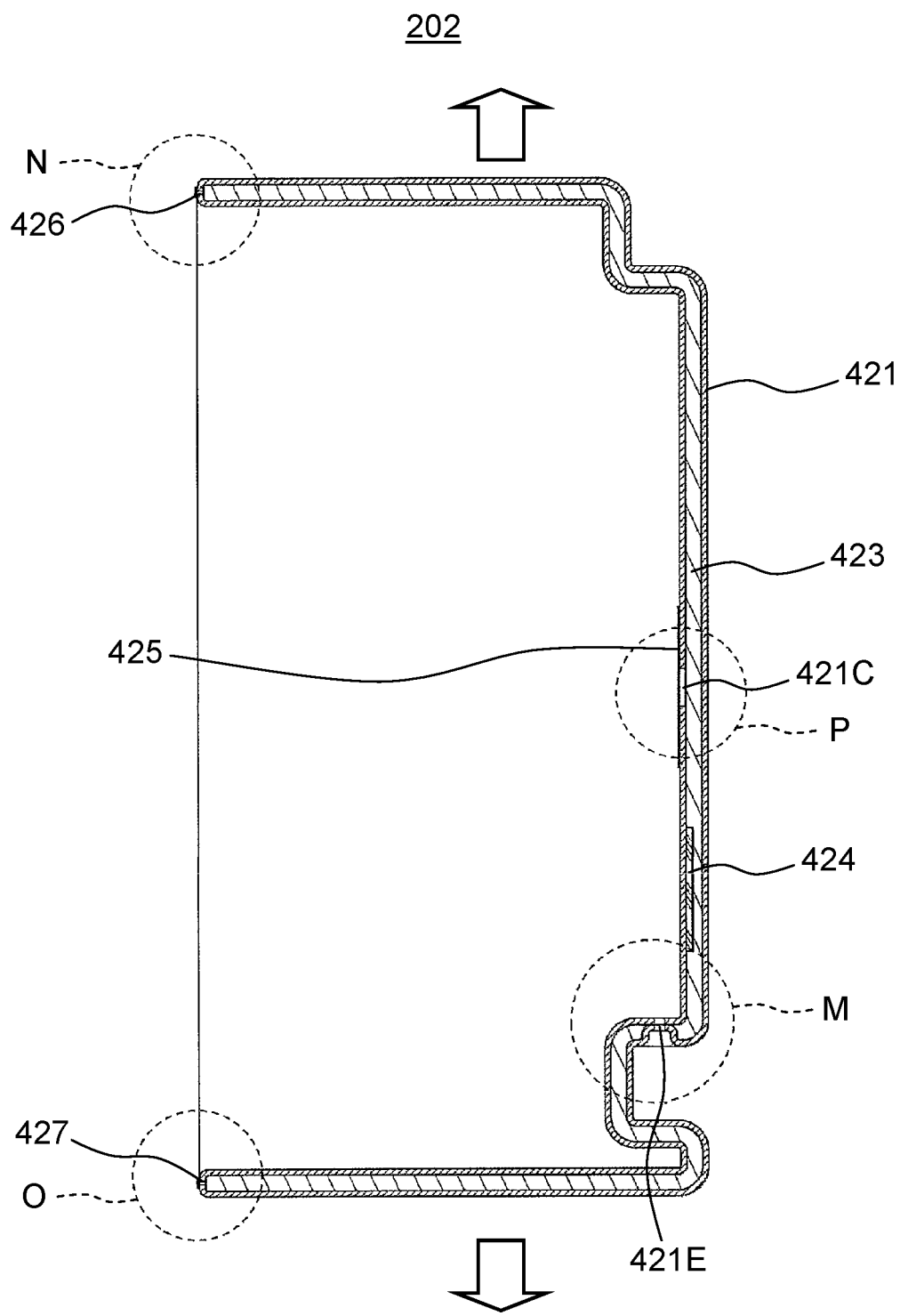
FIG. 67 is a longitudinal sectional view illustrating a gas barrier container of the vacuum heat insulator according to the tenth exemplary embodiment of the present disclosure.
Figure 68:
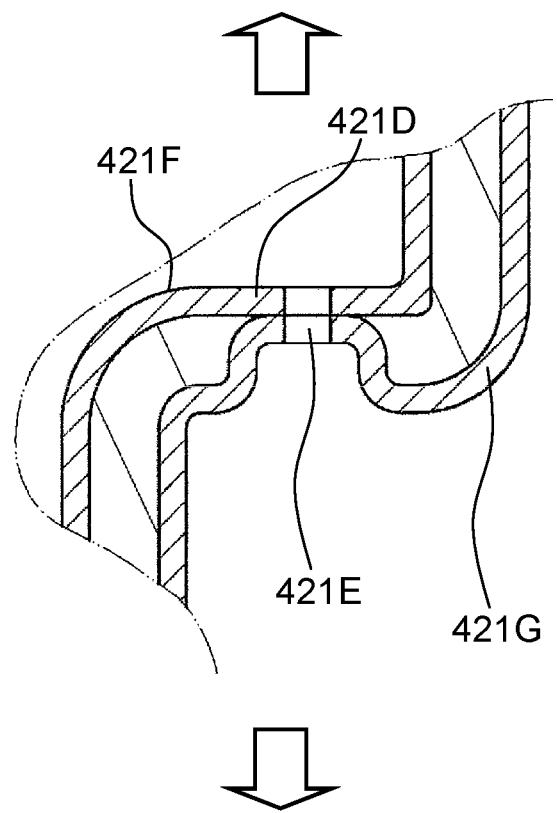
FIG. 68 is a cross-sectional view illustrating enlarged part M shown in FIG. 67 and included in the gas barrier container of the vacuum heat insulator according to the tenth exemplary embodiment of the present disclosure.
Figure 69:
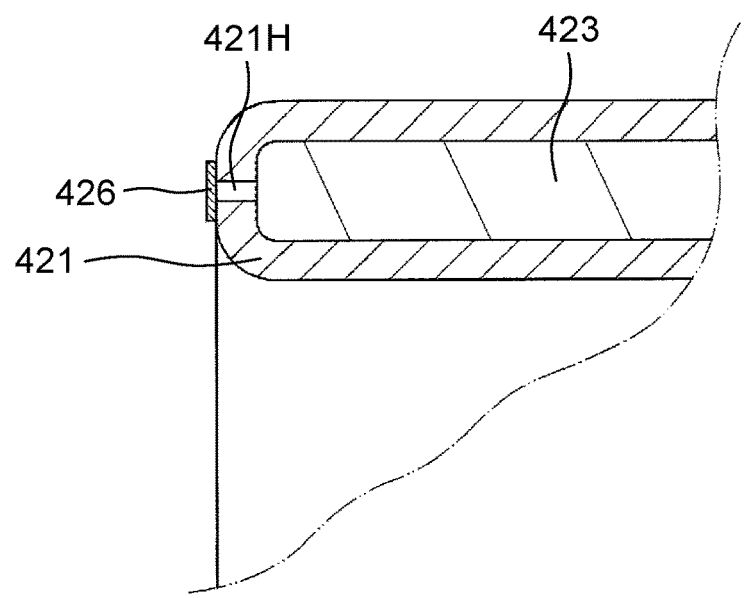
FIG. 69 is a cross-sectional view illustrating enlarged part N shown in FIG. 67 and included in the gas barrier container of the vacuum heat insulator according to the tenth exemplary embodiment of the present disclosure.
Figure 70:
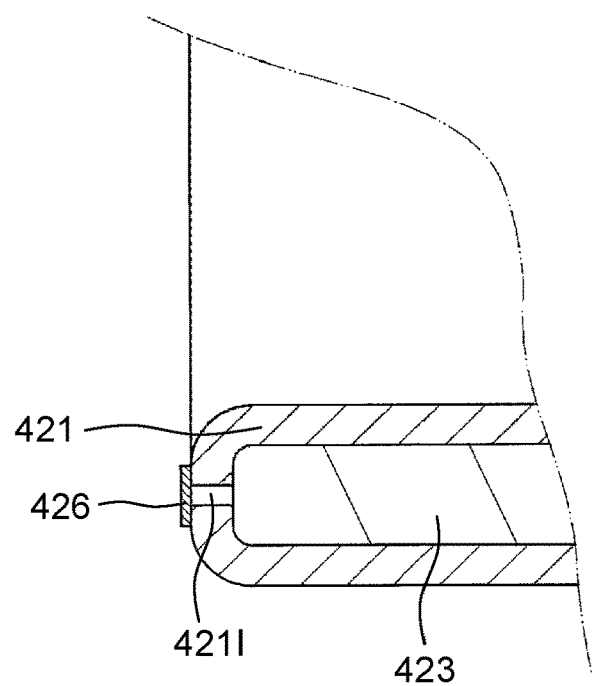
FIG. 70 is a cross-sectional view illustrating enlarged part O shown in FIG. 67 and included in the gas barrier container of the vacuum heat insulator according to the tenth exemplary embodiment of the present disclosure.
Figure 71:
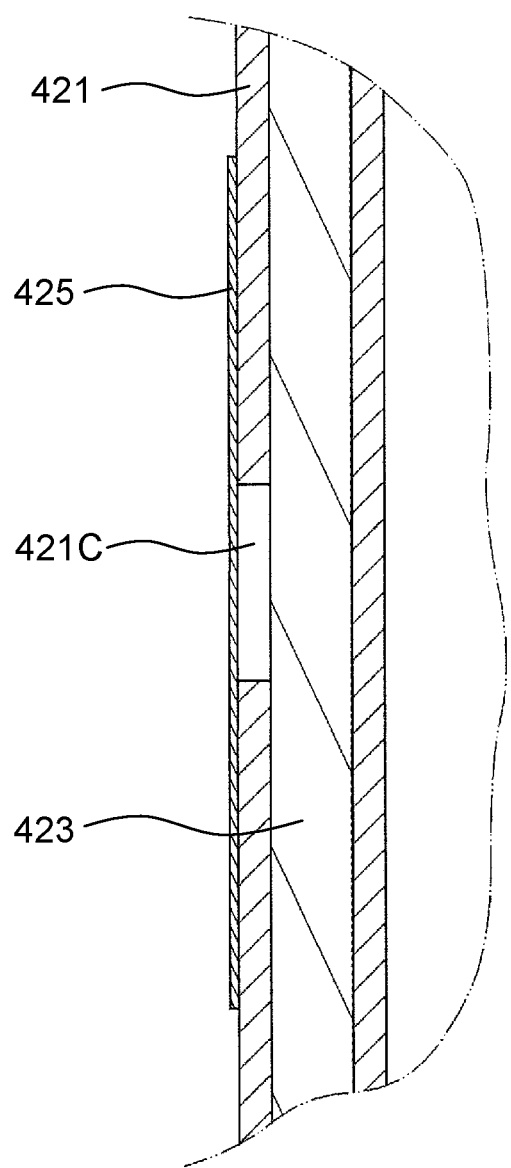
FIG. 71 is a cross-sectional view illustrating enlarged part P shown in FIG. 67 and included in the gas barrier container of the vacuum heat insulator according to the tenth exemplary embodiment of the present disclosure.

FIG. 66 is a perspective view illustrating a general configuration of a refrigerator body provided with a vacuum heat insulator according to a tenth exemplary embodiment of the present disclosure. FIG. 67 is a longitudinal sectional view illustrating a gas barrier container of the vacuum heat insulator according to the tenth exemplary embodiment of the present disclosure. FIG. 68 is a cross-sectional view illustrating enlarged part M shown in FIG. 67 and included in the gas barrier container of the vacuum heat insulator according to the tenth exemplary embodiment of the present disclosure. FIG. 69 is a cross-sectional view illustrating enlarged part N of the gas barrier container shown in FIG. 67. FIG. 70 is a cross-sectional view illustrating enlarged part O shown in FIG. 67 and included in the gas barrier container of the vacuum heat insulator according to the tenth exemplary embodiment of the present disclosure. FIG. 71 is a cross-sectional view illustrating enlarged part P shown in FIG. 67 and included in the gas barrier container of the vacuum heat insulator according to the tenth exemplary embodiment of the present disclosure.

Concerning an up-down direction of refrigerator body 2, an upward direction and a downward direction of refrigerator body 2 correspond to an upward direction, and a downward direction as viewed in FIG. 66 as indicated by arrows in the figure. Concerning an up-down direction of gas barrier container 202, an upward direction and a downward direction of gas barrier container 202 correspond to an upward direction and a downward direction as viewed in FIG. 67.

As illustrated in FIGS. 66 and 67, vacuum heat insulator 101K according to the tenth exemplary embodiment of the present disclosure constitutes a part of refrigerator body 2 of heat insulation device 100B illustrated in FIGS. 41 and 42 according to the eighth embodiment of the present disclosure. Vacuum heat insulator 101K according to the present exemplary embodiment includes gas barrier container 202 which has a box shape having an opened front face, external plates 201 respectively attached to five outside main faces of gas barrier container 202, and inner box 203 attached to an inner face of gas barrier container 202.

Each of external plates 201 has a flat plate shape, and is constituted by a glass plate or a precoated steel plate, for example. External plates 201 and gas barrier container 202 are bonded to each other by a sheet-shaped (film-shaped) adhesive (not shown). The adhesive may be constituted by modified silicone or modified polyolefin, for example.

Inner box 203 has an opened front face, and has a box shape including a second opening portion. The second opening portion is closed by respective doors of refrigerating compartment door 3 through second freezing compartment door 6 (see FIGS. 41 and 42).

Inner box 203 and gas barrier container 202 are bonded to each other by an adhesive (not shown). The adhesive may be constituted by modified silicone, for example. The adhesive may be applied to either an entire surface of the inner face of inner box 203, or a part of the inner face of inner box 203.

As illustrated in FIG. 42, refrigerator body 2 further includes through hole 210 between evaporator 9 and evaporating dish 20. More specifically, through hole 210 is formed in an upper face constituting recess 2B.

Through hole 210 is constituted by a through hole formed in an upper face constituting recess 2B of external plate 201, a through hole formed in an upper face constituting recess 2B of inner box 203, and through hole 421E formed in an upper face constituting recess 2B of gas barrier container 202 (see FIGS. 67 and 68).

Through hole 421E of gas barrier container 202 may be formed in a following manner, for example. As illustrated in FIG. 68, at least a part of either one of opposite portions of first member 421 constituting recess 2B of gas barrier container 202 (upper part 421F and lower part 421G in this example) is heated to thermally weld upper portion 421F and lower portion 421G and produce thermal-welded portion 421D having a planar shape. Subsequently, thermally welded portion 421D is drilled to form through hole 421E.

First through hole 421C is further formed in a face facing inner box 203 of gas barrier container 202 (first member 421). First through hole 421C is a hole through which an interior of gas barrier container 202 is vacuumed. The interior of gas barrier container 202 (an interior of first member 421) is filled with urethane or the like constituting core material 423. As illustrated in FIGS. 67 and 71, sealing member 425 is provided at a circumferential edge of first through hole 421C. Sealing member 425 is configured to seal first through hole 421C.

Air escapement hole 421H is formed in an upper part of a front face of gas barrier container 202 (first member 421) as illustrated in FIG. 69. Sealing member 426 is provided at a circumferential edge of air escapement hole 421H. Similarly, air escapement hole 421I is formed in a lower part of the front face of gas barrier container 202 (first member 421) as illustrated in FIG. 70. Sealing member 427 is provided at a circumferential edge of air escapement hole 421I.

Gas barrier container 202 of vacuum heat insulator 101K of the present exemplary embodiment has a basic configuration similar to the basic configuration of gas barrier container 402 of vacuum heat insulator 101I of the ninth exemplary embodiment. Accordingly, this configuration is not repeatedly described in detail.

Vacuum heat insulator 101K thus configured according to the present exemplary embodiment achieves advantageous effects similar to those of vacuum heat insulator 101I according to the ninth exemplary embodiment.

While inner box 403 is constituted by the single member according to the present exemplary embodiment, other modes may be adopted. In a different adoptable mode, inner box 403 may have the configuration according to the modified example of the ninth exemplary embodiment.

Modified Example of Tenth Exemplary Embodiment

A modified example of vacuum heat insulator 101K according to the tenth exemplary embodiment of the present disclosure is now described with reference to FIG. 72.

Figure 72:
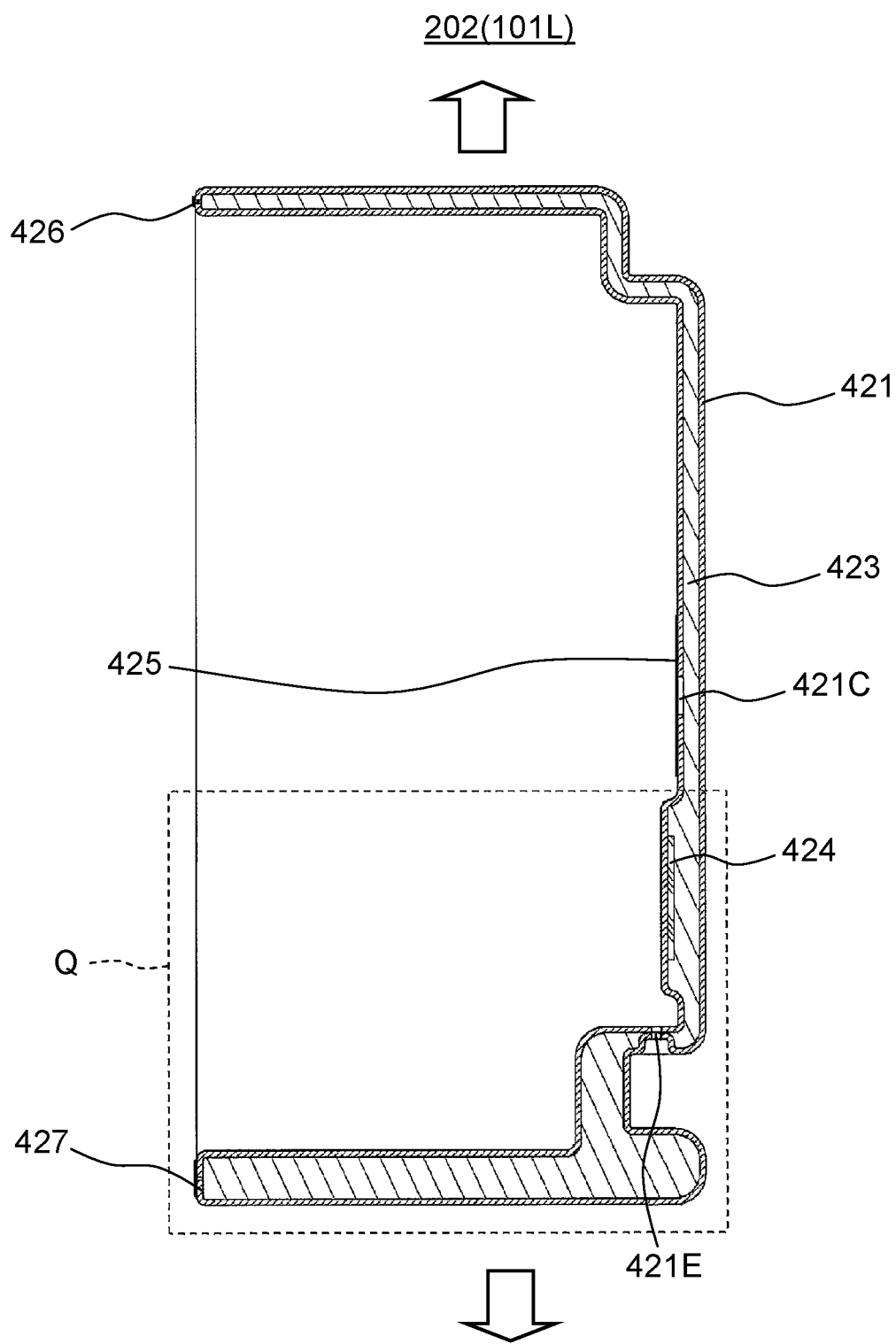
FIG. 72 is a longitudinal sectional view illustrating a gas barrier container of a vacuum heat insulator according to a modified example of the tenth exemplary embodiment of the present disclosure.

FIG. 72 is a longitudinal sectional view illustrating a gas barrier container of a vacuum heat insulator according to the modified example of the tenth exemplary embodiment of the present disclosure.

As illustrated in FIG. 72, a basic configuration of gas barrier container 202 of vacuum heat insulator 101L according to the present modified example is similar to the basic configuration of gas barrier container 202 according to the tenth exemplary embodiment. However, gas barrier container 202 of vacuum heat insulator 101L is different from gas barrier container 202 of the tenth exemplary embodiment in that a thickness of a lower part (a part surrounded by symbol Q in FIG. 72) of gas barrier container 202 is larger than a thickness of the other part. The part surrounded by symbol Q is a part constituting second freezing compartment 14.

According to this configuration, heat insulation performance of the part surrounded by symbol Q in gas barrier container 202 is higher than heat insulation performance of the other part. Accordingly, reduction of fluctuations of a compartment temperature of second freezing compartment 14 is achievable.

Vacuum heat insulator 101L thus configured according to the present modified example achieves advantageous effects similar to those of vacuum heat insulator 101K according to the tenth exemplary embodiment.

Eleventh Exemplary Embodiment

[Configuration of Vacuum Heat Insulator]

Figure 73:
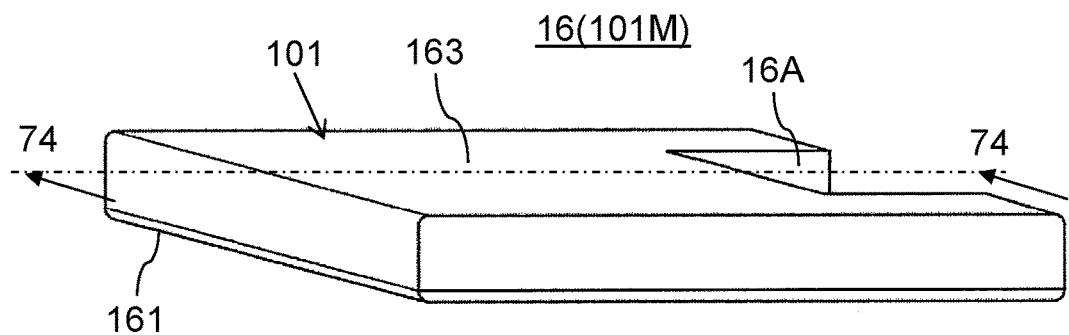
FIG. 73 is a perspective view schematically illustrating a general configuration of a vacuum heat insulator according to an eleventh exemplary embodiment of the present disclosure.
Figure 74:
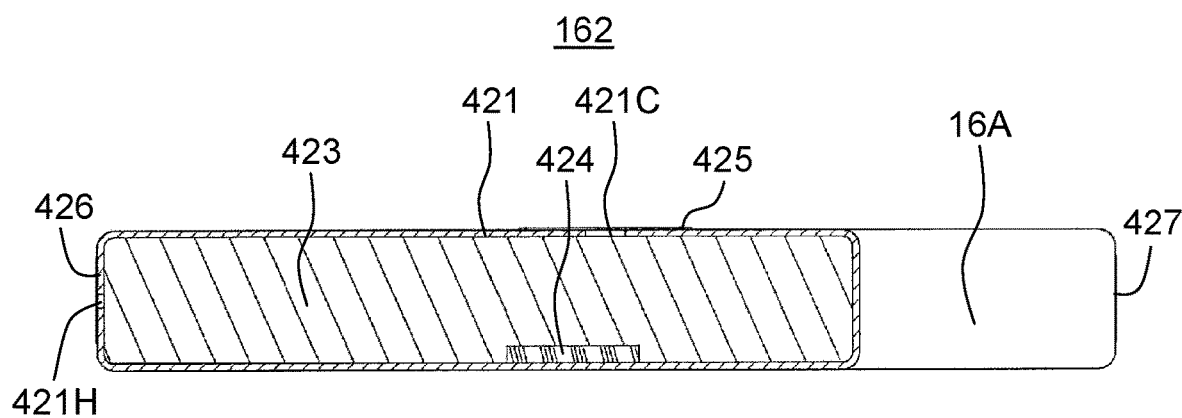
FIG. 74 is a cross-sectional view of the vacuum heat insulator according to the eleventh exemplary embodiment of the present disclosure, taken along line 74-74 in FIG. 73.

FIG. 73 is a perspective view illustrating a general configuration of a vacuum heat insulator according to an eleventh exemplary embodiment of the present disclosure. FIG. 74 is a cross-sectional view of the eleventh exemplary embodiment of the present disclosure taken along line 74-74 in FIG. 73, while FIG. 75 is a cross-sectional view of a gas barrier container of the eleventh exemplary embodiment of the present disclosure taken along a part not including a recess.

Figure 75:
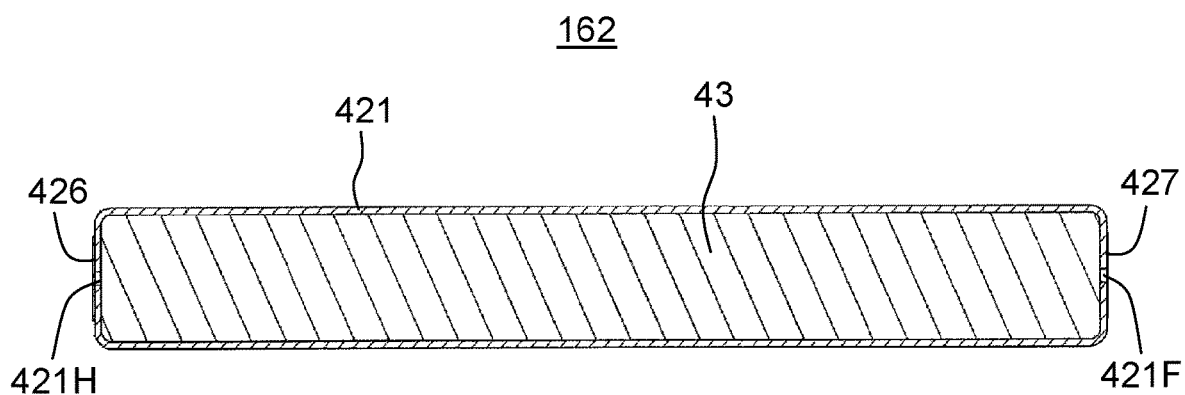
FIG. 75 is a cross-sectional view illustrating a portion not including a recess in a gas barrier container of the vacuum heat insulator according to the eleventh exemplary embodiment of the present disclosure.

As illustrated in FIGS. 73 to 75, vacuum heat insulator 101M according to the eleventh exemplary embodiment of the present disclosure constitutes partition wall 16 of heat insulation device 100B illustrated in FIGS. 41 and 42 according to the eighth embodiment of the present disclosure. Partition wall 16 has a plate shape, and includes recess 16A on the rear side of heat insulation device 100B. A partition wall (not shown) forming cooling channel 10 is disposed in recess 16A. Vacuum heat insulator 101M according to the present exemplary embodiment includes external plate 161, gas barrier container 162, and inner box 163 which houses gas barrier container 162. External plate 161 is disposed on the high ambient temperature side of vacuum heat insulator 101M (a lower part, adjacent to vegetable compartment 13).

External plate 161 has a flat plate shape, and includes a recess formed on the rear side of heat insulation device 100B. External plate 161 is constituted by a glass plate or a precoated steel plate, for example. External plate 161 and gas barrier container 162 are bonded to each other by a sheet-shaped (film-shaped) adhesive (not shown). The adhesive may be constituted by modified silicone or modified polyolefin, for example.

Inner box 163 includes an opened lower face, and has a box shape having a second opening portion. The second opening portion of inner box 163 is closed by external plate 161.

Inner box 163 and gas barrier container 162 are bonded to each other by an adhesive (not shown). The adhesive may be constituted by modified silicone, for example. The adhesive may be applied to either an entire surface of the inner face of inner box 163, or a part of the inner face of inner box 163.

An interior of gas barrier container 162 (an interior of first member 421) of a main face (upper face) adjacent to inner box 163 of gas barrier container 162 (first member 421) is filled with urethane or the like constituting core material 423. First through hole 421C is further formed in the main face (upper face) adjacent to inner box 163 of gas barrier container 162 (first member 421). First through hole 421C is a hole through which the interior of gas barrier container 162 is vacuumed. Sealing member 425 is provided at a circumferential edge of first through hole 421C. Sealing member 425 is configured to seal first through hole 421C (see FIGS. 74 and 75).

Air escapement hole 421H is further formed in a front face of gas barrier container 162 (first member 421). Sealing member 426 is provided at a circumferential edge of air escapement hole 421H (see FIGS. 74 and 75). Similarly, air escapement hole 421I is formed in a rear face of gas barrier container 162 (first member 421). Sealing member 427 is provided at a circumferential edge of air escapement hole 421I (see FIG. 75).

Gas barrier container 162 of vacuum heat insulator 101 of the present exemplary embodiment has a configuration similar to the configuration of gas barrier container 402 of vacuum heat insulator 101 of the ninth exemplary embodiment. Accordingly, this configuration is not repeatedly described in detail.

Vacuum heat insulator 101M thus configured according to the present exemplary embodiment achieves advantageous effects similar to those of vacuum heat insulator 101I according to the ninth exemplary embodiment.

While inner box 403 is constituted by the single member according to the present exemplary embodiment, other modes may be adopted. In a different adoptable mode, inner box 403 may have the configuration according to the modified example of the ninth exemplary embodiment.

Twelfth Exemplary Embodiment

[Configuration of Vacuum Heat Insulator]

Figure 76:
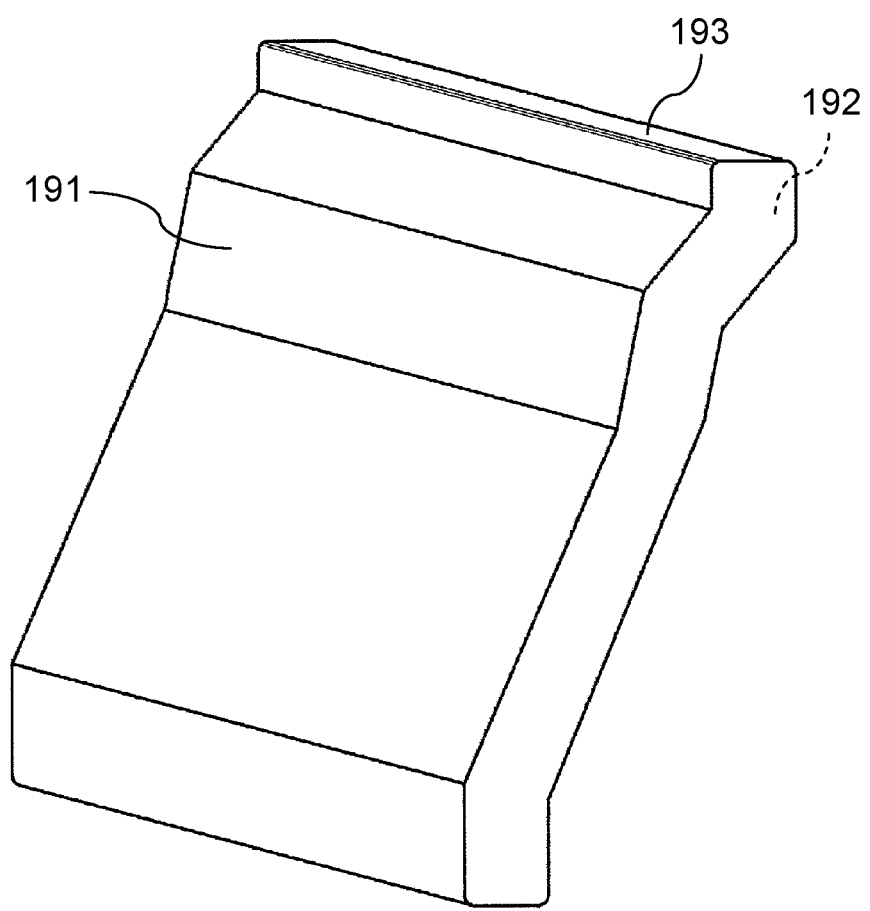
FIG. 76 is a perspective view schematically illustrating a general configuration of a vacuum heat insulator according to a twelfth exemplary embodiment of the present disclosure.
Figure 77:
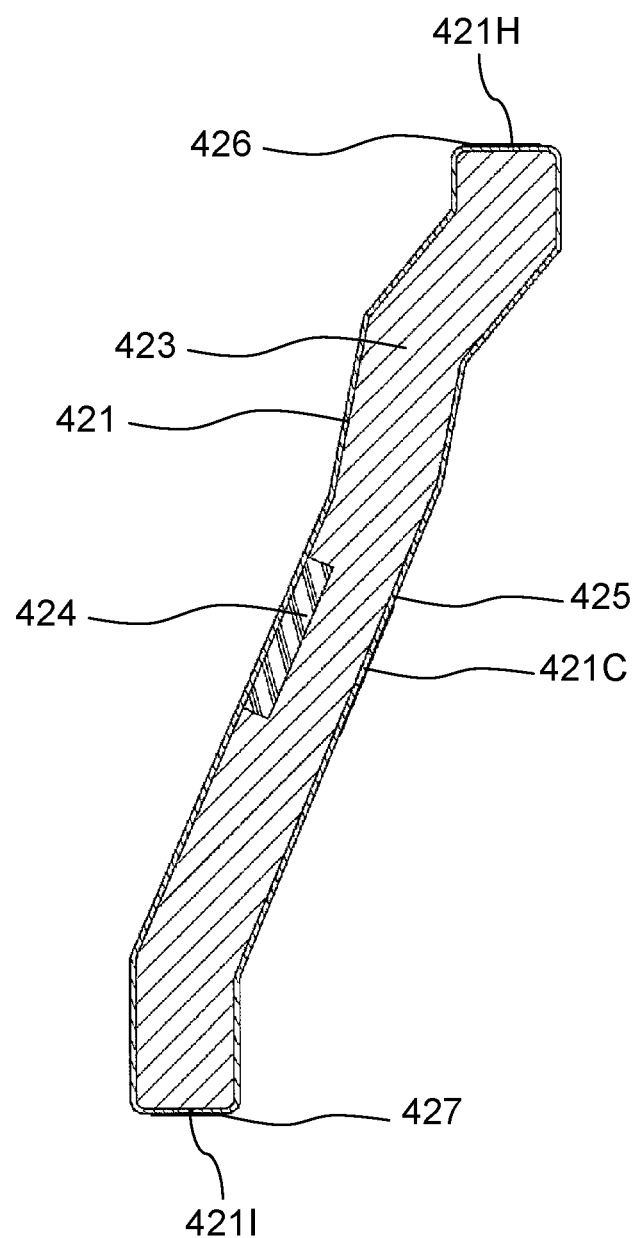
FIG. 77 is a longitudinal sectional view illustrating a gas barrier container of the vacuum heat insulator according to the twelfth exemplary embodiment of the present disclosure.

FIG. 76 is a perspective view schematically illustrating a general configuration of a vacuum heat insulator according to a twelfth exemplary embodiment of the present disclosure. FIG. 77 is a longitudinal sectional view illustrating a gas barrier container of the vacuum heat insulator according to the twelfth exemplary embodiment of the present disclosure.

As illustrated in FIGS. 76 and 77, vacuum heat insulator 101N according to the present exemplary embodiment constitutes cooling compartment wall body 19 of heat insulation device 100B illustrated in FIGS. 41 and 42. Cooling compartment wall body 19 has a stepped shape, and connects partition wall 16 and partition wall 17. Vacuum heat insulator 101N according to the present exemplary embodiment includes external plate 191, gas barrier container 192, and inner box 193 which houses gas barrier container 192.

External plate 191 has a plurality of steps, and has a flat plate shape as viewed from a front of heat insulation device 100B. External plate 191 is constituted by a glass plate or a precoated steel plate, for example. External plate 191 and gas barrier container 192 are bonded to each other by a sheet-shaped (film-shaped) adhesive (not shown). The adhesive may be constituted by modified silicone or modified polyolefin, for example.

Inner box 193 includes an opened front face, and has a box shape having a second opening portion. The second opening portion of inner box 193 is closed by external plate 191.

Inner box 193 and gas barrier container 192 are bonded to each other by an adhesive (not shown). The adhesive may be constituted by modified silicone, for example. The adhesive may be applied to either an entire surface of the inner face of inner box 193, or a part of the inner face of inner box 193.

An interior of gas barrier container 192 (an interior of first member 421) is filled with urethane or the like constituting core material 423. First through hole 421C is formed in a rear face of gas barrier container 192 (first member 421). First through hole 421C is a hole through which the interior of gas barrier container 192 is vacuumed. Sealing member 425 is provided at a circumferential edge of first through hole 421C. Sealing member 425 is configured to seal first through hole 421C (see FIG. 77).

Air escapement hole 421H is formed in an upper face of gas barrier container 192 (first member 421). Sealing member 426 is provided at a circumferential edge of air escapement hole 421H (see FIG. 77). Similarly, air escapement hole 421I is formed in a lower face of gas barrier container 192 (first member 421). Sealing member 427 is provided at a circumferential edge of air escapement hole 421I (see FIG. 77).

Gas barrier container 192 of vacuum heat insulator 101N of the present exemplary embodiment has a configuration similar to the configuration of gas barrier container 402 of vacuum heat insulator 101I of the ninth exemplary embodiment of the present disclosure. Accordingly, this configuration is not repeatedly described in detail.

Vacuum heat insulator 101N thus configured according to the present exemplary embodiment achieves advantageous effects similar to those of vacuum heat insulator 101I according to the ninth exemplary embodiment.

While inner box 403 is constituted by the single member according to the present exemplary embodiment, other modes may be adopted. In a different adoptable mode, inner box 403 may have the configuration according to the modified example of the ninth exemplary embodiment of the present disclosure.

Various improvements and exemplary embodiments of the present invention not described herein may occur to those skilled in the art based on the foregoing description. Accordingly, the foregoing description should be interpreted only as a specific example, and presented only for purposes of teachings given to those skilled in the art in practicing best modes of the present disclosure. Substantial modifications of details of at least either the structure or the function of the present disclosure may be made without departing from the subject matters of the present disclosure. In addition, appropriate combinations of a plurality of constituent elements disclosed in the above exemplary embodiments may be made to produce various modes.

INDUSTRIAL APPLICABILITY

The present disclosure provides a vacuum heat insulator, and a method for manufacturing a vacuum heat insulator, the vacuum heat insulator being capable of following a complicated three-dimensional shape while achieving sufficient gas barrier and heat insulation properties. Accordingly, the present disclosure is applicable to a wide variety of applications, such as various types of devices requiring heat insulation.

REFERENCE MARKS IN THE DRAWINGS

2: refrigerator body
2A: recess
2B: recess
3: refrigerating compartment door
4A: ice-making compartment door
4B: first freezing compartment door
5: vegetable compartment door
6: second freezing compartment door
8: compressor
9: evaporator
10: cooling channel
11: refrigerating compartment
12: ice-making compartment
13: vegetable compartment
14: second freezing compartment door
15: partition wall
16: partition wall
16A: recess
17: partition wall
18: cooling compartment
19: cooling compartment wall body
20: evaporating dish
21: first resin layer
22: second resin layer
23: gas barrier layer
34: single layer
35: high barrier layer
36: air barrier layer
37: water barrier layer
38: adhesive layer
45: waste mixture layer
51: distal end portion
51A: distal end portion
52: intermediate portion
52A: intermediate portion
53: rear end portion
53A: rear end portion
54: exhaust channel
55: sealing member
55A: sealing member
57: sealing member
57A: sealing member
58: clearance
58A: clearance
61: distal end portion
62: intermediate portion
63: rear end portion
65: sealing member
67: clearance
100A, 100B: heat insulation device
101A to 101N: vacuum heat insulator
161: external plate
162: gas barrier container
163: inner box
163C: second opening portion
164: adhesive
191: external plate
192: gas barrier container 193: inner box
193C: second opening portion
201: external plate
202: gas barrier container
203: inner box
203C: second opening portion
204: adhesive
205: adhesive
206: foamed heat insulating material
210: through hole
223: core material
401: external plate
402: gas barrier container
403: inner box
403A: first main face
403B: second main face
403C: second opening portion
403D: second through hole
403E: boss
403F: gasket groove
404: adhesive
405: adhesive
421: first member
421A: flange portion
421B: first opening portion
421C: first through hole
421D: thermal welding portion
421E: through hole
421F: upper part
421G: lower part
421H: air escapement hole
421I: air escapement hole
422: second member
423: core material
424: absorbent
425: sealing member
426: sealing member
427: sealing member
441: gasket
442: frame
443: screw
500: vacuum-sealing device
501: vacuum-sealing device body (body unit)
501A: body part
501B: external cylinder part
502: vacuum pump
503: driver
504: heater
505: first exhaust channel
506: second exhaust channel
507: openable valve
510: controller
550: vacuum-sealing device
551: vacuum-sealing device body (body unit)
551A: body part
551B: external cylinder part
552: vacuum pump
553: driver
554: heater
555: exhaust channel
560: controller
601: external plate
601A: through hole
602: gas barrier container
603: inner box
603A: first main face
603B: second main face
603C: second opening portion
603D: projection
604: adhesive
605: adhesive
661: gasket
662: handle
663: screw

The invention claimed is:

1. A vacuum heat insulator comprising:
a core material;
a gas barrier container inside of which the core material is disposed;
an inner box inside of which the gas barrier container is disposed; and
an external plate that closes an opening of the inner box, wherein
the gas barrier container includes a first member that has a first opening portion, and a second member that tightly closes the first opening portion,
the opening of the inner box being constituted by a second opening portion,
the gas barrier container being configured to maintain a predetermined degree of vacuum inside the gas barrier container,
the first member having such a shape that an outer face of the first member fits with an inner face of the inner box,
the first member including a first through hole through which an interior of the gas barrier container is vacuumed,
the inner box further including a second through hole formed at a position facing the first through hole, and a boss provided at a circumferential edge of the second through hole,
the inner box being configured such that the second through hole is closed by the boss when the boss is welded, and
the vacuum heat insulator further comprising a sealing member fixed to a portion of the second through hole of the inner box.

2. The vacuum heat insulator according to claim 1, wherein the first member includes a first resin layer and a second resin layer each made of thermoplastic resin, and a gas barrier layer disposed between the first resin layer and the second resin layer.

3. The vacuum heat insulator according to claim 1, wherein the core material is made of open-cell urethane foam.

4. A heat insulation device comprising the vacuum heat insulator according to claim 1.

5. A method for manufacturing a vacuum heat insulator, the method comprising:
manufacturing an inner box that includes a second opening portion, a second through hole, and a boss provided at a circumferential edge of the second through hole;
processing a gas barrier sheet made of thermoplastic resin into a first member that includes a first opening portion, and a first through hole formed at a portion facing the second through hole of the inner box, and is box-shaped and so shaped that an outer face of the first member fits with an inner face of the inner box;
disposing a core material inside the first member, disposing a second member in the first opening portion, and welding the second member to manufacture a gas barrier container; and
disposing the gas barrier container inside the inner box, performing vacuuming, from the first through hole via the second through hole, the inner space defined by the first member and the second member until a degree of vacuum of the inner space defined by the first member and the second member reaches a predetermined degree of vacuum set beforehand, closing the second through hole by thermally welding the boss, fixing a sealing member to a portion of the second through hole of the inner box, and closing the second opening portion by an external plate.

* * * * *